United States Patent [19]
Nakata

[11] Patent Number: 5,923,554
[45] Date of Patent: Jul. 13, 1999

[54] METHOD FOR ASSESSING THE NUMBER AND TYPE OF FLAWS

[75] Inventor: Kazuki Nakata, Kadoma, Japan

[73] Assignee: Matsushita Electric Industrial Co., Ltd., Kadoma, Japan

[21] Appl. No.: 08/782,223

[22] Filed: Jan. 13, 1997

[30] Foreign Application Priority Data

Jan. 16, 1996 [JP] Japan .................................. 8-004555

[51] Int. Cl.⁶ .......................... G01N 21/88; H01L 21/66; G06F 17/18
[52] U.S. Cl. ............................... 364/468.17; 364/468.16; 702/35; 382/145; 382/149; 356/237.5; 438/14; 73/865.8
[58] Field of Search .................. 702/35–37; 364/468.17, 364/468.28, 468.15; 382/145, 147, 149; 438/14; 356/237; 73/865.8; 348/125, 126, 87, 92, 94

[56] References Cited

U.S. PATENT DOCUMENTS

| | | | |
|---|---|---|---|
| 4,974,261 | 11/1990 | Nakahara et al. | 382/141 |
| 5,065,442 | 11/1991 | Kugai | 382/179 |
| 5,219,765 | 6/1993 | Yoshida et al. | 438/10 |
| 5,240,866 | 8/1993 | Friedman et al. | 702/35 |
| 5,319,720 | 6/1994 | Yokoyama et al. | 382/145 |
| 5,463,459 | 10/1995 | Morioka et al. | 356/237.5 |
| 5,557,438 | 9/1996 | Schwartz et al. | 359/204 |
| 5,617,487 | 4/1997 | Yoneyama et al. | 382/199 |
| 5,663,569 | 9/1997 | Hayano | 250/559.45 |
| 5,664,085 | 9/1997 | Morito | 345/441 |

FOREIGN PATENT DOCUMENTS 3209740 9/1991 Japan .
4340740 11/1992 Japan .

Primary Examiner—James P. Trammell
Assistant Examiner—Tuan Q. Dam
Attorney, Agent, or Firm—Renner, Otto, Boisselle & Sklar, P.L.L.

[57] ABSTRACT

A method for assessing a number and type of flaws of the present invention includes the steps of: counting the number of flaws existing within a first region surrounded by a first line; and counting the number of flaws existing within a second region located in a periphery of the first region.

11 Claims, 38 Drawing Sheets

FIG. 3

Field for storing the X-coordinate of flaw 21
Field for storing the Y-coordinate of flaw 22
Field for storing a flag which indicates if a set of coordinate data in the corresponding fields has been extracted 23

| 1.2 | 9 | 1 |
|-----|------|---|
| 3.5 | 12.6 | 0 |

FIG. 4

Field for storing the X-coordinate of flaw 31
Field for storing the Y-coordinate of flaw 32

| 1.9 | 12 |
|-----|----|
| 4.5 | 14 |

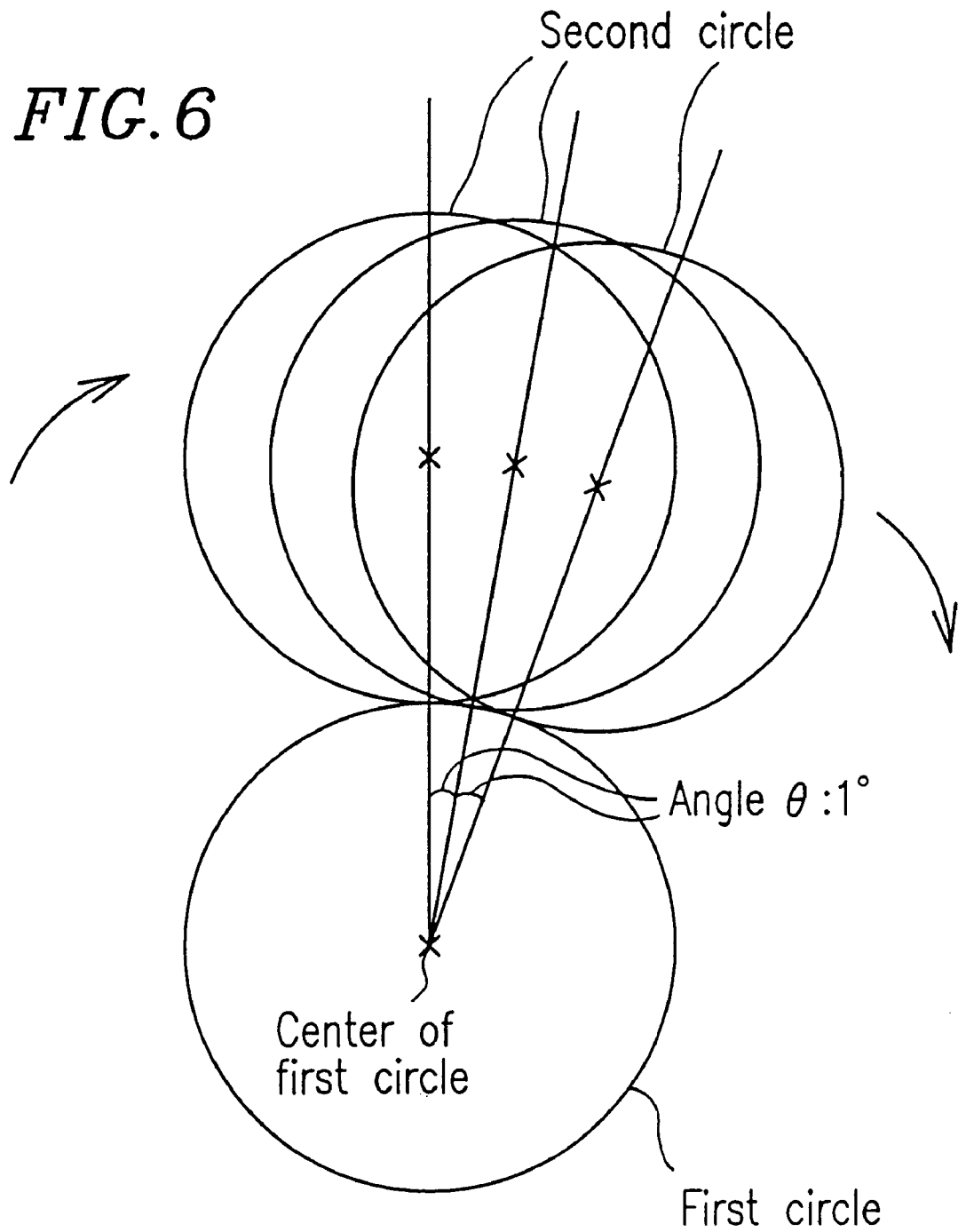

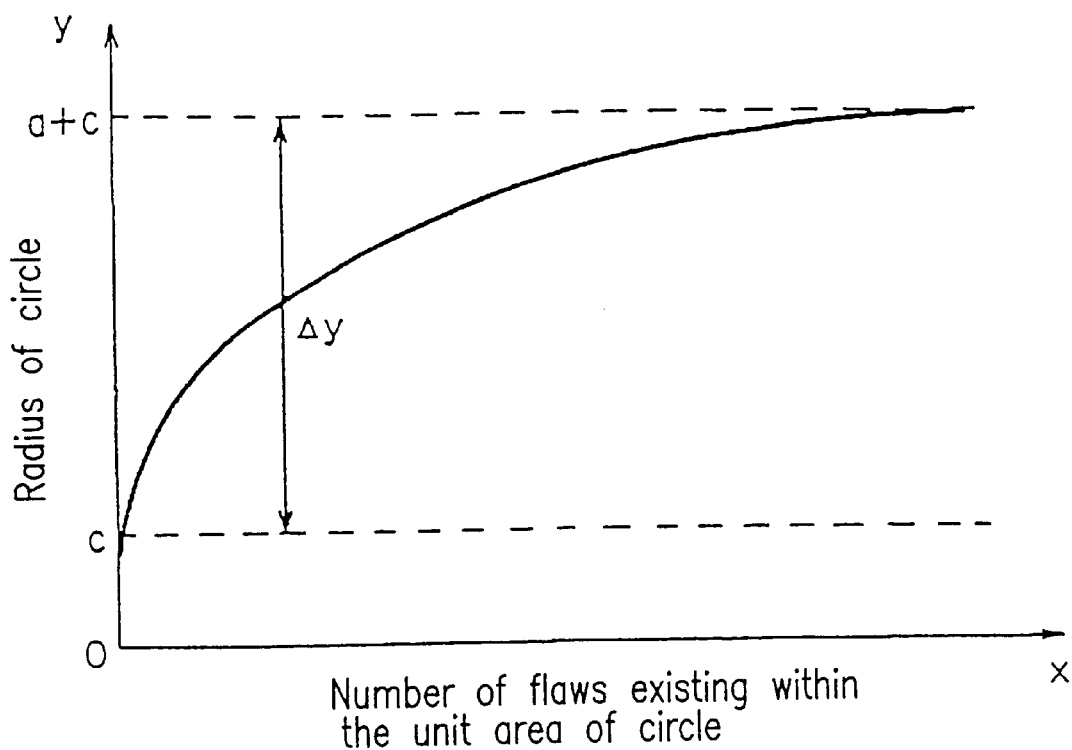

METHOD FOR ASSESSING THE NUMBER AND TYPE OF FLAWS

BACKGROUND OF THE INVENTION

1. Field of the Invention

The present invention relates to a method for assessing the number and type of flaws on a substrate while distinguishing between flaws such as a scratch or scratches and those of particles, based on the coordinate data for the positions of all of the detected flaws. The present invention is particularly useful when a flaw detection device detects a scratch or scratches made by a pincette or the like on a substrate, such as a semiconductor wafer.

2. Description of the Related Art

Flaws existing in a semiconductor manufacturing apparatus can reduce the production yield. In order to avoid a reduction of production yield, it is necessary to remove flaws attached to the inner walls of the semiconductor manufacturing apparatus. The removal of flaws is started when the number of flaws existing on a semiconductor wafer reaches a predetermined value. To determine the number, the number of detected flaws such as particles existing on a semiconductor wafer is counted.

When a scratch made by a pincette or the like exists on a semiconductor wafer, a flaw detection device detects the scratch as a plurality of flaws. In other words, a flaw detection device detects both particles and a scratch or scratches as flaws.

Therefore, flaw removal may not have to begin simply because the number of flaws detected by a flaw detection device exceeds a predetermined value. However, it is necessary to begin flaw removal when the value obtained by subtracting the number of flaws from a scratch from the number of all flaws detected by the flaw detection device exceeds a predetermined value. Therefore, the number of flaws from a scratch on a semiconductor wafer must be determined. Herein, "a scratch" is defined as flaws from a scratch or scratches and/or the like on a semiconductor wafer made by, for example, a pincette or the like, that are detected as flaws by a flaw detection device. Herein, "particles and the like" are referred to as simply "particles".

SUMMARY OF THE INVENTION

According to one aspect of this invention, a method for assessing a number and type of flaws includes the steps of: counting the number of flaws existing within a first region surrounded by a first line; and counting the number of flaws existing within a second region located in a periphery of the first region.

In one embodiment of the invention, the method further includes the step of moving a circle along the periphery of the first region so as to be tangential to the first region and setting a trace of the circle to be the second region.

In another embodiment of the invention, the first region is a first circle having a radius a, and the method further includes the step of moving a second circle having a radius b along the periphery of the first circle so as to partially overlap the first circle, thus determining the second region.

In still another embodiment of the invention, in the step of determining the second region, a distance between a center of the first circle and a center of the second circle is set about equal to or more than |a−b| and about less than a+b, while moving the second circle. Herein, |a−b| means the absolute value of (a−b).

In still another embodiment of the invention, the method further includes the step of moving an ellipse along the periphery of the first region so as to be tangential to the first region and setting a trace of the ellipse to be the second region.

In still another embodiment of the invention, the first region is a first ellipse, and the method further includes the step of moving a second ellipse along the periphery of the first ellipse so as to partially overlap the first ellipse, thus determining the second region.

In still another embodiment of the invention, the method further includes the step of moving a polygon along the periphery of the first region so as to be tangential to the first region and setting a trace of the polygon to be the second region.

In still another embodiment of the invention, the first region is a first polygon, and the method further includes the step of moving the second polygon so that one side of the second polygon is tangential to a side of the first polygon and assuming a trace of the second polygon being moved along the periphery of the first polygon to be the second region, thus determining the second region.

In still another embodiment of the invention, the first region is a first polygon, and the method further includes the step of moving a second polygon along the periphery of the first polygon so as to partially overlap the first polygon, thus determining the second region.

According to another aspect of the invention, a method for assessing a number and type of flaws includes the steps of: counting the number of flaws existing within a first region surrounded by a first circle; determining a size of a second circle according to the number of flaws existing within the first region; setting the second circle so as to be tangential to the first circle; counting the number of flaws existing within a second region surrounded by the second circle; and moving the second circle along a periphery of the first circle so as to be tangential to the first circle while counting the number of flaws which have not yet been counted and which exist within the second region surrounded by the second circle being moved.

In one embodiment of the invention, the method further includes the steps of: determining the size of a third circle according to the number of flaws existing within the second region surrounded by the second circle; setting the third circle so as to be tangential to the second circle; counting the number of flaws which have not yet been counted and which exist within a third region surrounded by the third circle; and moving the third circle along a periphery of the second circle so as to be tangential to the second circle while counting the number of flaws which have not yet been counted and which exist within the third region surrounded by the third circle being moved.

According to still another aspect of the invention, a method for assessing a number and type of flaws includes the steps of: counting the number of flaws existing within a first region surrounded by a first circle; determining a size of a second circle according to the number of flaws existing within the first region surrounded by a first circle; setting the second circle so as to partially overlap the first circle; counting the number of flaws which have not yet been counted and which exist within a second region surrounded by a portion of the second circle and the first circle, excluding the first region; and moving the second circle along a periphery of the first circle so as to partially overlap the first circle while counting the number of flaws which have not yet been counted and which exist within the second region surrounded by a portion of the second circle being moved and the first circle, excluding the first region.

In one embodiment of the invention, the method further includes the steps of: determining the size of a third circle according to the number of flaws counted in the step of determining the size of the second circle; setting the third circle so as to partially overlap the second circle; counting the number of flaws which have not yet been counted and which exist within a third region surrounded by a portion of the third circle and a portion of second circle, excluding a region surrounded by the second circle; and moving the third circle along the periphery of the second circle so as to partially overlap the second circle while counting the number of flaws which have not yet been counted and which exist within the third region surrounded by a portion of the third circle being moved and a portion of the second circle, excluding a region surrounded by the second circle.

In another embodiment of the invention, in the step of determining the size of the second circle, the size of the second circle is determined so as to satisfy an expression: $y-f\{1-\exp(-gx)\}+h$, where x is the number of flaws existing within the first circle; y is the radius of the second circle; h is a minimum value of a radius y; f+h is a maximum value of the radius y; and each of f, g, and h is a predetermined value.

According to still another aspect of the invention, a method for assessing a number and type of flaws includes the steps of: counting the number of flaws existing within a first region surrounded by a first ellipse; determining the size of a second ellipse according to the number of flaws existing within the first region surrounded by the first ellipse; setting the second ellipse so as to be tangential to the first ellipse; counting the number of flaws existing within a second region surrounded by the second ellipse; and moving the second ellipse along a periphery of the first ellipse so as to be tangential to the first ellipse while counting the number of flaws which have not yet been counted and which exist within the second region surrounded by the second ellipse being moved.

In one embodiment of the invention, the method further includes the steps of: determining a size of a third ellipse according to the number of flaws existing within the second region surrounded by the second ellipse; setting the third ellipse so as to be tangential to the second ellipse; counting the number of flaws which have not yet been counted and which exist within a third region surrounded by the third ellipse; and moving the third ellipse along a periphery of the second ellipse so as to be tangential to the second ellipse while counting the number of flaws which have not yet been counted and which exist within the third region surrounded by the third ellipse being moved.

In still another aspect of the invention, a method for assessing a number and type of flaws includes the steps of: counting the number of flaws existing within a first region surrounded by a first ellipse; determining a size of a second ellipse according to the number of flaws existing within the first region; setting the second ellipse so as to partially overlap the first ellipse; counting the number of flaws existing within a second region surrounded by a portion of the second ellipse and a portion of the first ellipse, excluding the first region; and moving the second ellipse along a periphery of the first ellipse so as to partially overlap the first ellipse while counting the number of flaws which have not yet been counted and which exist within the second region surrounded by a portion of the second ellipse being moved and a portion of the first ellipse, excluding the first region.

In one embodiment of the invention, the method further includes the steps of: determining a size of a third ellipse according to the number of flaws existing within the second region surrounded by the second ellipse; setting the third ellipse so as to partially overlap the second ellipse; counting the number of flaws which have not yet been counted and which exist within a third region surrounded by a portion of the third ellipse and a portion of the second ellipse, excluding a region surrounded by the second ellipse; and moving the third ellipse along a periphery of the second ellipse so as to partially overlap the second ellipse while counting the number of flaws which have not yet been counted and which exist within the third region surrounded by a portion of the third ellipse being moved and a portion of the second ellipse, excluding a region surrounded by the second ellipse.

According to still another aspect of the invention, a method for assessing a number and type of flaws includes the steps of: counting the number of flaws existing within a first region surrounded by a first polygon; determining a size of a second polygon according to the number of flaws existing within the first region surrounded by the first polygon; setting the second polygon so as to partially overlap the first polygon; counting the number of flaws existing within a second region surrounded by a portion of the second polygon and a portion of the first polygon, excluding the first region; and moving the second polygon along a periphery of the first polygon so as to partially overlap the first polygon while counting the number of flaws which have not yet been counted and which exist within the second region surrounded by a portion of the second polygon being moved and a portion of the first polygon, excluding the first region.

In one embodiment of the invention, the method further includes the steps of: determining a size of a third polygon according to the number of flaws counted in the step of determining the size of the second polygon; setting the third polygon so as to partially overlap the second polygon; counting the number of flaws which have not yet been counted and which exist within a third region surrounded by a portion of the third polygon and a portion of second polygon, excluding a region surrounded by the second polygon; and moving the third polygon along a periphery of the second polygon so as to partially overlap the second polygon while counting the number of flaws which have not yet been counted and which exist within the third region surrounded by a portion of the third polygon being moved and a portion of the second polygon, excluding a region surrounded by the second polygon.

According to still another aspect of the invention, a method for assessing a number and type of flaws includes the steps of: counting the number of flaws existing within a first region surrounded by a first circle; computing a regression straight line based on the number of flaws existing within the first region surrounded by the first circle; moving a second circle along a periphery of the first circle so as to be tangential to the first circle, while varying a size of the second circle based on the regression straight line; and counting the number of flaws which have not yet been counted and which exist within a second region surrounded by the second circle being moved with the size thereof being varied.

In one embodiment of the invention, the method further includes the steps of: computing a regression straight line based on the number of flaws existing within the second region surrounded by the second circle; moving a third circle along the periphery of the second circle so as to be tangential to the second circle, while varying the size of the third circle based on the regression straight line; and counting the number of flaws which have not yet been counted and which exist within a third region surrounded by the third circle being moved with the size thereof being varied, excluding a region surrounded by the second circle.

According to still another aspect of the invention, a method for assessing a number and type of flaws includes the steps of: counting the number of flaws existing within a first region surrounded by a first circle; computing a regression straight line based on the number of flaws existing within the first region surrounded by the first circle; moving a second circle along the periphery of the first circle so as to partially overlap the first circle, while varying the size of the second circle based on the regression straight line; and counting the number of flaws which have not yet been counted and which exist within a second region surrounded by the second circle being moved with the size thereof being varied, excluding the first region.

In one embodiment of the invention, the method further includes the steps of: computing a regression straight line based on the number of flaws existing within the second region surrounded by the second circle; moving a third circle along the periphery of the second circle so as to partially overlap the second circle, while varying the size of the third circle based on the regression straight line; and counting the number of flaws which have not yet been counted and which exist within a third region surrounded by a portion of the third circle being moved with the size thereof being varied and a portion of the second circle, excluding the second circle.

According to still another aspect of the invention, a method for assessing a number and type of flaws includes the steps of: counting the number of flaws existing within a first region surrounded by a first ellipse; computing a regression straight line based on the number of flaws existing within the first region surrounded by the first ellipse; moving a second ellipse along a periphery of the first ellipse so as to be tangential to the first ellipse, while varying a size of the second ellipse based on the regression straight line; and counting the number of flaws which have not yet been counted and which exist within a second region surrounded by the second ellipse being moved with the size thereof being varied.

In one embodiment of the invention, the method further includes the steps of: computing a regression straight line based on the number of flaws existing within the second region surrounded by the second ellipse, moving a third ellipse along the periphery of the second ellipse so as to be tangential to the second ellipse, while varying the size of the third ellipse based on the regression straight line; and counting the number of flaws which have not yet been counted and which exist within a third region surrounded by the third ellipse being moved with the size thereof being varied, excluding a region surrounded by the second ellipse.

According to still another aspect of the invention, a method for assessing a number and type of flaws includes the steps of: counting the number of flaws existing within a first region surrounded by a first ellipse; computing a regression straight line based on the number of flaws existing within the first region surrounded by the first ellipse; moving a second ellipse along the periphery of the first ellipse so as to partially overlap the first ellipse, while varying the size of the second ellipse based on the regression straight line; and counting the number of flaws which have not yet been counted and which exist within a second region surrounded by the second ellipse being moved with the size thereof being varied, excluding the first region.

In one embodiment of the invention, the method further includes the steps of: computing a regression straight line based on the number of flaws existing within the second region surrounded by the second ellipse; moving a third ellipse along the periphery of the second ellipse so as to partially overlap the second ellipse, while varying the size of the third ellipse based on the regression straight line; and counting the number of flaws which have not yet been counted and which exist within a third region surrounded by a portion of the third ellipse being moved with the size thereof being varied and a portion of the second ellipse, excluding the second ellipse.

According to still another aspect of the invention, a method for assessing a number and type of flaws includes the steps of: counting the number of flaws existing within a first region surrounded by a first square; computing a regression straight line based on the number of flaws existing within the first region surrounded by the first square; moving a second square along a periphery of the first square so as to be tangential to the first square, while varying a size of the second square based on the regression straight line; and counting the number of flaws which have not yet been counted and which exist within a second region surrounded by the second square being moved with the size thereof being varied.

In one embodiment of the invention, the method further includes the steps of: computing a regression straight line based on the number of flaws existing within the second region surrounded by the second square; moving a third square along the periphery of the second square so as to be tangential to the second square, while varying the size of the third square based on the regression straight line; and counting the number of flaws which have not yet been counted and which exist within a third region surrounded by the third square being moved with the size thereof being varied, excluding a region surrounded by the second square.

According to still another aspect of the invention, a method for assessing a number and type of flaws includes the steps of: counting the number of flaws existing within a first region surrounded by a first square; computing a regression straight line based on the number of flaws existing within the first region surrounded by the first square; moving a second square along the periphery of the first square so as to partially overlap the first square, while varying the size of the second square based on the regression straight line; and counting the number of flaws which have not yet been counted and which exist within a second region surrounded by the second square being moved with the size thereof being varied, excluding the first region.

In one embodiment of the invention, the method further includes the steps of: computing a regression straight line based on the number of flaws existing within the second region surrounded by the second square; moving a third square along the periphery of the second square so as to partially overlap the second square, while varying the size of the third square based on the regression straight line; and counting the number of flaws which have not yet been counted and which exist within a third region surrounded by a portion of the third square being moved with the size thereof being varied and a portion of the second square, excluding the second square.

According to still another aspect of the invention, a method for assessing a number and type of flaws includes the steps of: counting the number of flaws existing within a first region surrounded by a first hexagon; computing a regression straight line based on the number of flaws existing within the first region surrounded by the first hexagon; moving a second hexagon along a periphery of the first hexagon so as to be tangential to the first hexagon, while varying a size of the second hexagon based on the regression straight line; and counting the number of flaws which have not yet been counted and which exist within a second region surrounded by the second hexagon being moved with the size thereof being varied.

In one embodiment of the invention, the method further includes the steps of: computing a regression straight line based on the number of flaws existing within the second region surrounded by the second hexagon; moving a third hexagon along the periphery of the second hexagon so as to be tangential to the second hexagon, while varying the size of the third hexagon based on the regression straight line; and counting the number of flaws which have not yet been counted and which exist within a third region surrounded by the third hexagon being moved with the size thereof being varied, excluding a region surrounded by the second hexagon.

According to still another aspect of the invention, a method for assessing a number and type of flaws includes the steps of: counting the number of flaws existing within a first region surrounded by a first hexagon; computing a regression straight line based on the number of flaws existing within the first region surrounded by the first hexagon; moving a second hexagon along the periphery of the first hexagon so as to partially overlap the first hexagon, while varying the size of the second hexagon based on the regression straight line; and counting the number of flaws which have not yet been counted and which exist within a second region surrounded by the second hexagon being moved with the size thereof being varied, excluding the first region.

In one embodiment of the invention, the method further includes the steps of: computing a regression straight line based on the number of flaws existing within the second region surrounded by the second hexagon; moving a third hexagon along the periphery of the second hexagon so as to partially overlap the second hexagon, while varying the size of the third hexagon based on the regression straight line; and counting the number of flaws which have not yet been counted and which exist within a third region surrounded by a portion of the third hexagon being moved with the size thereof being varied and a portion of the second hexagon, excluding the second hexagon.

According to the method for assessing the number and type of flaws of the present invention, the coordinate data of flaws that are clustered can be extracted by counting the number of flaws existing within the first region surrounded by the first line and counting the number of flaws existing within the second region located in the periphery of the first region using the coordinate data of all detected flaws. Clustered flaws are much more likely to be flaws from a scratch or scratches. That is, the positions and number of flaws of particles can be obtained by deleting the coordinate data of the clustered flaws from the coordinate data of all of the flaws detected by a flaw detection device. When a value obtained by subtracting the number of flaws from a scratch from the number of all flaws detected by a flaw detection device exceeds a predetermined value, flow removal begins, thereby increasing the possibility that a semiconductor manufactured by the semiconductor manufacturing apparatus is a high quality article.

According to the present invention, using the above-described configuration, clustered flaws are extracted by counting the number of flaws existing within the (k-1) and the kth (k is an integer equal to or higher than 2) closed curves (i.e., circles, ellipses, etc.). The coordinate data of the positions of the extracted flaws are stored in a memory device. The flaw detection device detects a scratch as a plurality of clustered flaws. Therefore, by extracting only the coordinate data of the clustered flaws from the coordinate data of all flaws detected by a flaw detection device, it is possible to distinguish between a scratch and a particle.

A scratch is often formed in a skipped pattern like a dashed line. In such a case, the kth closed curve, which is located in a direction along which the flaws are clustered is enlarged, thereby allowing for the extraction of the dashed flaws even where clusters of flaws are arranged with some interval therebetween. The closed curve is enlarged by elongating the radius of a circle (or the major axis of an ellipse).

Thus, the invention described herein makes possible the advantage of providing a method for assessing the number and type of flaws where it is possible to count the number of flaws existing within a scratch.

This and other advantages of the present invention will become apparent to those skilled in the art upon reading and understanding the following detailed description with reference to the accompanying figures.

BRIEF DESCRIPTION OF THE DRAWINGS

FIG. 3 is a diagram showing the fields provided in the memory section of the device shown in FIG. 2.

FIG. 4 is a diagram showing the fields provided in the memory section of the device shown in FIG. 2.

FIG. 6 is a diagram illustrating an example of how a second circle is moved tangentially along the periphery of a first circle.

FIG. 29 is a graph illustrating a relationship between the radius of a circle and the number of flaws existing within a unit area of the circle.

DESCRIPTION OF THE PREFERRED EMBODIMENTS

Hereinafter, a method for assessing the number and type of flaws of the present invention will be described with reference to the accompanying drawings.

EXAMPLE 1

Hereinafter, a method for assessing the number and type of flaws according to Example 1 of the present invention will be described with reference to FIGS. 1A to 1C.

Figure 1A:
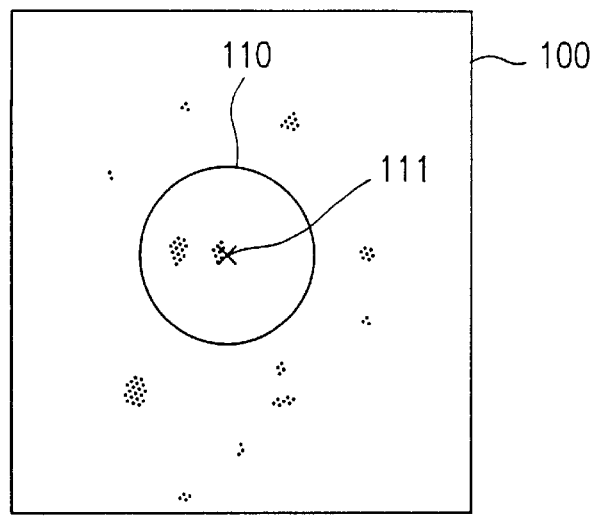
FIG. 1A is a diagram showing a plurality of flaws and a first circle.
Figure 1B:
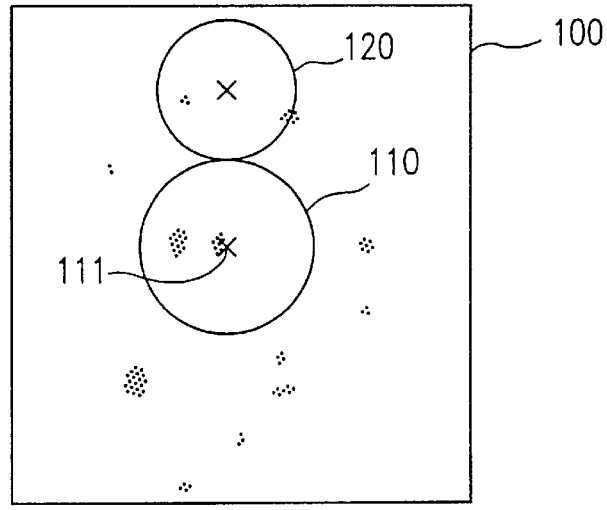
FIG. 1B is a diagram showing a plurality of flaws, a first circle, and a second circle tangential to the first circle.
Figure 1C:
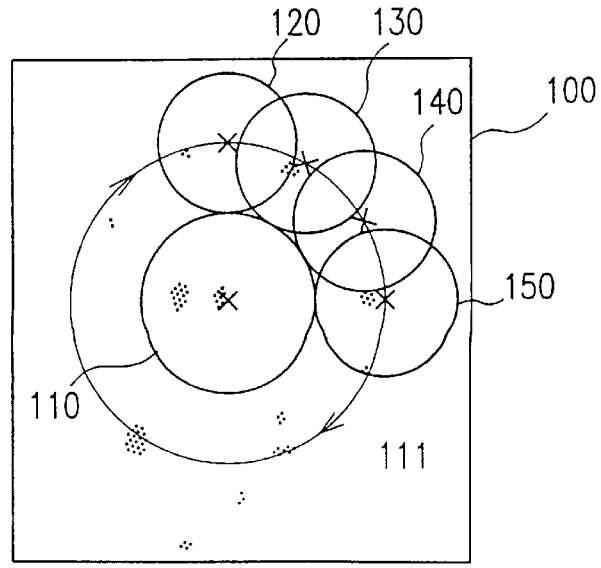
FIG. 1C is a diagram showing a plurality of flaws, a first circle, a second circle tangential to the first circle, and a plurality of other second circles set by moving the second circle tangentially along the periphery of the first circle.

FIGS. 1A to 1C show a region 100 on a semiconductor wafer where flaws are distributed. The positions of the flaws on the semiconductor wafer are detected in advance by a flaw detection device.

In FIG. 1A, a plurality of flaws and a first circle 110 (having a radius a with the center thereof being an arbitrary point 111) are shown within the region 100. The number of all flaws existing within the first circle 110 is counted. X1 is set to be the number of the counted flaws. The arbitrary point 111 corresponds to a position of a preselected flaw in the region 100.

In FIG. 1B, a plurality of flaws and the first circle 110 and a second circle 120 (which has a radius b and is set to be tangential to the first circle 110) are shown within the region 100. The number of all flaws existing within the second circle 120 is counted. X2 is set to the number of the counted flaws. Herein, the radius b of the second circle 120 may be equal to the radius a of first circle 110. In the present example, "flaws existing within a circle" include those on the periphery of the circle.

In FIG. 1C, a plurality of flaws, the first circle 110, the second circle 120 (which has a radius b and is set to be tangential to the first circle 110), and a plurality of other second circles 130, 140, and 150 (each set by moving the second circle 120 by a certain angle θ tangentially along the periphery of the first circle 110 as seen in the figure) are shown within the region 100. The second circles are set by moving the second circle 120 tangentially along the entire periphery of the first circle 110.

The number of all flaws existing within the second circle 130 (set by moving the second circle 120 by a certain angle θ tangentially along the periphery of the first circle 110) which have not yet been counted is counted. X3 is set to the number of the counted flaws. Similarly, the number of all flaws existing within each of the second circles 140, 150, ..., (set by moving the second circle 120 tangentially along the entire periphery of the first circle 110) which have not yet been counted is counted. X4, X5, ... are set to the number of the counted flaws. The total number SX2 of all flaws existing within the second circle set by moving the second circle 120 tangentially along the entire periphery of the first circle 110 counted with each of the flaws being counted only once becomes SX2=X2+X3+X4+X5+ . . . .

In the case where the sum of the number X1 and SX2 exceeds a predetermined value, those flaws are regarded as being clustered and are assessed to be a scratch or scratches. Such an assessment is based on the fact that a scratch is unlikely to dispersedly exist within the region 100, but is much more likely to be clustered in a certain area within the region 100. On the other hand, particles are likely to dispersedly exist within the region 100, and are unlikely to be clustered in a certain area within the region 100.

The above procedures are similarly repeated. Specifically, another first circle (having a radius a with the center thereof being an arbitrary point other than the point 111) is first set within the region 100, and the number of all flaws existing within the first circle which have not yet been counted is counted. Then, a second circle is set to have a radius b and to be tangential to the first circle, and the number of all flaws existing within the second circle which have not yet been counted is counted. Subsequently, other second circles are set by moving the second circle tangentially along the entire periphery of the first circle, while counting the number of all flaws existing within the second circle which have not yet been counted.

In the case where the sum of: the number of all counted flaws existing within the first circle (with each of the flaws being counted only once); and the number of all counted flaws existing within the second circle set by moving the second circle tangentially along the entire periphery of the first circle (with each of the flaws being counted only once) exceeds a predetermined value, those flaws are regarded as being clustered and are assessed to be a scratch or scratches.

The number of scratches is counted by repeating the above procedures.

Figure 2:
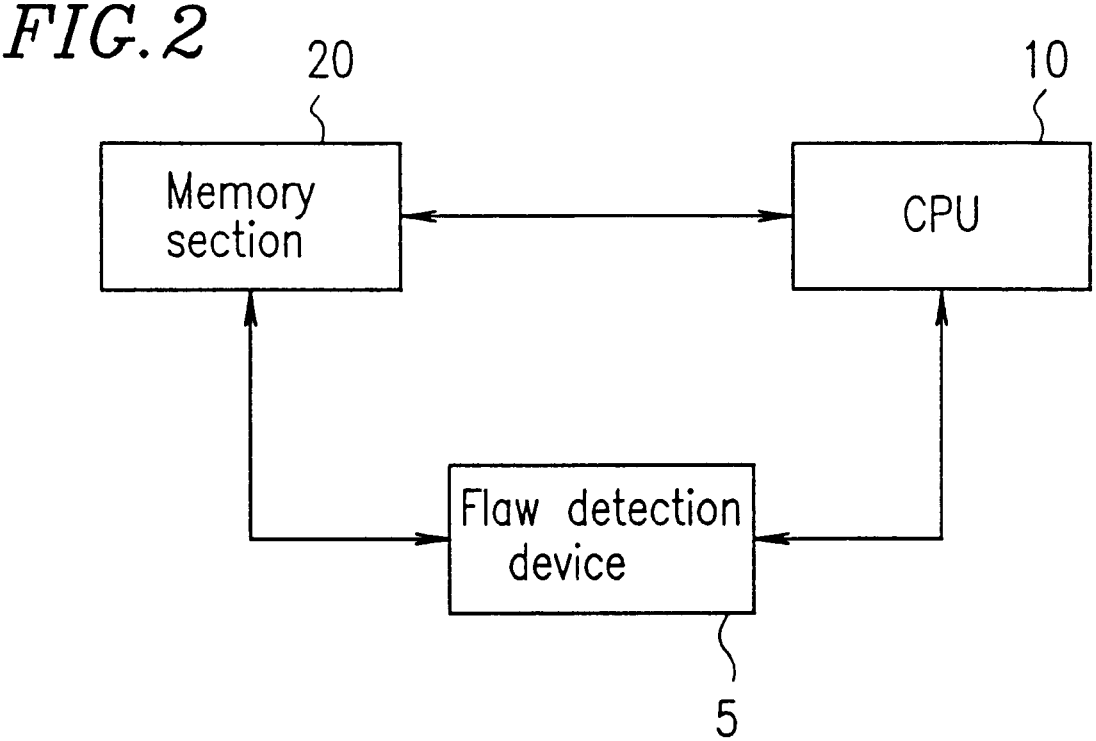
FIG. 2 is a diagram showing an exemplary device for performing a method for assessing the number and type of flaws of the present invention.

FIG. 2 shows an exemplary device for assessing the number and type of flaws of the present invention.

A flaw detection device 5 detects the positions and number of flaws existing on a semiconductor wafer. In a preferred embodiment, the flaw detection device 5 includes KLA2130 (KLA INSTRUMENTS CORPORATION).

A CPU 10 assesses the number and type of flaws of the present invention which will be described below. A program for assessing the number and type of flaws of the present invention may be stored in a recording medium (not shown), such as a floppy disk, a read only memory (ROM), an optical disk and/or the like. The CPU 10 is capable of utilizing the assessment program.

A memory section 20 stores, for example, the coordinate data of the flaws detected by the flaw detection device 5. The coordinate data is composed of X-coordinates and Y-coordinates. As shown in FIG. 3, the memory section 20 includes a field 21 for storing the X-coordinates, a field 22 for storing the Y-coordinates, and a field 23 for storing a flag indicating whether or not a set of coordinate data has been extracted. A "0" value is stored in the field 23 until the coordinate data is extracted therefrom. When the coordinate data is extracted from the field 23, a "1" value is stored in the field 23. Herein, "to extract coordinate data" means "to extract an X-coordinate and a Y-coordinate".

As shown in FIG. 4, the memory section 20 further includes a field 31 for storing X-coordinates and a field 32 for storing Y-coordinates.

Figure 5:
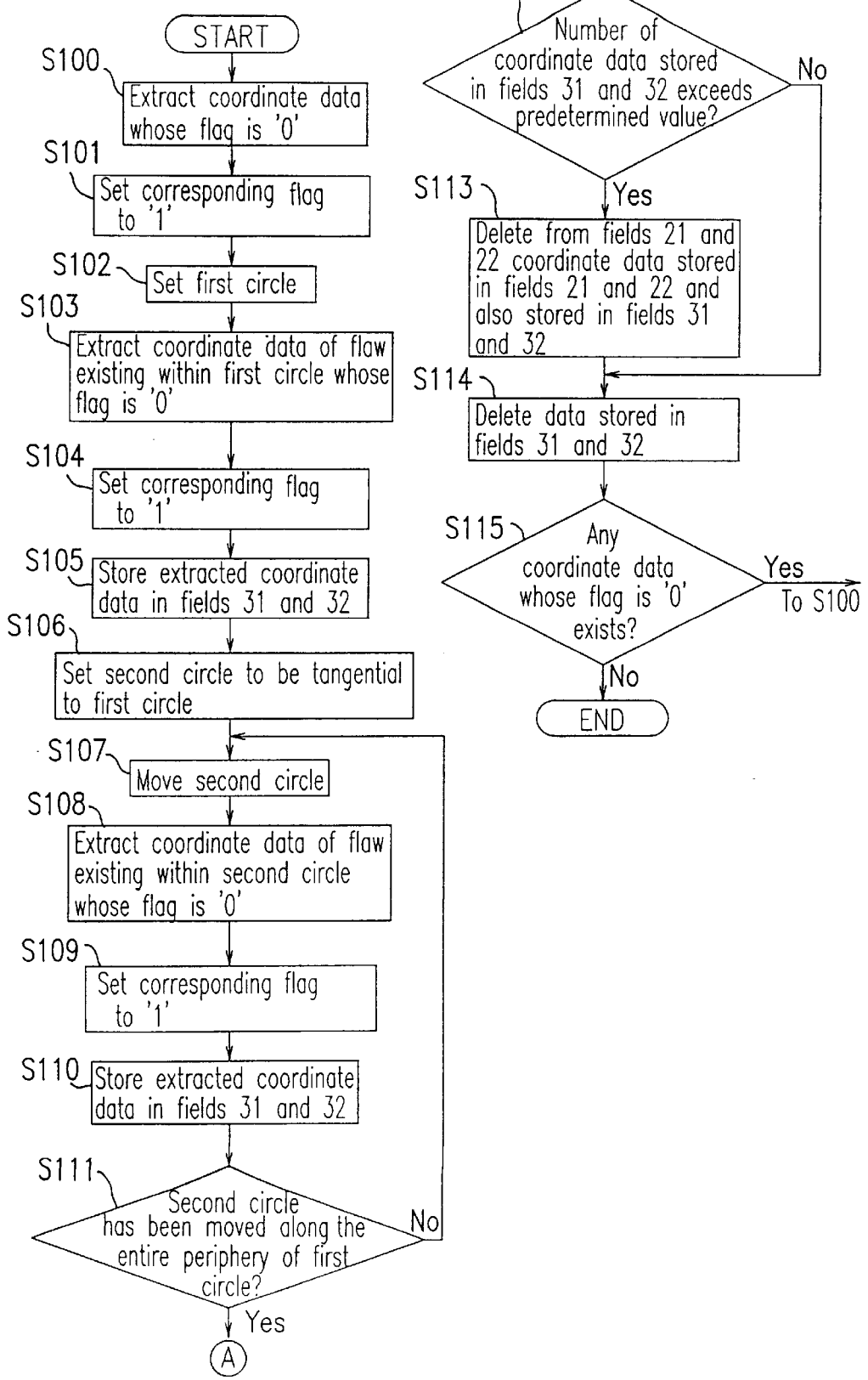
FIG. 5 is a flow chart showing the method for assessing the number and type of flaws according to Example 1 of the present invention.

FIG. 5 is a flow chart illustrating the procedures for assessing the number and type of flaws according to Example 1 of the present invention.

At step S100, the CPU 10 extracts an arbitrary set of coordinate data (m, n) out of the sets of coordinate data of flaws stored in the fields 21 and 22 of the memory section 20 whose flag is "0". The coordinate data of flaws is detected by the flaw detection device 5, and stored in the fields 21 and 22 of the memory section 20.

At step S101, the CPU 10 alters the flag which corresponds to the set of coordinate data (m, n) from "0" to "1".

At step S102, the CPU 10 sets a first circle with the center thereof being determined by the extracted set of coordinate data (m, n). The radius of the first circle is of a predetermined value, which, in the present example, is set to about 10 μm.

At step S103, the CPU 10 extracts from the memory section 20 a set of coordinate data of a flaw existing within the first circle whose flag is "0".

At step S104, the CPU 10 alters the flag of the set of coordinate data extracted at step S103 from "0" to "1".

At step S105, the CPU 10 stores the set of coordinate data extracted at step S103 in the fields 31 and 32 of the memory section 20, and executes step S106.

At step S106, the CPU 10 sets a second circle to be tangential to the first circle. The radius of the second circle is of a predetermined value, which, in the present example, is set to be about 10 μm.

At step S107, the CPU 10 successively moves the second circle tangentially along the periphery of the first circle by a certain angle θ so as to set other second circles which are tangential to the first circle and are equidistant from one another. In the present example, the second circle is moved clockwise tangentially along the periphery of the first circle by 1° as shown in FIG. 6. In order to accurately detect flaws existing around the first circle, it is desirable to set the angle 0 to be a small value.

At step S108, each time the second circle is moved tangentially along the periphery of the first circle by a certain angle, the CPU 10 extracts coordinate data of flaws existing within the second circle whose flag is "0". Specifically, the CPU 10 retrieves coordinate data stored in the memory section 20.

At step S109, the CPU 10 alters the flag of the set of coordinate data extracted at step S108 from "0" to "1".

At step S110, the CPU 10 stores the set of coordinate data extracted at step S108 in the fields 31 and 32 of the memory section 20, and executes step S111.

At step S111, the CPU 10 decides whether or not the second circle has been moved tangentially along the entire periphery of the first circle. At step S111, if the CPU 10 decides that the second circle has been moved tangentially along the entire periphery of the first circle, it executes step S112. If the CPU 10 decides that the second circle has not been moved tangentially along the entire periphery of the first circle, the CPU 10 executes step S107.

At step S112, the CPU 10 decides whether or not the number of data points stored in the fields 31 and 32 of the memory section 20 exceeds a predetermined value. If the number of the data points stored in the fields 31 and 32 exceeds the predetermined value, the flaws existing within a first and second circles are assessed to be either a scratch or scratches.

At step S112, if the number of the data points stored in the fields 31 and 32 exceeds the predetermined value, the CPU 10 executes step S113. At step S112, if the number of the data points stored in the fields 31 and 32 does not exceed the predetermined value, the CPU 10 executes step S114.

At step S113, the CPU 10 deletes from fields 21 and 22 the coordinate data stored in fields 21 and 22 of the memory section 20 and also stored in fields 31 and 32 of the memory section 20, and also deletes the corresponding flag stored in the field 23 of the memory section 20. Consequently, this operation deletes the coordinate data of scratches from fields 21 and 22 of the memory section 20.

At step S114, the CPU 10 deletes the coordinate data stored in fields 31 and 32 of the memory section 20.

At step S115, the CPU 10 decides whether or not any coordinate data whose flag is "0" exists. At step S115, if any coordinate data whose flag is "0" exists, the CPU 10 executes step S100. In other words, the procedures of steps S100 to S115 are repeated until no flag exists whose value which is stored in the field 23 is "0".

At step S115, if any coordinate data whose flag is "0" does not exist, the CPU 10 terminates the procedure.

According to the present example, the second circles are set by moving the second circle tangentially along the entire periphery of the first circle, and flaws existing within the second circles are extracted. This enables the present example to detect flaws even when they are clustered over the periphery of the first circle, thereby being inside and outside the first circle. Thus, it is possible to automatically delete the coordinate data of the clustered flaws from the coordinate data of all flaws detected by a flaw detection device.

In Example 1, a circle is incorporated for detecting clustered flaws. However, a similar effect can be achieved by incorporating, in place of a circle, other closed curves such as ellipses, polygons, and/or the like.

Hereinafter, a method for assessing the number and type of flaws according to Example 1, where first and second ellipses are incorporated in place of the first and second circles, will be described with reference to FIGS. 7A to 7C.

Figure 7A:
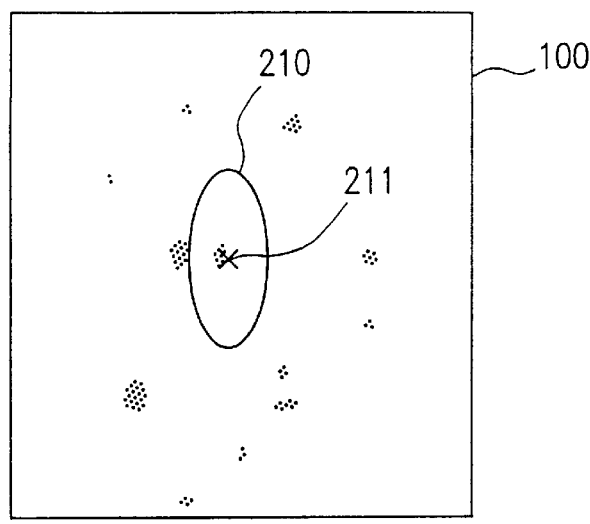
FIG. 7A is a diagram showing a plurality of flows and a first ellipse.
Figure 7B:
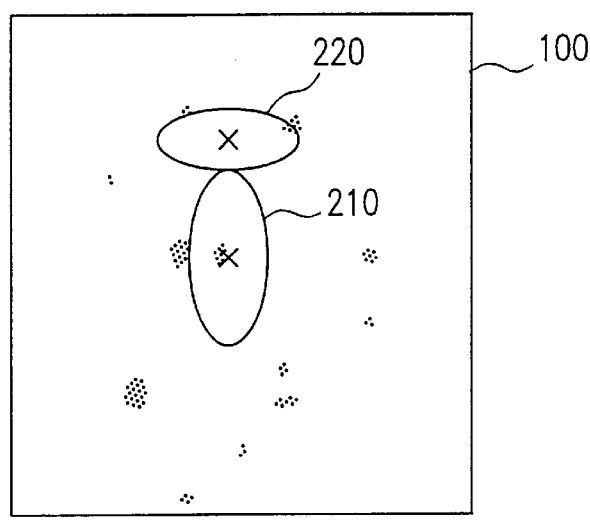
FIG. 7B is a diagram showing a plurality of flaws, a first ellipse, and a second ellipse tangential to the first ellipse.
Figure 7C:
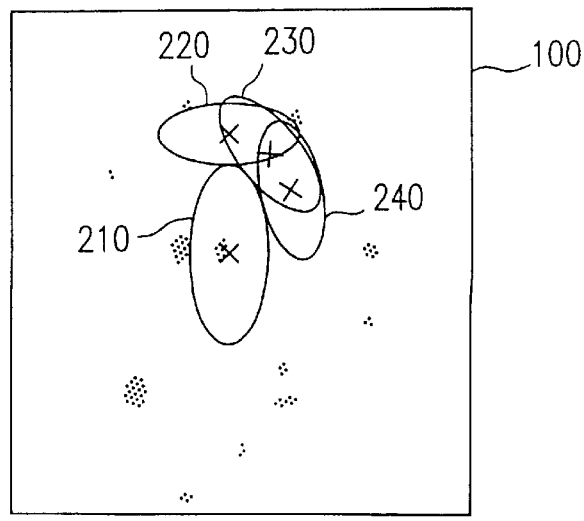
FIG. 7C is a diagram showing a plurality of flaws, a first ellipse, a second ellipse tangential to the first ellipse, and a plurality of other second ellipses set by moving the second ellipse tangentially along the periphery of the first ellipse.

FIGS. 7A to 7C show a region 100 on a semiconductor wafer where flaws are distributed. The positions of the flaws on the semiconductor wafer are detected in advance by a flaw detection device.

In FIG. 7A, a plurality of flaws and a first ellipse 210 (having a major axis a1 and a minor axis a2 with the center thereof being an arbitrary point 211) are shown within the region 100. The number of all flaws existing within the first ellipse 210 is counted. X1 is set to the number of the counted flaws. The arbitrary point 211 corresponds to a position of a preselected flaw in the region 100.

In FIG. 7B, a plurality of flaws and the first ellipse 210 and a second ellipse 220 (which has a major axis b1 and a minor axis b2 and is set to be tangential to the first ellipse 210) are shown within the region 100. Herein, the tangential line between the first ellipse 210 and the second ellipse 220 is orthogonal to the minor axis b2 of the second ellipse 220.

The number of all flaws existing within the second ellipse 220 is counted. X2 is set to the number of the counted flaws. In the present example, "flaws existing within a ellipse" include those on the periphery of the ellipse.

In FIG. 7C, a plurality of flaws, the first ellipse 210, the second ellipse 220 (which is set to be tangential to the first ellipse 210), and a plurality of other second ellipses 230 and 240 (each set by moving the second ellipse 220 by a certain angle θ tangentially along the periphery of the first ellipse 210 as seen in the figure) are shown within the region 100. The second ellipses are set by moving the second circle tangentially along the entire periphery of the first ellipse 210.

The number of all flaws existing within the second-ellipse 230 (set by moving the second ellipse 220 by a certain angle θ tangentially along the periphery of the first ellipse 210) which have not yet been counted is counted. X3 is set to the number of the counted flaws. Similarly, the number of all flaws existing within the second ellipse 240 (set to be tangential to the first ellipse 210) which have not yet been counted is counted. X4 is set to the number of the counted flaws. The total number SX2 of all flaws existing within the second ellipses set by moving the second ellipse 220 tangentially along the entire periphery of the first ellipse 210 counted with each of the flaws being counted only once becomes SX2=X2+X3+X4+ . . . .

In the case where the sum of the numbers X1 and SX2 exceeds a predetermined value, those flaws are regarded as being clustered and are assessed to be flaws from a scratch or scratches. Such an assessment is based on the fact that flaws from a scratch or scratches are unlikely to dispersedly exist within the region 100, but are much more likely to be clustered in a certain area within the region 100. On the other hand, flaws of particles are likely to dispersely exist within the region 100, and are unlikely to be clustered in a certain area within the region 100.

The number of clustered flaws (i.e., of a scratch or scratches) within the region 100 is counted by repeating the above procedures.

Hereinafter, another method for assessing the number and type of flaws according to Example 1, where first and second ellipses are incorporated in place of the first and second circles, will be described with reference to FIGS. 8A to 8C.

Figure 8A:
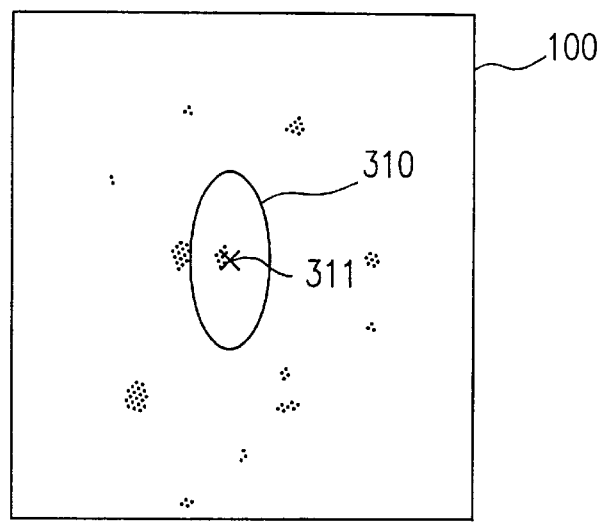
FIG. 8A is a diagram showing a plurality of flaws and a first ellipse.
Figure 8B:
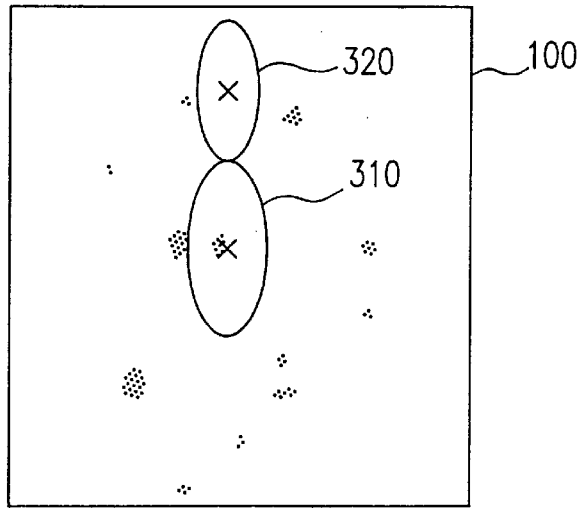
FIG. 8B is a diagram showing a plurality of flaws, a first ellipse, and a second ellipse tangential to the first ellipse.
Figure 8C:
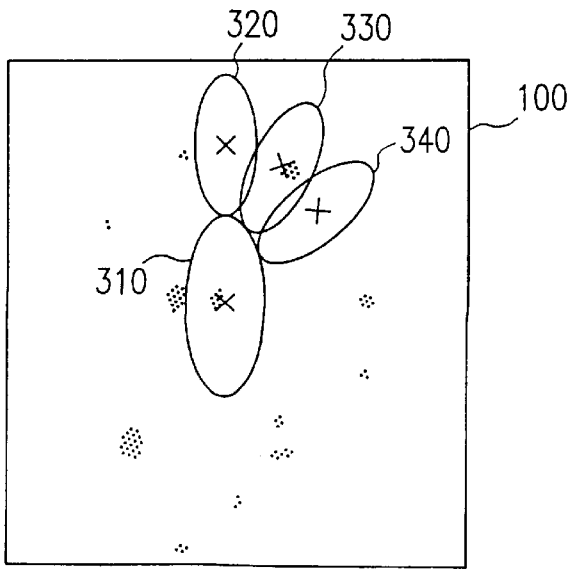
FIG. 8C is a diagram showing a plurality of flaws, a first ellipse, a second ellipse tangential to the first ellipse, and a plurality of other second ellipses set by moving the second ellipse tangentially along the periphery of the first ellipse.

FIGS. 8A to 8C show a region 100 on a semiconductor wafer where flaws are distributed. The positions of the flaws on the semiconductor wafer are detected in advance by a flaw detection device.

In FIG. 8A, a plurality of flaws and a first ellipse 310 (having a major axis a1 and a minor axis a2 with the center thereof being an arbitrary point 311) are shown within the region 100. The number of all flaws existing within the first ellipse 310 is counted. X1 is set to the number of the counted flaws. The arbitrary point 311 corresponds to a position of a preselected flaw in the region 100.

In FIG. 8B, a plurality of flaws and the first ellipse 310 and a second ellipse 320 (which has a major axis b1 and a minor axis b2 and is set to be tangential to the first ellipse 310) are shown within the region 100. Herein, the tangential line between the first ellipse 310 and the second ellipse 320 is orthogonal to the major axis b1 of the second ellipse 320.

The number of all flaws existing within the second ellipse 320 is counted. X2 is set to the number of the counted flaws. In the present example, "flaws existing within a ellipse" include those on the periphery of the ellipse. However, it is also applicable to count the number of flaws so as to exclude those on the periphery of the ellipse.

In FIG. 8C, a plurality of flaws, the first ellipse 310, the second ellipse 320 (which is set to be tangential to the first ellipse 310), and a plurality of other second ellipses 330 and 340 (each set by moving the second ellipse 320 by a certain angle θ tangentially along the periphery of the first ellipse 310 as seen in the figure) are shown within the region 100. The second ellipses are set by moving the second ellipse 320 tangentially along the entire periphery of the first ellipse 310.

The number of all flaws existing within the second ellipse 330 (set by moving the second ellipse 320 by a certain angle θ tangentially along the periphery of the first ellipse 310) which have not yet been counted is counted. X3 is set to the number of the counted flaws. Similarly, the number of all flaws existing within the second ellipse 340 (set to be tangential to the first ellipse 310) which have not yet been counted is counted. X4 is set to the number of the counted flaws. The total number SX2 of all flaws existing within the second ellipses set by moving the second ellipse 320 tangentially along the entire periphery of the first ellipse 310 counted with each of the flaws being counted only once becomes SX2=X2+X3+X4+ . . . .

In the case where the sum of the numbers X1 and SX2 exceeds a predetermined value, those flaws are regarded as being clustered and are assessed to be flaws from a scratch or scratches. Such an assessment is based on the fact that flaws from a scratch or scratches are unlikely to dispersedly exist within the region 100, but are much more likely to be clustered in a certain area within the region 100. On the other hand, flaws of particles are likely to dispersedly exist within the region 100, and are unlikely to be clustered in a certain area within the region 100.

The number of clustered flaws (i.e., of a scratch or scratches) within the region 100 is counted by repeating the above procedures.

Hereinafter, a method for assessing the number and type of flaws according to Example 1, where second ellipses are incorporated in place of the second circles, will be described with reference to FIG. 9.

Figure 9:
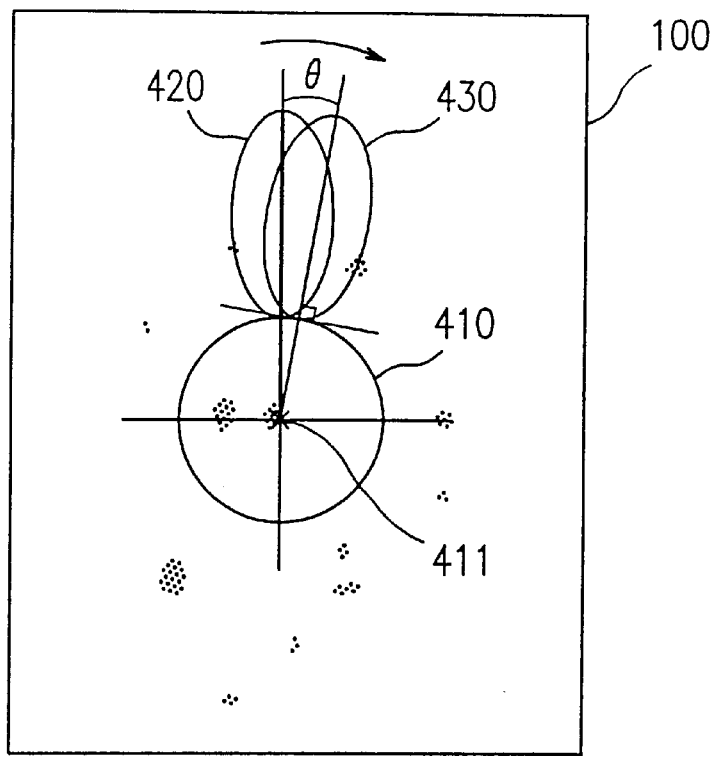
FIG. 9 is a diagram showing a plurality of flaws, a first circle, and second ellipses tangential to the first circle.

In FIG. 9, a plurality of flaws, a first circle 410 (having a radius a with the center thereof being an arbitrary point 411), and second ellipses 420 and 430 (which each has a major axis a1 and a minor axis a2 and are set to be tangential to the first circle 410) are shown in the region 100. The extension of the major axis of each of the second ellipses 420 and 430 passes over the center of the first circle 410. Herein, the tangential line between the first circle 410 and the second ellipse 420 is orthogonal to the major axis a1 of the second ellipse 420.

The number of all flaws existing within the first circle 410 is counted. X1 is set to the number of the counted flaws. The arbitrary point 411 corresponds to a position of a preselected flaw in the region 100.

The number of all flaws existing within the second ellipse 420 is counted. X2 is set to the number of the counted flaws.

The second ellipse 420 is moved clockwise tangentially along the periphery of the first circle by an angle θ as shown in FIG. 9. That is, the second ellipse is moved from the position of the ellipse 420 to the position of the ellipse 430. The number of all flaws existing within the second ellipse 430 (set by moving the second ellipse 420 by a certain angle θ tangentially along the periphery of the first circle 410) which have not yet been counted is counted. X2 is set to the number of the counted flaws.

Similarly, the second ellipse is moved by a predetermined angle θ tangentially along the entire periphery of the first circle, while counting the number of all flaws existing within the second circle which have not yet been counted. The total number SX2 of all flaws existing within the second ellipses set by moving the second ellipse 420 tangentially along the entire periphery of the first circle 410 counted with each of the flaws being counted only once becomes SX2=X2+X3+ . . . .

In the case where the sum of the numbers X1 and SX2 exceeds a predetermined value, those flaws are regarded as being clustered and are assessed to be flaws from a scratch or scratches.

The number of clustered flaws (i.e., of a scratch or scratches) within the region 100 is counted by repeating the above procedures.

Hereinafter, another method for assessing the number and type of flaws according to Example 1, where second ellipses are incorporated in place of the second circles, will be described with reference to FIG. 10.

Figure 10:
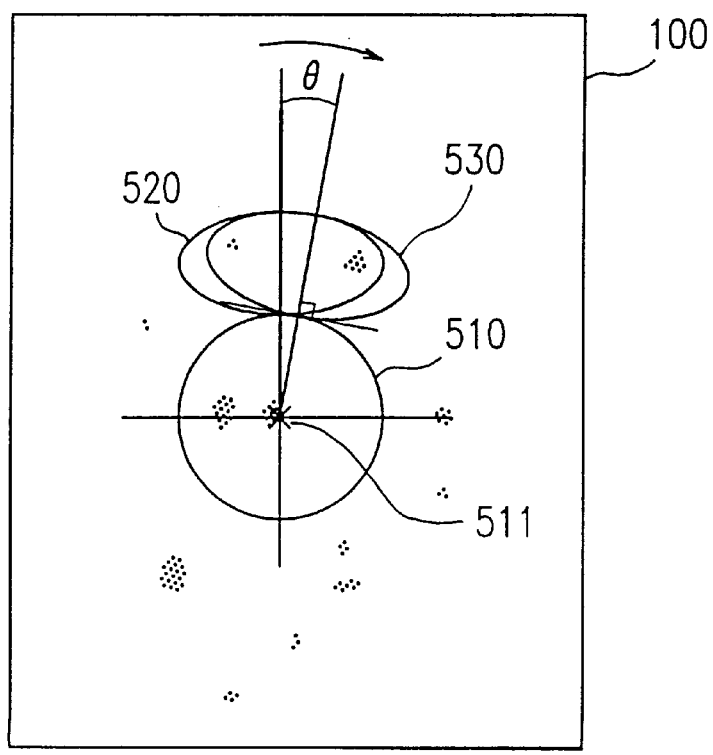
FIG. 10 is a diagram showing a plurality of flaws, a first circle, and second ellipses tangential to the first circle.

In FIG. 10, a plurality of flaws, a first circle 510 (having a radius a with the center thereof being an arbitrary point 511), and second ellipses 520 and 530 (each having a major axis a1 and a minor axis a2 and are set to be tangential to the first circle 510) are shown in the region 100. The extension of the minor axis of each of the second ellipses 520 and 530 passes over the center of the first circle 510. Herein, the tangential line between the first circle 510 and the second ellipse 520 is orthogonal to the minor axis a2 of the second ellipse 520.

The number of all flaws existing within the first circle 510 is counted. X1 is set to the number of the counted flaws. The arbitrary point 511 corresponds to a position of a preselected flaw in the region 100.

The number of all flaws existing within the second ellipse 520 is counted. X2 is set to the number of the counted flaws.

The second ellipse 520 is moved clockwise tangentially along the periphery of the first circle by an angle θ as shown in FIG. 10. That is, the second ellipse is moved from the position of the ellipse 520 to the position of the ellipse 530. The number of all flaws existing within the second ellipse 530 (set by moving the second ellipse 520 by a certain angle θ tangentially along the periphery of the first circle 510) which have not yet been counted is counted. X3 is set to the number of the counted flaws.

Similarly, the second ellipse is moved by a predetermined angle θ at a time tangentially along the entire periphery of the first circle, while counting the number of all flaws existing within the second circle which have not yet been counted. The total number SX2 of all flaws existing within the second ellipses set by moving the second ellipse 520 tangentially along the entire periphery of the first circle 510 counted with each of the flaws being counted only once becomes SX2=X2+X3+ . . . .

In the case where the sum of the numbers X1 and SX2 exceeds a predetermined value, those flaws are regarded as being clustered and are assessed to be flaws from a scratch or scratches.

The number of clustered flaws (i.e., of a scratch or scratches) within the region 100 is counted by repeating the above procedures.

Hereinafter, a method for assessing the number and type of flaws according to Example 1, where first and second squares are incorporated in place of the first and second circles, will be described with reference to FIGS. 11A to 11C.

Figure 11A:
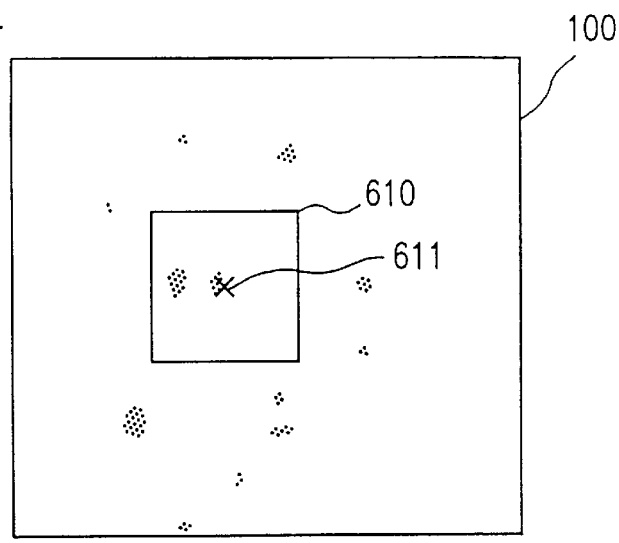
FIG. 11A is a diagram showing a plurality of flaws and a first square.
Figure 11B:
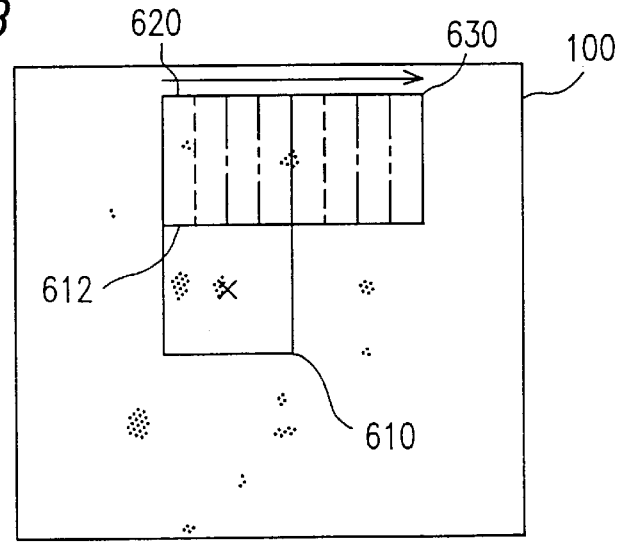
FIG. 11B is a diagram showing a plurality of flaws, a first square, and a second square moved tangentially along a side of the first square at regular intervals.
Figure 11C:
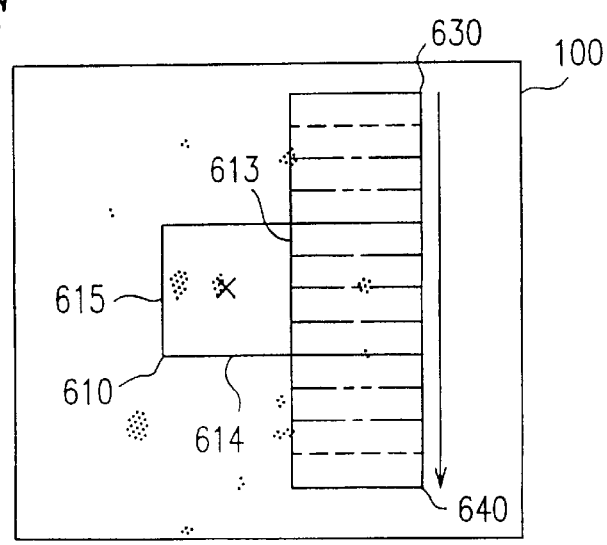
FIG. 11C is a diagram showing a plurality of flaws, a first square, and a second square moved tangentially along another side of the first square at regular intervals.

FIGS. 11A to 11C show a region 100 on a semiconductor wafer where the to flaws are distributed. The positions of the flaws on the semiconductor wafer are detected in advance by a flaw detection device.

In FIG. 11A, a plurality of flaws and a first square 610 with the center thereof being an arbitrary point 611 are shown within the region 100. The number of all flaws existing within the first square 610 is counted. X1 is set to the number of the counted flaws. The arbitrary point 611 corresponds to a position of a preselected flaw in the region 100.

In FIG. 11B, a plurality of flaws and the first square 610 and a second square 620 (which is moved at regular intervals tangentially along a side 612 of the first square 610) are shown within the region 100.

The second square is moved at regular intervals tangentially along the side 612 from the second square 620 to a second square 630, while counting the number of all flaws existing within the second square which have not yet been counted. X2 is set to the number of the counted flaws. In the present example, "flaws existing within a square" include those on the periphery of the square.

In FIG. 11C, a plurality of flaws, the first square 610, and the second square (which is moved at regular intervals tangentially along a side 613 of the first square 610) are shown within the region 100.

The second square is moved by a certain distance tangentially along the side 613 from the second square 630 to a second square 640, while counting the number of all flaws existing within the second square which have not yet been counted. X3 is set to the number of the counted flaws.

Similarly, the second square is moved at regular intervals tangentially along sides 614 and 615 of the first square 610, while counting the number of all flaws existing within the second square which have not yet been counted. X4 and X5 are set to the numbers of the counted flaws.

The total number SX2 of all flaws existing within the second squares (set by moving the second square 620 tangentially along the sides 612 to 615 of the first square 610) counted with each of the flaws being counted only once becomes SX2=X2+X3+X4+X5.

In the case where the sum of the numbers X1 and SX2 exceeds a predetermined value, those flaws are regarded as being clustered and are assessed to be flaws from a scratch or scratches.

The number of clustered flaws (i.e., of a scratch or scratches) within the region 100 is counted by repeating the above procedures.

Figure 12:
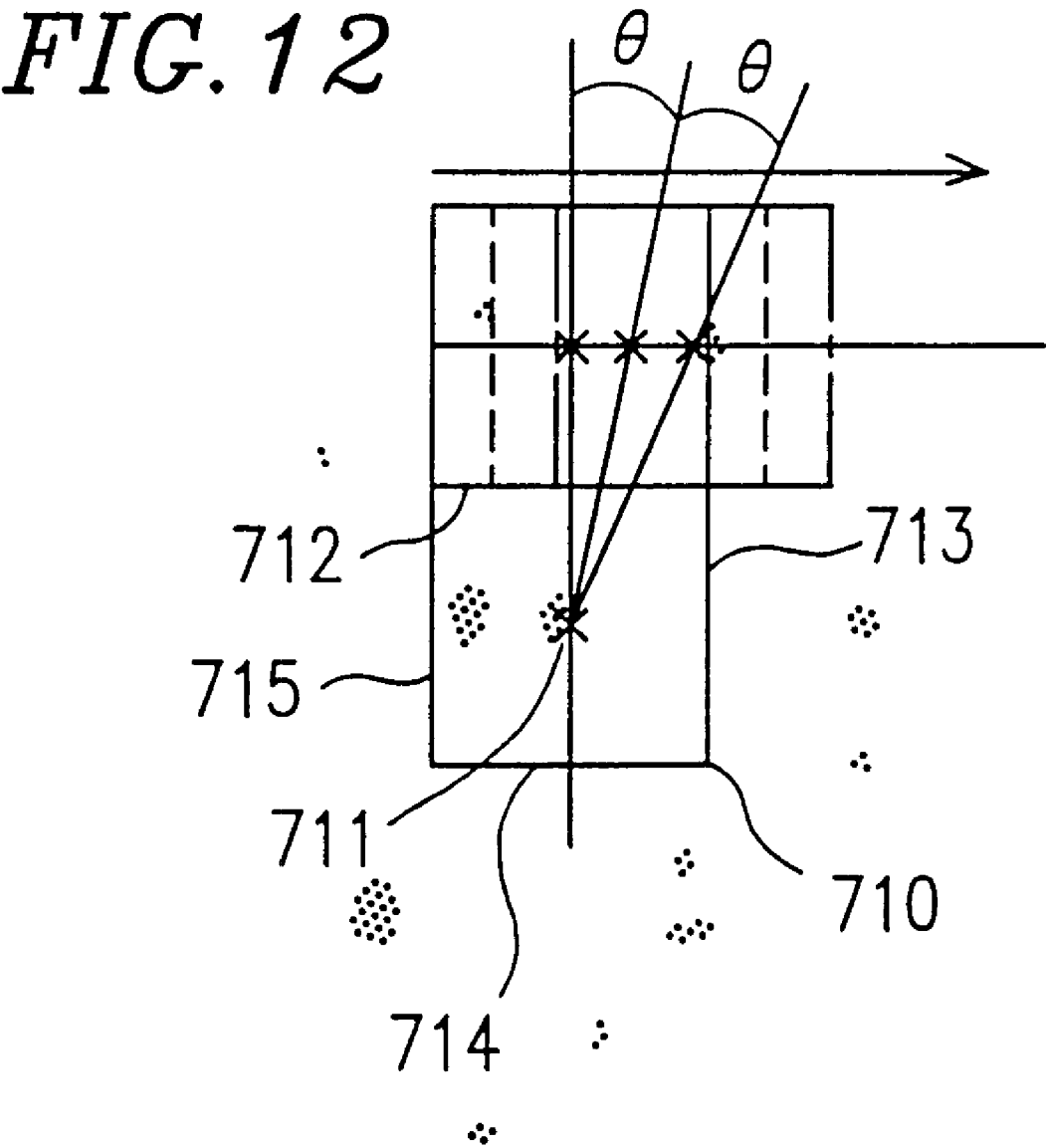
FIG. 12 is a diagram illustrating an example of how a second square is moved tangentially along a side of a first square.

Hereinafter, another method for assessing the number and type of flaws according to Example 1, where first and second squares are incorporated in place of the first and second circles, will be described with reference to FIG. 12.

According to the method described with reference to FIGS. 11A to 11C, the second square is moved at regular intervals tangentially along the periphery of the first square. On the other hand, according to another method for assessing the number and type of flaws where first and second squares are incorporated, the second square is moved by a certain angle θ tangentially along the periphery of the first square, but not by a certain distance. The angle θ is an angle formed by the line formed from the center of the first square to the center of the second square (before being moved) and the line formed from the center of the first square to the center of the second square (after being moved).

The second square is moved by an angle θ tangentially along sides 712 to 715 of the first square 710, while counting the number of all flaws existing within the second square which have not yet been counted.

In the case where the sum of the number of flaws existing within the first square and the number of flaws existing within the second squares exceeds a predetermined value, those flaws are regarded as being clustered and are assessed to be flaws from a scratch or scratches.

The number of clustered flaws (i.e., of a scratch or scratches) within the region 100 is counted by repeating the above procedures.

Hereinafter, a method for assessing the number and type of flaws according to Example 1, where first and second hexagons are incorporated in place of the first and second circles, will be described with reference to FIGS. 13A to 13C.

Figure 13A:
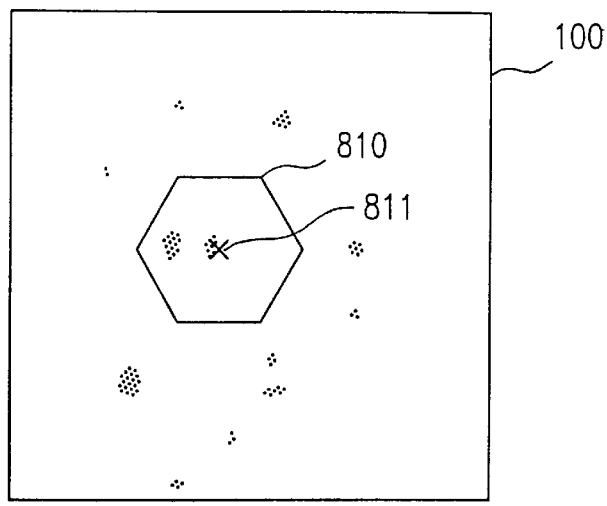
FIG. 13A is a diagram showing a plurality of flaws and a first hexagon.
Figure 13B:
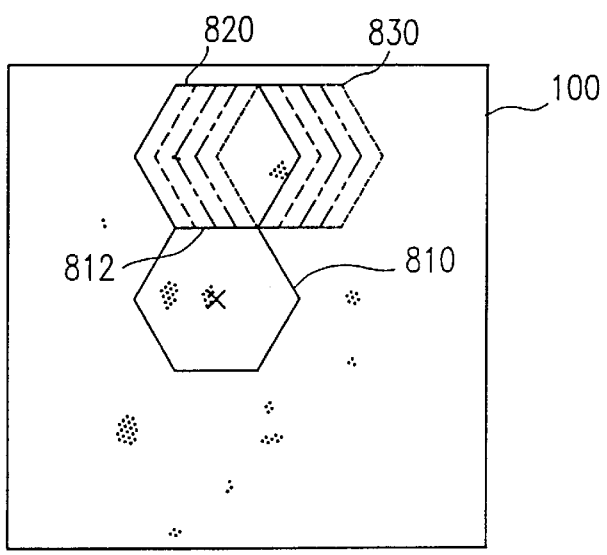
FIG. 13B is a diagram showing a plurality of flaws, a first hexagon, and a second hexagon moved tangentially along a side of the first hexagon at regular intervals.
Figure 13C:
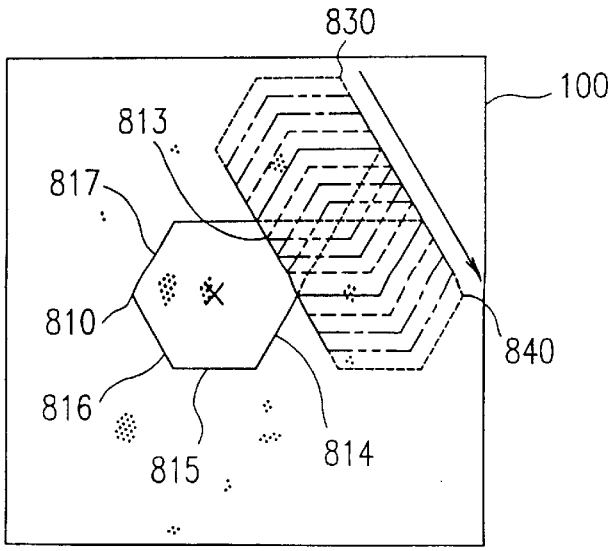
FIG. 13C is a diagram showing a plurality of flaws, a first hexagon, and a second hexagon moved tangentially along another side of the first hexagon at regular intervals.

FIGS. 13A to 13C show a region 100 on a semiconductor wafer where the flaws are distributed. The positions of the flaws on the semiconductor wafer are detected in advance by a flaw detection device.

In FIG. 13A, a plurality of flaws and a first hexagon 810 with the center thereof being an arbitrary point 811 are shown within the region 100. The number of all flaws existing within the first hexagon 810 is counted. X1 is set to the number of the counted flaws. The arbitrary point 811 corresponds to a position of a preselected flaw in the region 100. A flaw which has been counted is not counted again.

In FIG. 13B, a plurality of flaws and the first hexagon 810 and a second hexagon 820 (which is moved at regular intervals tangentially along a side 812 of the first hexagon 810) are shown within the region 100.

The second hexagon is moved by a certain distance tangentially along the side 812 from the second hexagon 820 to a second hexagon 830, while counting the number of all flaws existing within the second hexagon which have not yet been counted. X2 is set to the number of the counted flaws. In the present example, "flaws existing within a hexagon" include those on the periphery of the hexagon. However, it is also applicable to count the number of flaws so as to exclude those on the periphery of the hexagon.

In FIG. 13C, a plurality of flaws, the first hexagon 810, and the second hexagon (which is moved at regular intervals tangentially along a side 813 of the first hexagon 810) are shown within the region 100.

The second hexagon is moved by a certain distance tangentially along the side 813 from the second hexagon 830 to a second hexagon 840, while counting the number of all flaws existing within the second hexagon which have not yet been counted. X3 is set to the number of the counted flaws.

Similarly, the second hexagon is moved at regular intervals tangentially along sides 814 to 817 of the first hexagon 810, while counting the number of all flaws existing within the second hexagon which have not yet been counted. X4 to X7 are set to the numbers of the counted flaws.

The total number SX2 of all flaws existing within the second hexagons (set by moving the second hexagon 820 tangentially along the sides 812 to 817 of the first hexagon 810) counted with each of the flaws being counted only once becomes SX2=X2+X3+X4+X5+X6+X7.

In the case where the sum of the numbers X1 and SX2 exceeds a predetermined value, those flaws are regarded as being clustered and are assessed to be flaws from a scratch or scratches.

The number of clustered flaws (i.e., of a scratch or scratches) within the region 100 is counted by repeating the above procedures.

Figure 14:
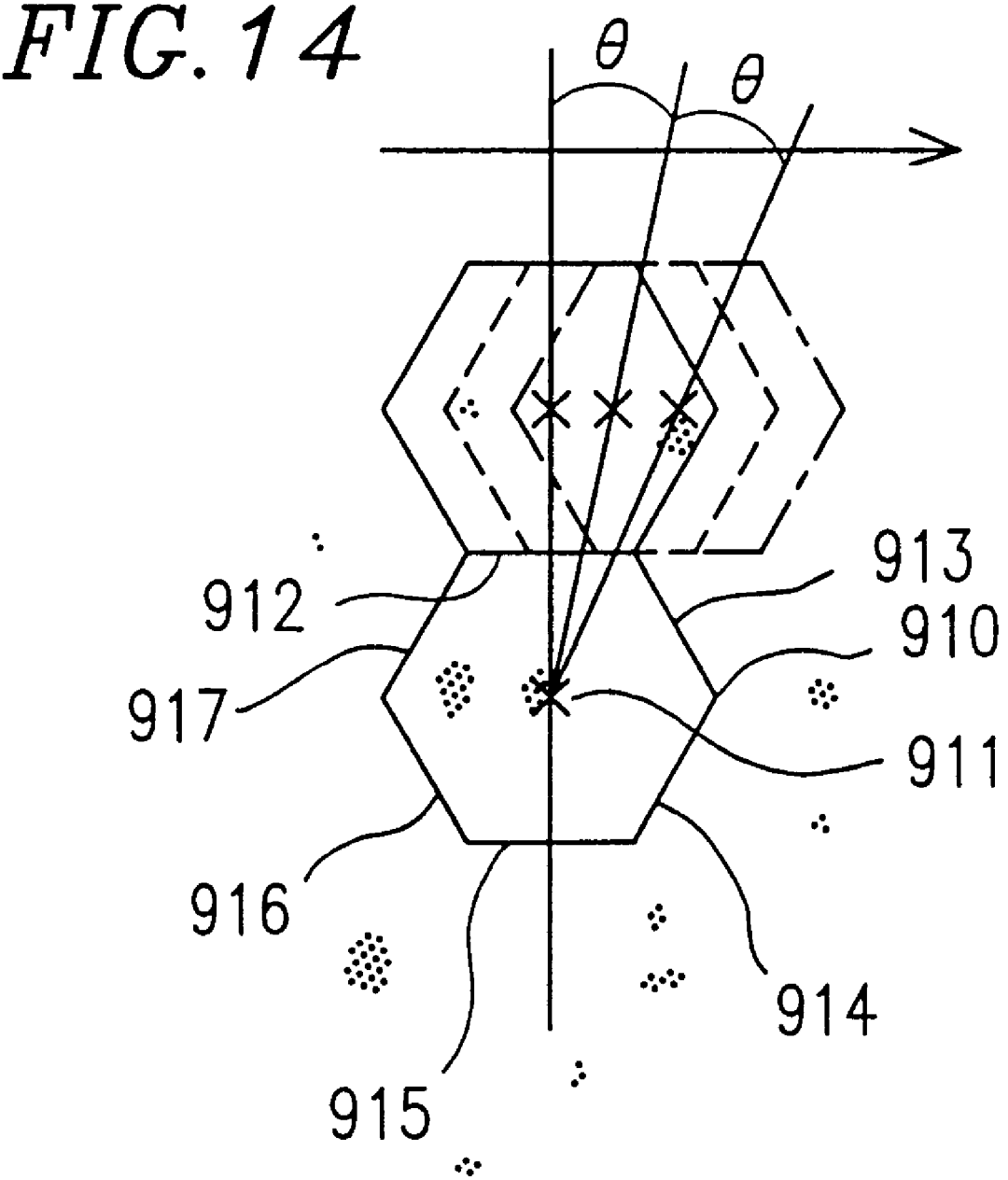
FIG. 14 is a diagram illustrating an example of how a second hexagon is moved tangentially along a side of a first hexagon.

Hereinafter, another method for assessing the number of type of flaws according to Example 1, where first and second hexagons are incorporated in place of the first and second circles, will be described with reference to FIG. 14.

According to the method described with reference to FIGS. 13A to 13C, the second hexagon is moved at regular intervals tangentially along the periphery of the first hexagon. On the other hand, according to another method for assessing the number and type of flaws where first and second hexagons are incorporated, the second hexagon is moved by a certain angle θ tangentially along the periphery of the first hexagon, but not by a certain distance. The angle θ is an angle formed by the line formed from the center of the first hexagon to the center of the second hexagon (before being moved) and the line formed from the center of the first hexagon to the center of the second hexagon (after being moved).

The second hexagon is moved by an angle θ tangentially along sides 912 to 917 of the first hexagon 910, while counting the number of all flaws existing within the second hexagon which have not yet been counted.

In the case where the sum of the number of flaws existing within the first hexagon and the number of flaws existing within the second hexagons exceeds a predetermined value, those flaws are regarded as being clustered and are assessed to be flaws from a scratch or scratches.

The number of clustered flaws (i.e., of a scratch or scratches) within the region 100 is counted by repeating the above procedures.

EXAMPLE 2

According to Example 1, a second circle, ellipse, or polygon is moved tangentially along the entire periphery of a first circle, ellipse, or polygon. On the other hand, according to Example 2 of the present invention, a second circle, ellipse, or polygon is moved along the periphery of a first circle, ellipse, or polygon while partially overlapping each other.

Hereinafter, a method for assessing the number and type of flaws according to Example 2 will be described with reference to FIG. 12.

Figure 15:
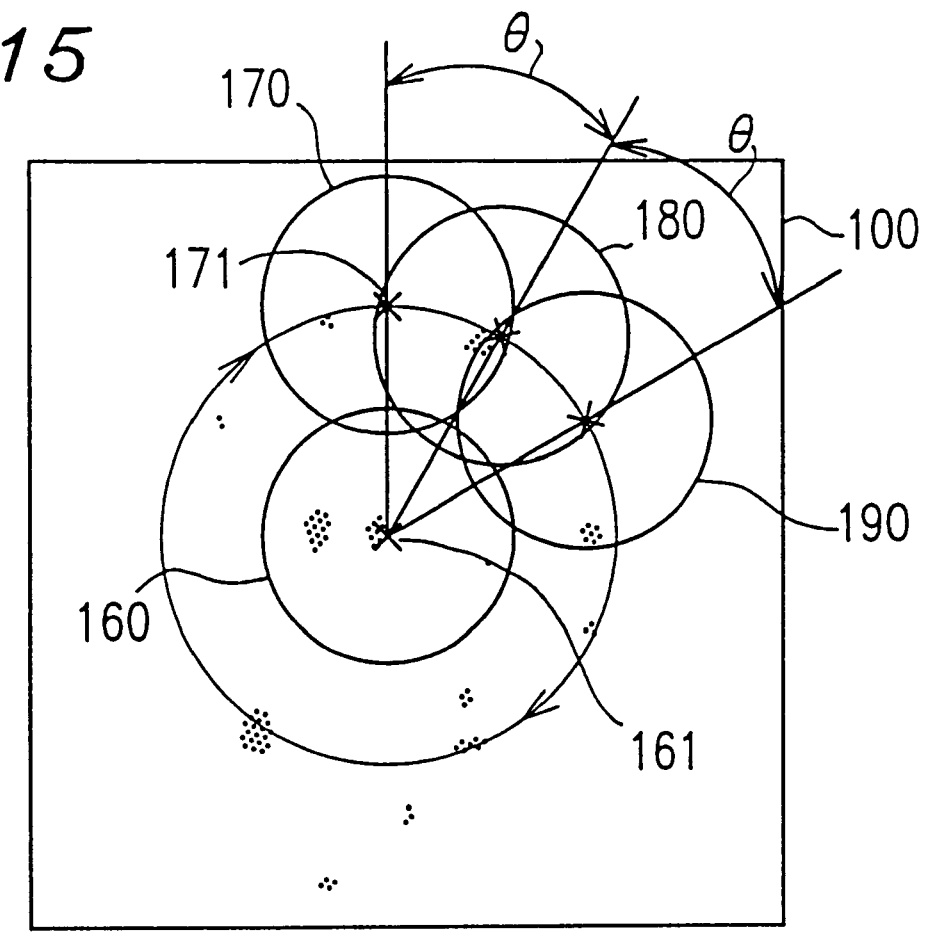
FIG. 15 is a diagram showing a plurality of flaws, a first circle, and a second circle moved along the periphery of the first circle partially overlapping each other.

In FIG. 15, a plurality of flaws, a first circle 160, a second circle 170 (which is set to overlap the first circle 160), and a plurality of second circles 180 and 190 (which are set by moving the second circle 170 along the periphery of the first circle 160 while partially overlapping each other) are shown in the region 100. The radius of the first circle 160 is set to be a with the center thereof being an arbitrary point 161, whereas the radiuses of the second circles 170, 180 and 190 are set to be b. The arbitrary point 161 corresponds to a position of a preselected flaw in the region 100.

The CPU 10 extracts an arbitrary set of coordinate data (m, n) out of sets of coordinate data of flaws stored in the fields 21 and 22 of the memory section 20 whose flag is "0". The coordinate data of flaws are obtained by the flaw detection device 5, and stored in the fields 21 and 22 of the memory section 20.

The CPU 10 alters the flag stored in the field 23 of the memory section 20 which corresponds to the set of coordinate data (m, n) from "0" to "1", and sets a first circle with the center thereof being determined by the extracted set of coordinate data (m, n).

As in Example 1, the number of all flaws existing within the first circle 160 is counted. X1 is set to the number of the counted flaws with each of the flaws being counted only once.

The second circle 170 is set so as to overlap the first circle 160. As in Example 1, the number of flaws existing within the second circle 170 which have not yet been counted is counted. Herein, it is also applicable to count the number of flaws which have not yet been counted and which exist within a portion of the first circle 160 and a portion of the second circle 170, excluding the first circle.

The second circle is moved by a predetermined angle θ along the periphery of the first circle 160 while partially overlapping each other. The number of flaws existing within the moved second circle which have not yet been counted is counted. Herein, it is also applicable to count the number of flaws which have not yet been counted and which exist within a portion of the first circle 160 and a portion of the moved second circle, excluding the first circle 160.

SX2 is set to the number of all flaws existing within the second circle (which is moved along the entire periphery of the first circle 160 while partially overlapping each other), whereby each of the flaws is counted only once.

In the case where the sum of the numbers X1 and SX2 exceeds a predetermined value, those flaws are regarded as being clustered and are assessed to be flaws from a scratch. Such an assessment is based on the fact that flaws from a scratch are unlikely to dispersedly exist within the region 100, but are much more likely to be clustered in a certain area within the region 100.

The number of clustered flaws (i.e., of a scratch) within the region 100 is counted by repeating the above procedures.

An exemplary device for assessing the number and type of flaws according to Example 2 is the same as the device shown in FIG. 2 and, therefore, will not be further described.

Figure 16:
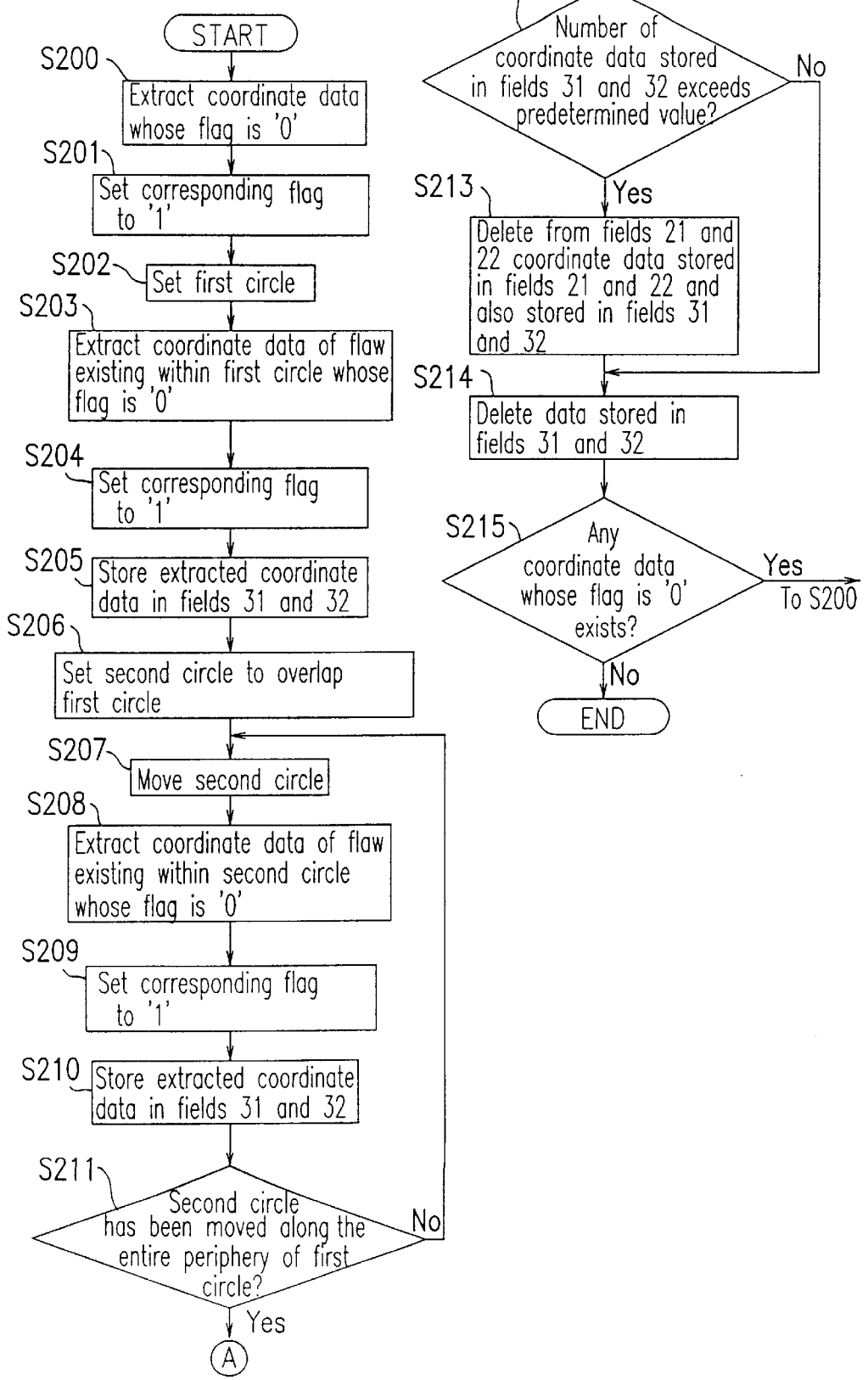
FIG. 16 is a flow chart showing a method for assessing the number and type of flaws according to Example 2 of the present invention.

FIG. 16 is a flow chart illustrating the procedures of the method for assessing the number and type of flaws according to Example 2 of the present invention.

At step S200, the CPU 10 extracts an arbitrary set of coordinate data (m, n) out of the sets of coordinate data of flaws stored in the fields 21 and 22 of the memory section 20 whose flag is "0". The coordinate data of flaws are obtained by the flaw detection device 5, and stored in the fields 21 and 22 of the memory section 20.

At step S201, the CPU 10 alters the flag stored in the field 23 of the memory section 20 which corresponds to the set of coordinate data (m, n) from "0" to "1".

At step S202, the CPU 10 sets a first circle with the center being determined by the extracted set of coordinate data (m, n). The radius of the first circle is of a predetermined value, which, in the present example, is set to be about 10 μm.

At step S203, the CPU 10 extracts from the memory section 20 a set of coordinate data of flaws existing within the first circle whose flag is "0".

At step S204, the CPU 10 alters the flag of the set of coordinate data extracted at step S203 from "0" to "1".

At step S205, the CPU 10 stores the set of coordinate data extracted at step S203 in the fields 31 and 32 of the memory section 20, and executes step S206.

At step S206, the CPU 10 sets a second circle so as to overlap the first circle. The radius of the second circle is of a predetermined value, which, in the present example, is set to be about 10 μm.

At step S207, the CPU 10 successively moves the second circle along the periphery of the first circle by a certain angle θ while overlapping each other so as to set other second circles which overlap the first circle and are equidistant from one another. In the present example, the second circle is moved clockwise along the periphery of the first circle by θ while overlapping each other as shown in FIG. 15. In order to detect flaws existing around the first circle with a high precision, it is desirable to set an angle θ to be small.

At step S208, each time the second circle is moved along the periphery of the first circle by a certain angle while overlapping each other, the CPU 10 extracts coordinate data of flaws existing within the second circle whose flag is "0". Specifically, the CPU 10 retrieves coordinate data stored in the memory section 20.

At step S209, the CPU 10 alters the flag of the set of coordinate data extracted at step S208 from "0" to "1".

At step S210, the CPU 10 stores the set of coordinate data extracted at step S208 in the fields 31 and 32 of the memory section 20, and executes step S211.

At step S211, the CPU determines if the second circle has been moved along the entire periphery of the first circle while overlapping each other. At step S211, if the CPU 10 determines that the second circle has been moved along the entire periphery of the first circle while overlapping each other, it executes step S212. If the CPU 10 determines that the second circle has not been moved along the entire periphery of the first circle while overlapping each other, the CPU executes step S207.

At step S212, the CPU 10 determines if the number of the data points stored in the fields 31 and 32 of the memory section 20 exceeds a predetermined value. If the number of the data points stored in the fields 31 and 32 exceeds the predetermined value, the flaws existing within the first and second circles are assessed to be flaws from a scratch.

At step S212, if the number of the data points stored in the fields 31 and 32 exceeds the predetermined value, the CPU 10 executes step S213. At step S212, if the number of the data points stored in the fields 31 and 32 does not exceed the predetermined value, the CPU 10 executes step S214.

At step S213, the CPU 10 deletes from the fields 21 and 22 the coordinate data stored in the fields 21 and 22 of the memory section 20 and also stored in the fields 31 and 32 of the memory section 20, and also deletes the corresponding flag stored in the field 22 of the memory section 20. Consequently, this operation deletes the coordinate data from a scratch from the fields 21 and 22 of the memory section 20.

At step S214, the CPU 10 deletes the coordinate data stored in the fields 31 and 32 of the memory section 20.

At step S215, the CPU 10 determines if any coordinate data whose flag is "0" exists. At step S215, if any coordinate data whose flag is "0" exists, the CPU 10 executes step S200. In other words, the procedures of steps S200 to S215 are repeated until no flag exists whose value which is stored in the field 23 is "0".

At step S215, if any coordinate data whose flag is "0" does not exist, the CPU 10 terminates the procedures.

In the method for assessing the number and type of flaws described with reference to FIG. 15, the second circle is preferably moved along the periphery of the first circle while partially overlapping each other, while satisfying the following conditions (1) to (3).

(1) The distance between a crossing point 162 (FIG. 17) and the center 161 of the first circle 160 is equal to or less than the radius a of the first circle 160.

Figure 17:
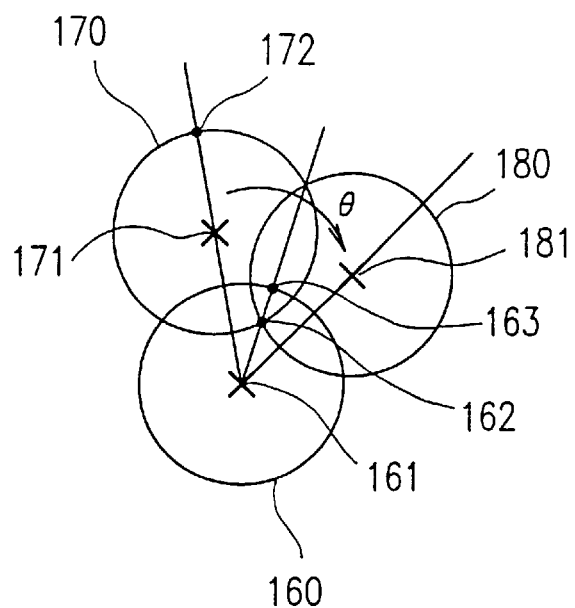
FIG. 17 is a diagram showing a plurality of flaws, a first circle, and a second circle moved along the periphery of the first circle while partially overlapping each other.

Herein, as shown in FIG. 17, the crossing point 162 is one of the crossing points of the second circle 170 and the moved second circle 180, which is closer to the center 161 of the first circle 160.

(2) The distance between a crossing point 172 and the center 161 of the circle 160 is greater than the radius a of the first circle 160.

Herein, as shown in FIG. 17, the crossing point 172 is one of the crossing points of the second circle 170 and a straight line defined by the center 161 of the first circle 160 and the center 171 of the second circle 170, which is farther from the center 161 of the first circle 160.

(3) The distance between the center 161 of the first circle 160 and the center 171 of the second circle 170 is kept constant.

According to the present example, the second circle is moved along the entire periphery of the first circle while partially overlapping each other, while extracting flaws existing within the second circle. This enables the present example to detect flaws even when they are clustered over the periphery of the first circle, thereby being inside and outside the first circle. Thus, it is possible to automatically delete the coordinate data of the clustered flaws from the coordinate data of all flaws detected by the flaw detection device.

In Example 2, a circle is incorporated for detecting clustered flaws. However, a similar effect can be achieved by incorporating, in place of a circle, other closed curves such as ellipses, polygons, and/or the like.

Hereinafter, a method for assessing the number and type of flaws according to Example 2, where the first and second ellipses are incorporated in place of the first and second circles, will be described with reference to FIG. 18.

Figure 18:
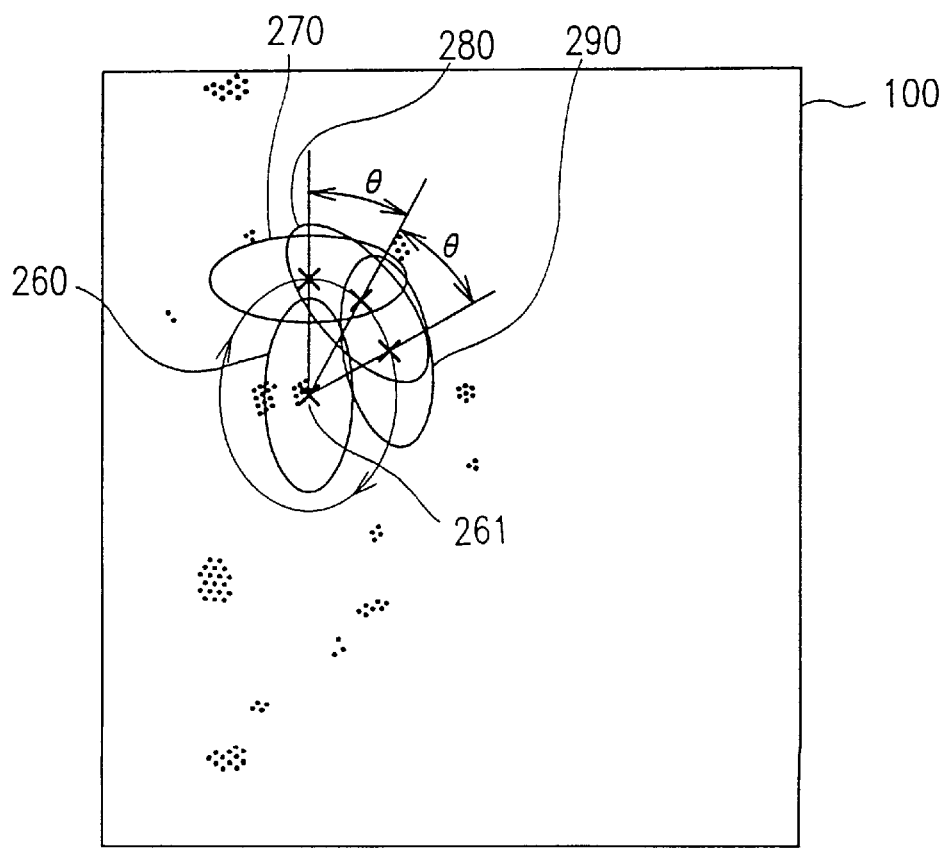
FIG. 18 is a diagram showing a plurality of flaws, a first ellipse, and a second ellipse moved along the periphery of the first ellipse while partially overlapping each other.

In FIG. 18, a plurality of flaws, a first ellipse 260, a second ellipse 270 (which is set to overlap the first ellipse 260), and a plurality of second ellipses 280 and 290 (which are set by moving the second ellipse 270 along the periphery of the first ellipse 260 so as to overlap each other) are shown in the region 100. The first ellipse 260 has a major axis a1 and a minor axis a2 with the center thereof being an arbitrary point 261. The arbitrary point 261 corresponds to a position of a flaw in the region 100. The second ellipse 270 has a major axis b1 and a minor axis b2.

The number of all flaws existing within the first ellipse 260 is counted. X1 is set to the number of the counted flaws with each of the flaws being counted only once.

The second ellipse 270 is set so as to overlap the first ellipse 260. As in Example 1, the number of flaws existing within the second ellipse 270 which have not yet been counted is counted. Herein, it is also applicable to count the number of flaws which have not yet been counted and which exist within a portion of the first ellipse 260 and a portion of the second ellipse 270, excluding the first ellipse 260.

The second ellipse is moved by a predetermined angle θ along the periphery of the first ellipse 260 while overlapping each other. The number of flaws existing within the moved second ellipse which have not yet been counted is counted. Herein, it is also applicable to count the number of flaws which have not yet been counted and which exist within a portion of the first ellipse 260 and a portion of the moved second ellipse, excluding the first ellipse 260.

SX2 is set to the number of all flaws existing within the second ellipse (which is moved along the entire periphery of the first ellipse 260 while overlapping each other) counted with each of the flaws being counted only once.

In the case where the sum of the numbers X1 and SX2 exceeds a predetermined value, those flaws are regarded as being clustered and are assessed to be flaws from a scratch or scratches. Such as assessment is based on the fact that flaws from a scratch are unlikely to dispersedly exist within the region 100, but are much more likely to be clustered in a certain area within the region 100.

The number of clustered flaws (i.e., of a scratch or scratches) within the region 100 is counted by repeating the above procedures.

Figure 19:
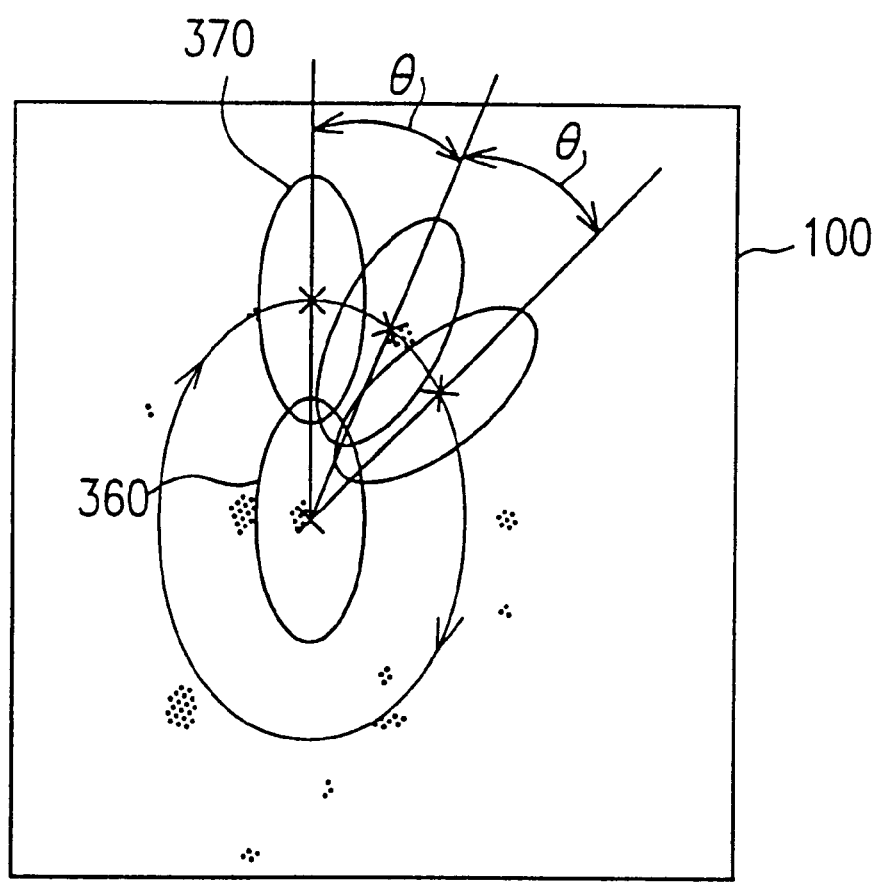
FIG. 19 is a diagram showing a plurality of flaws, a first ellipse, and a second ellipse moved along the periphery of the first ellipse while partially overlapping each other.

Herein, it is also applicable (for counting the number of flaws from a scratch) to move a second ellipse 370 by a certain angle θ along the periphery of a first ellipse 360 while overlapping each other as shown in FIG. 19.

In the method for assessing the number and type of flaws described with reference to FIGS. 18 and 19, it is preferable that the second circle be moved along the periphery of the first circle so as to overlap each other while satisfying the following conditions (4) to (7).

(4) The extension of the major axis or the minor axis of each of the second ellipses passes over the center of the first ellipse.

Figure 20:
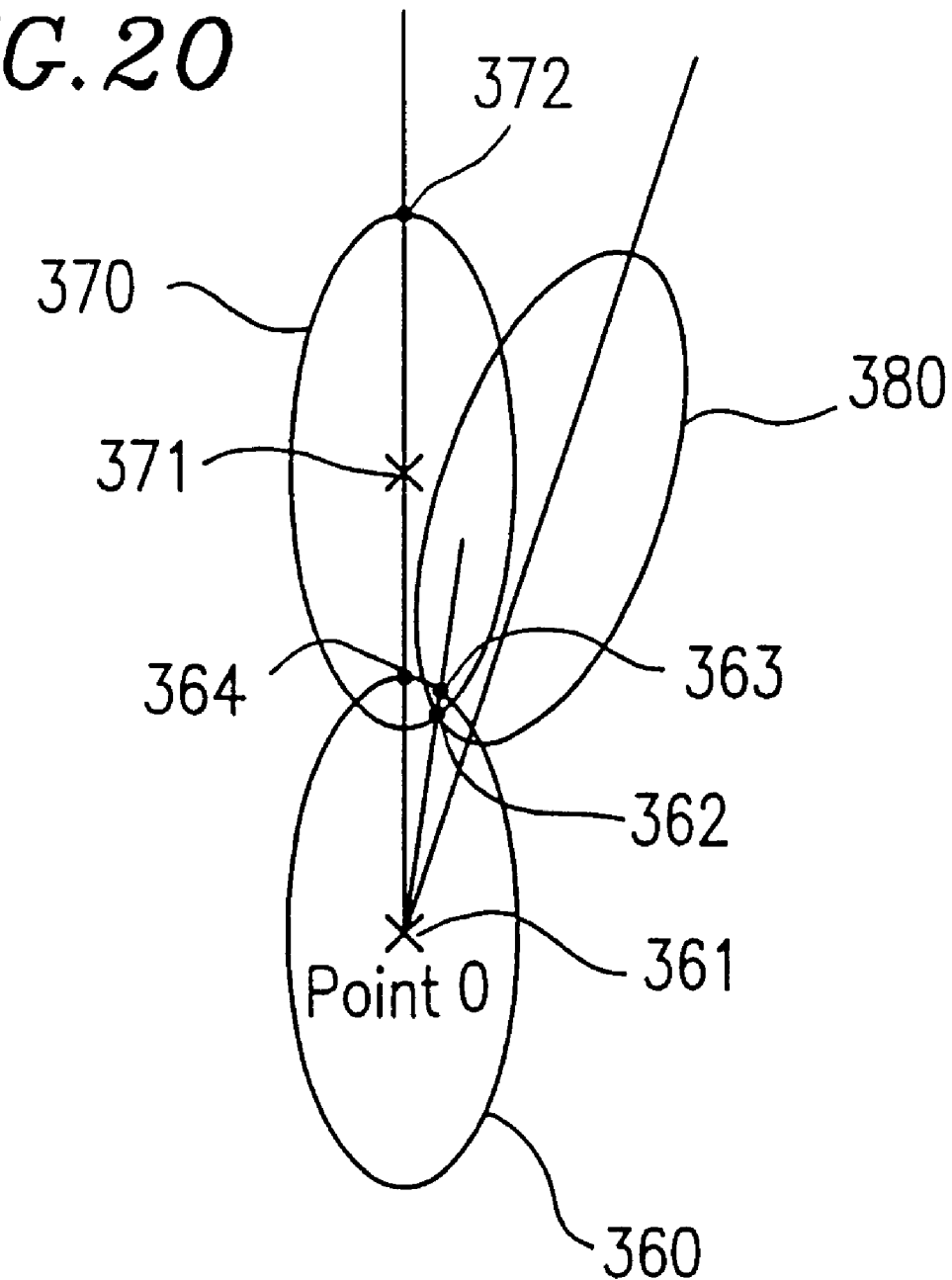
FIG. 20 is a diagram showing a plurality of flaws, a first ellipse, and a second ellipse moved along the periphery of the first ellipse while partially overlapping each other.

(5) As in FIG. 20, the distance between a crossing point 362 and the center 361 of the ellipse 360 is equal to or less than the distance between a crossing point 363 and the center 361 of the first ellipse 360.

Herein, the crossing point 362 is closer to the center 361 of the first ellipse 360, and is one of the crossing points of the second ellipse 370 and the moved second ellipse 380. The crossing point 363 is closer to the crossing point 362, and is one of the crossing points of the first ellipse 360 and a straight line defined by the center 361 of the first ellipse 360 and the crossing point 362.

(6) As in FIG. 20, the distance between a crossing point 372 and the center 361 of the first ellipse 360 is greater than the distance between a crossing point 364 and the center 361 of the first ellipse 360.

Herein, the crossing point 372 is farther from the center 361 of the first ellipse 360 and is one of the crossing points between the second ellipse 370 and a straight line defined by the center 361 of the first ellipse 360 and the center 371 of the second ellipse 370. The crossing point 364 is closer to the center 371 of the second ellipse 370 and is one of the crossing points of the first ellipse 360 and a straight line defined by the center 361 of the first ellipse 360 and the center 371 of the second ellipse 370.

(7) The trace of the center of the second ellipse while being moved along the periphery of the first ellipse is similar to the shape of the first ellipse.

Figure 21:
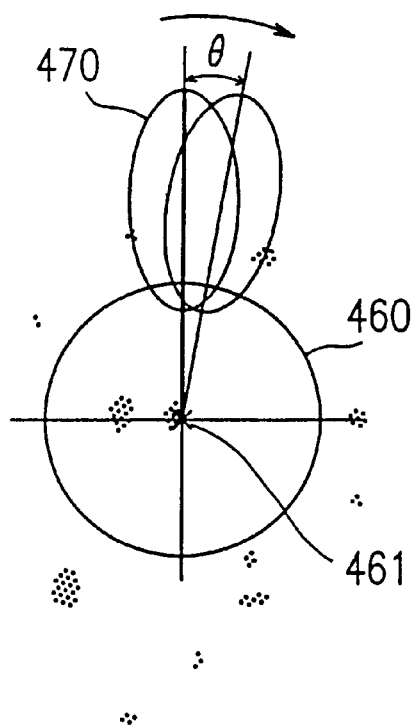
FIG. 21 is a diagram showing a plurality of flaws, a first circle, and a second ellipse moved along the periphery of the first circle while partially overlapping each other.

Herein, it is also applicable (for counting the number of flaws from a scratch) to move a second ellipse 470 by a certain angle θ along the periphery of a first circle 460 while overlapping each other as shown in FIG. 21. In this case, the extension of the major axis of the second ellipse 470 passes over the center 461 of the first circle 460.

Figure 22:
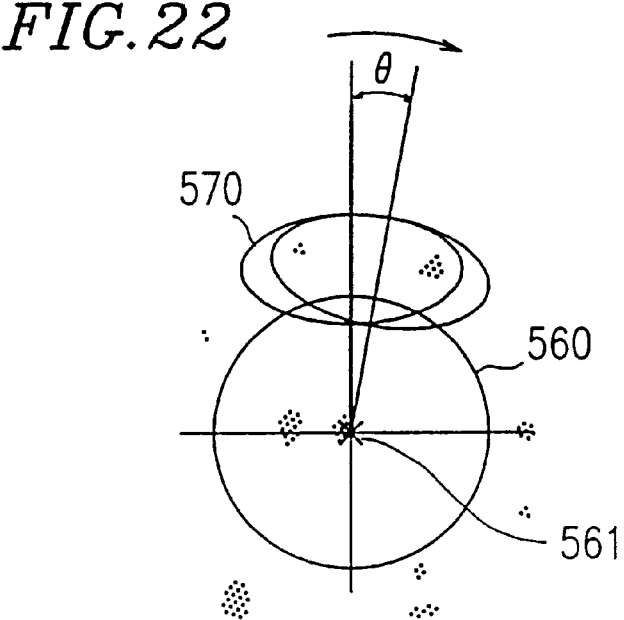
FIG. 22 is a diagram showing a plurality of flaws, a first circle, and a second ellipse moved along the periphery of the first circle while partially overlapping each other.

Moreover, it is also applicable (for counting the number of flaws from a scratch) to move a second ellipse 570 by a certain angle θ along the periphery of a first circle 560 while overlapping each other as shown in FIG. 22. In this case, the extension of the minor axis of the second ellipse 570 passes over the center 561 of the first circle 560.

Figure 23A:
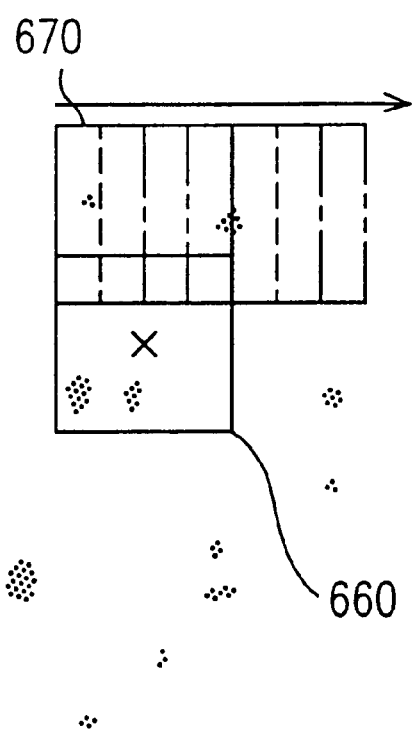
FIG. 23A is a diagram showing a plurality of flaws, a first square, and a second square moved along a side of the first square at regular intervals while partially overlapping each other.
Figure 23B:
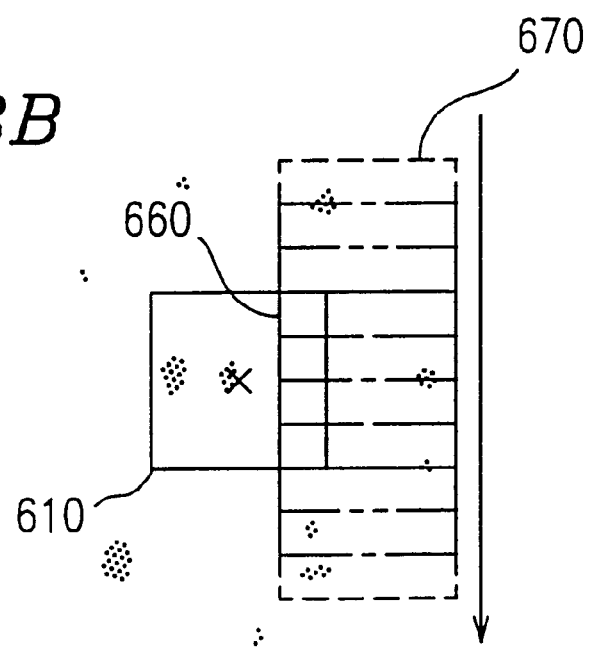
FIG. 23B is a diagram showing a plurality of flaws, a first square, and a second square moved along another side of the first square at regular intervals while partially overlapping each other.

Furthermore, it is also applicable (for counting the number of flaws from a scratch) to move a second square 670 at regular intervals along the periphery of a first square 660 while overlapping each other as shown in FIGS. 23A and 23B.

Figure 24:
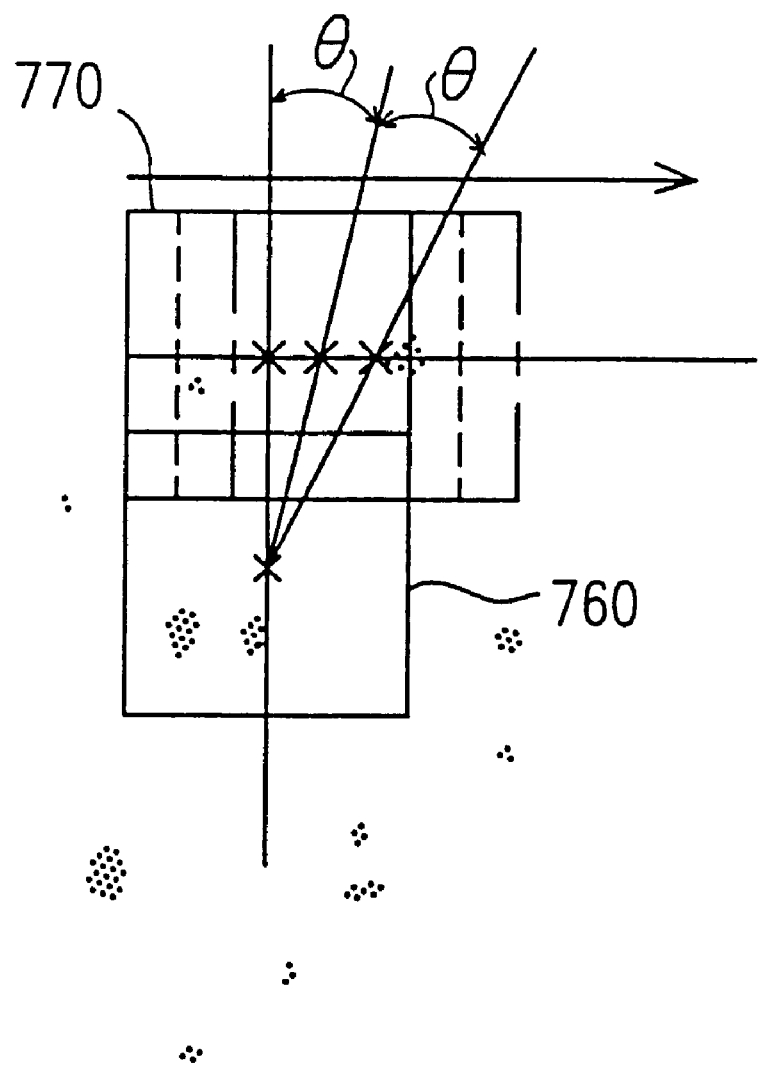
FIG. 24 is a diagram illustrating an example of how a second square is moved along a side of a first square while partially overlapping each other.

Furthermore, it is also applicable (for counting the number of flaws from a scratch) to move a second square 770 by a certain angle θ along the periphery of a first square 760 while overlapping each other as shown in FIG. 24. The angle θ is an angle formed by the line formed from the center of the first square 760 to the center of the second square (before being moved) and the line formed from the center of the first square 760 to the center of the second square (after being moved).

In the method for assessing the number and type of flaws described with reference to FIGS. 23A, 23B and 24, it is preferable that the second square be moved along the periphery of the first square so as to overlap each other satisfying the following conditions (8) to (10).

(8) A side of the first square is parallel to the corresponding side of the second square.

(9) The first square does not entirely include the second square.

(10) The distance between the extension of a side of the first square along which the second square is being moved and the extension of a side of the second square which is parallel to the side of the first square is kept constant.

Figure 25A:
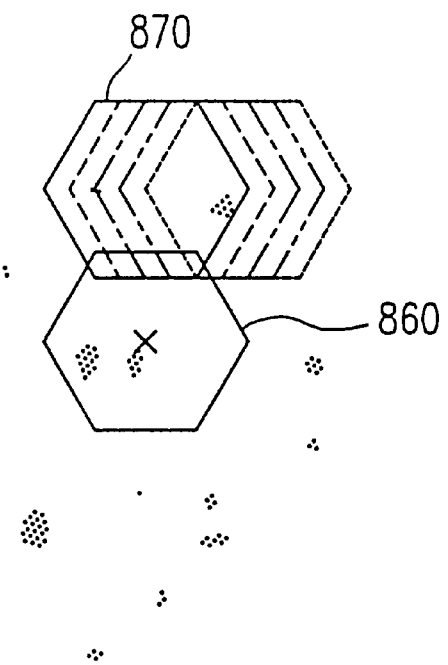
FIG. 25A is a diagram showing a plurality of flaws, a first hexagon, and a second hexagon moved along a side of the first hexagon at regular intervals while partially overlapping each other.
Figure 25B:
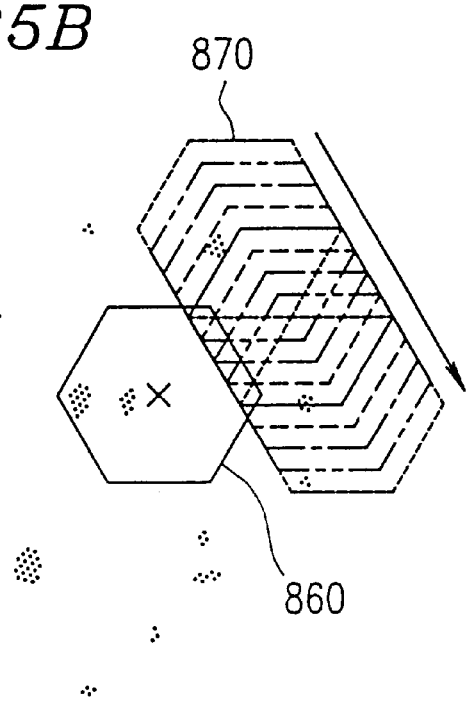
FIG. 25B is a diagram showing a plurality of flaws, a first hexagon, and a second hexagon moved along another side of the first hexagon at regular intervals while partially overlapping each other.

Herein, it is also applicable (for counting the number of flaws from a scratch) to move a second hexagon 870 at regular intervals along the periphery of a first hexagon 860 while overlapping each other as shown in FIGS. 25A and 25B.

Figure 26:
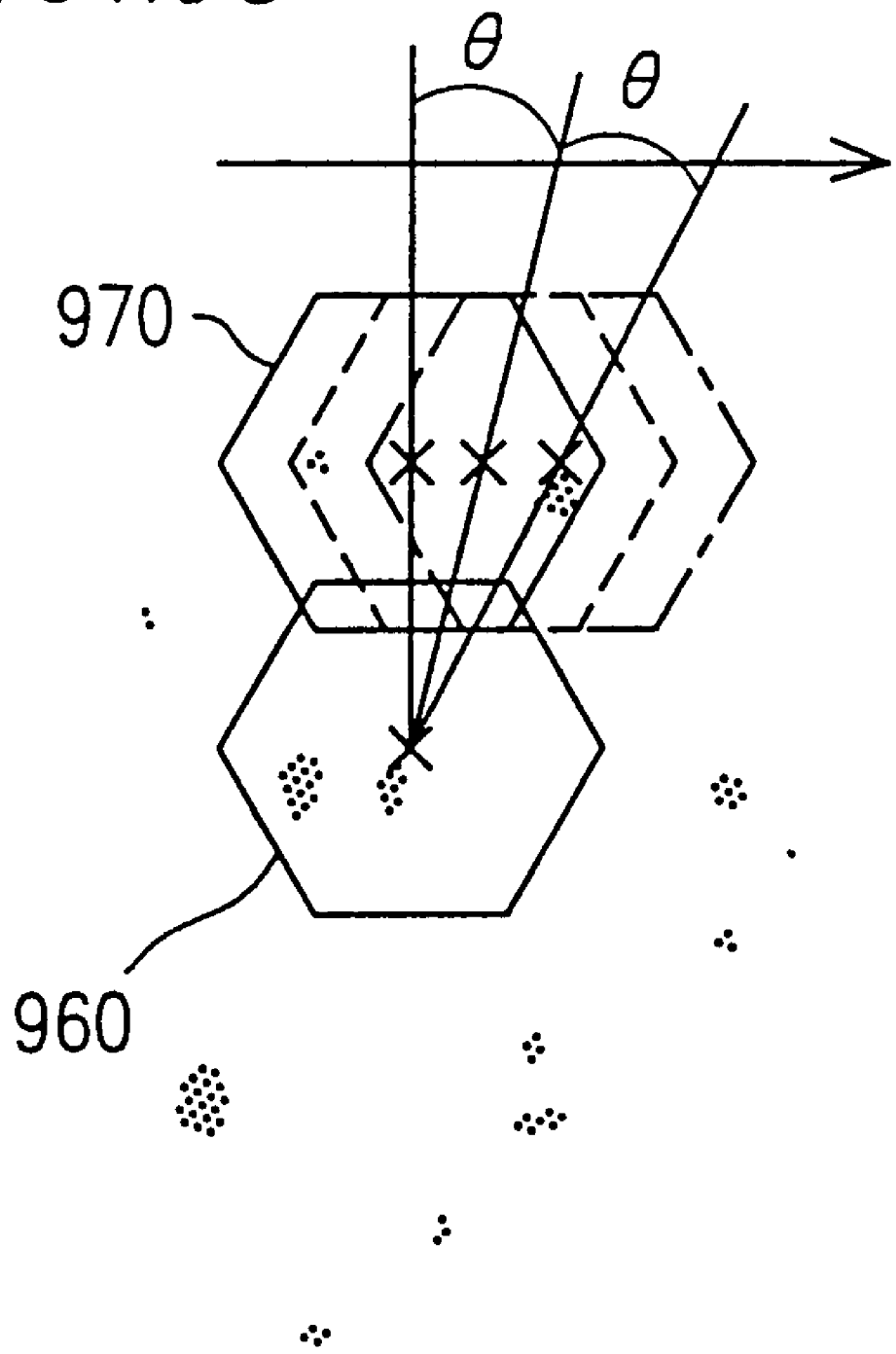
FIG. 26 is a diagram illustrating an example of how a second hexagon is moved along a side of a first hexagon while partially overlapping each other.

Moreover, it is also applicable (for counting the number of flaws from a scratch) to move a second hexagon 970 by a certain angle θ along the periphery of a first hexagon 960 while overlapping each other as shown in FIG. 26. Herein, the angle θ is an angle formed by the line formed from the center of the first hexagon 960 to the center of the second hexagon (before being moved) and the line formed from the center of the first hexagon 960 to the center of the second hexagon (after being moved).

EXAMPLE 3

According to Example 3 of the present invention, the sizes of the first and second circles, ellipses, and polygons are not fixed, but vary according to the concentration of flaws existing within the first and second circles, ellipses, and polygons. In other words, the greater the concentration of flaws, the larger the first and second circles, ellipses, and polygons, thereby allowing for the efficient detection of a scratch or scratches.

Figure 27:
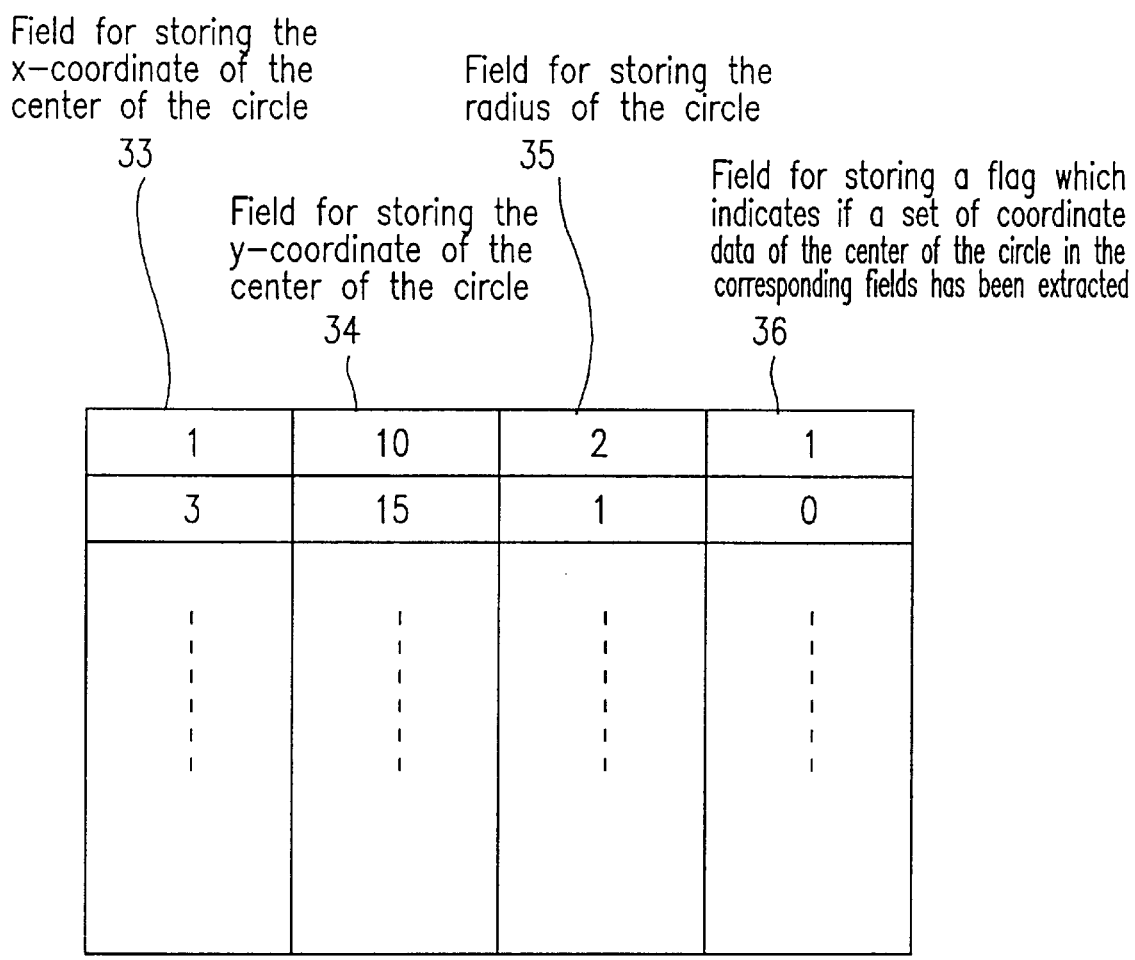
FIG. 27 a diagram showing fields provided in a memory section of the device shown in FIG. 2.

The device for assessing the number and type of flaws according to Example 3 is different from that of Example 1. Where the difference is in the recording format of data stored in the recording section 20. Specifically, the memory section 20 in the device of Example 3 has, as well as the fields 21 to 23 shown in FIG. 3, fields 33 to 36 shown in FIG. 27.

The field 33 stores X-coordinates; the field 34 stores Y-coordinates; the field 35 stores the radiuses of circles; and the filed 36 stores the values of the flags. The value of the flag remains "0" until the first circle is set with the center thereof being determined by an X-coordinate in the field 33 and a Y-coordinate in the field 34.

Hereinafter, the method for assessing the number and type of flaws according to Example 3 will be described with reference to FIG. 28.

Figure 28:
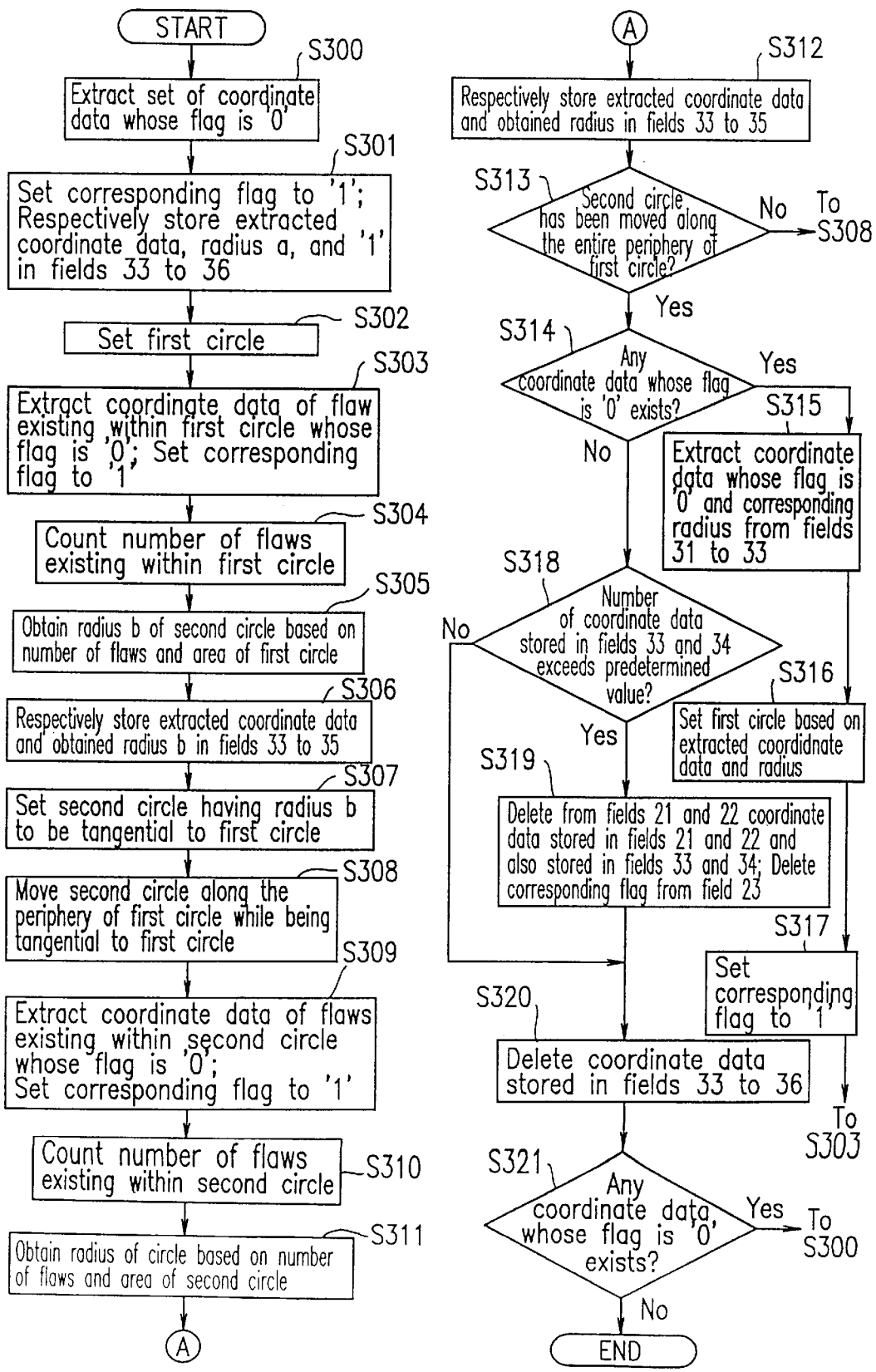
FIG. 28 is a flow chart showing a method for assessing the number and type of flaws according to Example 3 of the present invention.

FIG. 28 is a flow chart illustrating the method for assessing the number and type of flaws according to Example 3 of the present invention.

At step S300, the CPU 10 extracts an arbitrary set of coordinate data (m, n) out of sets of the coordinate data of flaws stored in the fields 21 and 22 of the memory section 20 whose flag is "0". The coordinate data of flaws are obtained by the flaw detection device 5, and stored in the fields 21 and 22 of the memory section 20.

At step S301, the CPU 10 alters the flag stored in the field 23 of the memory section 20 which corresponds to the set of coordinate data (m, n) from "0" to "1". Moreover, the CPU 10 stores the extracted set of coordinate data (m, n), a radius a, and "1" in fields 33 to 36, respectively. The radius a is of a predetermined value.

At step S302, the CPU 10 sets a first circle with the center thereof being determined by the extracted set of coordinate data (m, n).

At step S303, the CPU 10 extracts from the memory section 20 a set of coordinate data of a flaw existing within the first circle whose flag is "0". The CPU 10 alters the flag of the extracted set of coordinate data from "0" to "1".

At step S304, the CPU 10 counts the number of flaws existing within the first circle.

At step S305, the CPU 10 determines the radius b of the second circle based on the number of flaws counted at step S303 and the area of the first circle. Specifically, the radius b of the second circle is calculated based on the concentration of flaws existing within the first circle.

At step S306, the CPU 10 stores the set of coordinate data extracted at step S303 and the radius b determined at step S305 in the fields 33 to 35, respectively.

At step S307, the CPU 10 sets a second circle having the radius b determined at step S305 to be tangential to the first circle.

At step S308, the CPU 10 successively moves the second circle tangentially along the periphery of the first circle by a certain angle θ so as to set other second circles which are tangential to the first circle and are equidistant from one another. In the present example, the second circle is moved clockwise tangentially along the periphery of the first circle by 1°. In order to detect flaws existing around the first circle with a high precision, it is desirable to set the angle θ to be a small value.

At step S309, each time the second circle is moved tangentially along the periphery of the first circle by a certain angle, the CPU 10 extracts from the fields 21 and 22 the coordinate data of the flaws existing within the second circle whose flag is "0". The coordinate data is composed of X-coordinates and Y-coordinates stored in the fields 21 and 22, respectively. Moreover, the CPU 10 alters the flag of the extracted set of coordinate data from "0" to "1".

At step S310, the CPU 10 counts the number of flaws existing within the second circle.

At step S311, the CPU 10 determines the radius c of the next circle to be the first circle based on the number of flaws counted at step S310 and the area of the previous second circle. Specifically, the radius c of the next circle to be the first circle is calculated based on the concentration of flaws existing within the previous second circle.

At step S312, the CPU 10 stores the set of coordinate data extracted at step S309 and the radius c determined at step S311 in the fields 33 to 35, respectively.

At step S313, the CPU 10 determines if the second circle has been moved tangentially along the entire periphery of the first circle. At step S313, if the CPU 10 determines that the second circle has been moved tangentially along the entire periphery of the first circle, it executes step S314. If the CPU 10 determines that the second circle has not been moved tangentially along the entire periphery of the first circle, the CPU 10 executes step S308.

At step S314, the CPU 10 determines if any data point whose flag is "0" exists. At step S314, if any data point whose flag is "0" exists, the CPU 10 executes step S315. If any data point whose flag is "0" does not exist, the CPU 10 executes step S318.

At step S315, the CPU 10 extracts a set of coordinate data along with the corresponding radius whose flag is "0" from the fields 33 to 35.

At step S316, the CPU 10 sets another first circle based on the coordinate data and the radius extracted at step S315.

At step S317, the CPU 10 alters the flag of the set of coordinate data extracted at step S315, from "0" to "1".

At step S318, the CPU 10 determines if the number of the data points stored in the fields 33 and 34 of the memory section 20 exceeds a predetermined value. If the number of the data points stored in the fields 33 and 34 exceeds the predetermined value, the flaws existing within the first and second circles are assessed to be flaws from a scratch or scratches.

At step S318, if the number of the data points stored in the fields 33 and 34 exceeds the predetermined value, the CPU 10 executes step S319. At step S318, if the number of the data points stored in the fields 33 and 34 does not exceed the predetermined value, the CPU 10 executes step S320.

At step S319, the CPU 10 deletes from the fields 21 and 22 the coordinate data stored in the fields 21 and 22 of the memory section 20 and also stored in the fields 33 and 34 of the memory section 20, and also deletes the corresponding flag stored in the field 23 of the memory section 20. Consequently, this operation deletes the coordinate data of flaws from a scratch or scratches from the fields 21 and 22 of the memory section 20.

At step S320, the CPU 10 deletes the data stored in the fields 33 to 36 of the memory section 20.

At step S321, the CPU 10 determines if any data point whose flag is "0" exists. At step S321, if any coordinate data whose flag is "0" exists, the CPU 10 executes step S300. In other words, the procedures of steps S300 to S321 are repeated until no flag exists whose value which is stored in the field 23 is "0".

At step S321, if any data point whose flag is "0" does not exist, the CPU 10 terminates the procedures.

As described above, at steps S305 and S311, the radius of the next circle to be the first circle is calculated based on the number of flaws existing within the previous circle and the area of the previous circle. The radius of the next circle to be the first circle may similarly be calculated based on the relationship between the radius of the circle and the number of flaws existing within a unit area of the circle (see FIG. 29).

FIG. 29 shows the relationship between the radius of the circle and the number of flaws existing within a unit area of the circle.

In FIG. 29, the x-axis represents the number x of flaws existing within a unit area of the circle; and the y-axis represents the radius y of the circle. Herein, $\Delta y$ is a predetermined range of values. The curve shown in FIG. 29 is expressed by Expression (1) below.

$$y = a\{1 - exp(-bx)\} + c \quad (1)$$

Herein, a, b, and c are constants, where c is the minimum value of $\Delta y$, and a+c is the maximum value of $\Delta y$.

Alternatively, the radius of the circle may also be calculated based on one of the relationships (shown in FIGS. 30A to 30D) between the radius of the circle and the number of flaws existing within a unit area of the circle.

Figure 30A:
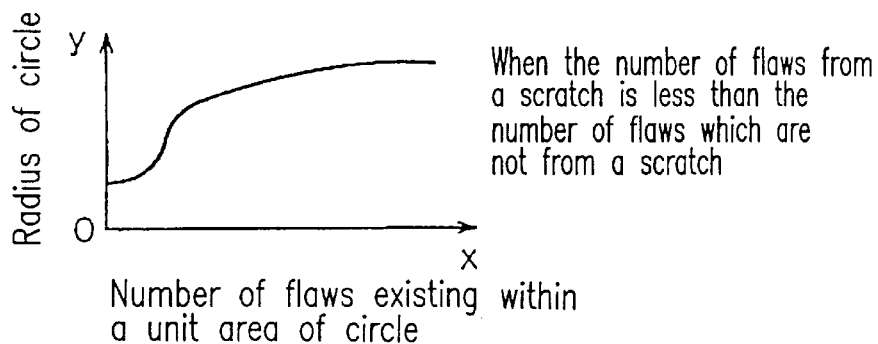
FIG. 30A is a graph illustrating a relationship between the radius of a circle and the number of flaws existing within a unit area of the circle, when the number of flaws from a scratch is less than the number of flaws which are not from a scratch.
Figure 30B:
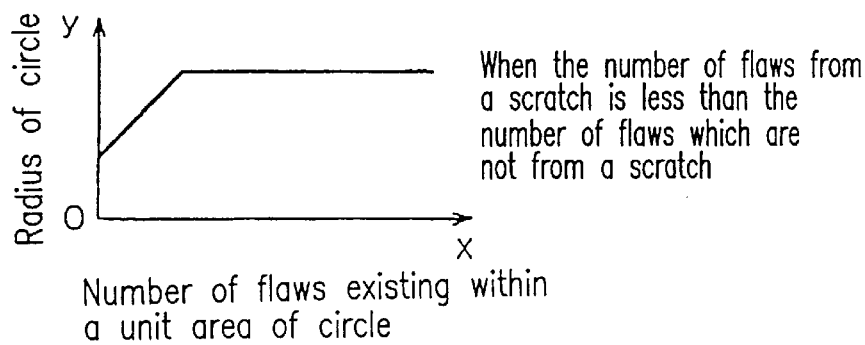
FIG. 30B is a graph illustrating the relationship shown in FIG. 30A with the line thereof being linearized.
Figure 30C:
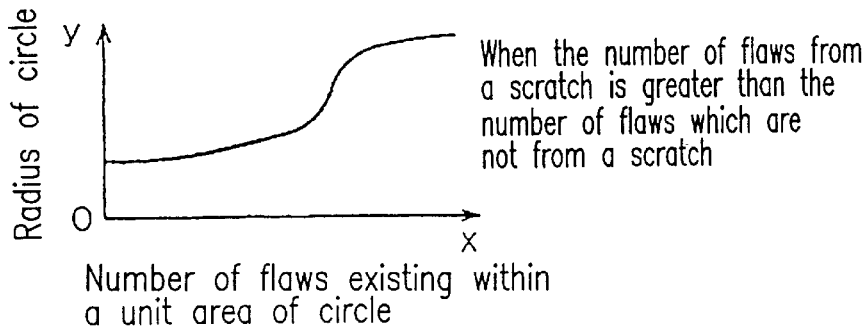
FIG. 30C is a graph illustrating a relationship between the radius of a circle and the number of flaws existing within a unit area of the circle, when the number of flaws from a scratch is greater than the number of flaws which are not from a scratch.
Figure 30D:
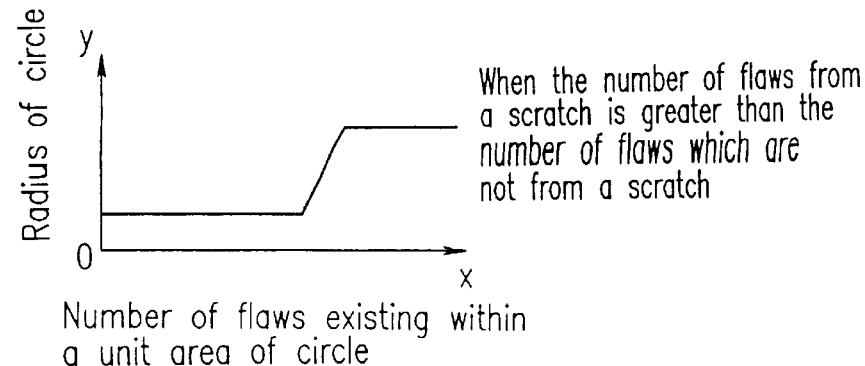
FIG. 30D is a graph illustrating the relationship shown in FIG. 30C with the line thereof being linearized.

FIG. 30A shows the relationship between the radius of a circle and the number of flaws existing within a unit area of the circle, when the number of flaws from a scratch is less than the number of flaws which are not of a scratch; FIG. 30B shows the relationship of FIG. 30A whose curve is linearly approximated; FIG. 30C shows the relationship between the radius of a circle and the number of flaws existing within a unit area of the circle, when the number of flaws from a scratch is greater than the number of flaws which are not of a scratch; and FIG. 30D shows the relationship of FIG. 30C whose curve is linearly approximated.

Hereinafter, the selection of one of the relationship shown in FIGS. 29 and 30A to 30D will be described.

The CPU 10 calculates the number of flaws from a scratch and flaws which are not of a scratch existing within a region (i.e., a circle and the like) based on one of the methods of the above-described Examples 1 to 3 and Examples 4 and 5 to be described below. The CPU 10 assigns P to the ratio of flaws from a scratch/not of a scratch.

Where the ratio P satisfies the condition P<0.5, the relationship shown in FIG. 30A or 30B is selected. The CPU 10 calculates the radius of the circle based on the relationship shown in FIG. 30A or 30B. In the case where the memory capacity of the memory section 20 is too small to store the relationship shown in FIG. 30A, the relationship shown in FIG. 30B is stored in the memory section 20.

Where the ration P satisfies the condition $0.5 \leq P \leq 1.5$, the relationship shown in FIG. 29 is selected. The CPU 10 calculates the radius of the circle based on the relationship shown in FIG. 29.

Where the ratio P satisfies a condition 1.5<P, the relationship shown in FIG. 30C or 30D is selected. The CPU 10 calculates the radius of the circle based on the relationship shown in FIG. 30C or 30D. In the case where the memory capacity of the memory section 20 is too small to store the relationship shown in FIG. 30C, the relationship shown in FIG. 30D is stored in the memory section 20.

According to the present example, the number of flaws is counted by using a first circle and second circles. As in Example 1, the present example may be modified so as to use a first ellipse or polygon and second ellipses or polygons, where the second ellipse or polygon is moved tangentially along the periphery of a first ellipse or polygon.

When using a second ellipse to be moved tangentially along the periphery of a first ellipse, the lengths of the major axis and the minor axis of the second ellipse are calculated based on the number of flaws existing within the first ellipse and the lengths of the major axis and the minor axis of the first ellipse.

When using a second square to be moved tangentially along the periphery of a first square, the length of a side of the second square is calculated based on the number of flaws existing within the first square and the length of the side of the first square.

When using a second hexagon to be moved tangentially along the periphery of a first hexagon, the length of a side of the second hexagon is calculated based on the number of flaws existing within the first hexagon and the length of the side of the first hexagon.

That is, when using a second equilateral polygon to be moved tangentially along the periphery of a first equilateral polygon, the length of a side of the second equilateral polygon is calculated based on the number of flaws existing within the first equilateral polygon and the length of the side of the first equilateral polygon.

In the present example, the number of flaws is counted by using a second circle, ellipse, or polygon to be moved tangentially along the periphery of a first circle, ellipse, or polygon. However, the present example may be modified so that the second circle, ellipse, or polygon is moved along the periphery of the first circle, ellipse, or polygon while partially overlapping each other.

In the case where a second circle is moved along the periphery of the first circle while overlapping each other, the length of the radius of the second circle is calculated based on the number of flaws existing within the first circle and the length of the radius of the first circle.

In the case where a second ellipse is moved along the periphery of the first ellipse while overlapping each other, the lengths of the major axis and the minor axis of the second ellipse are calculated based on the number of flaws existing within the first ellipse and the lengths of the major axis and the minor axis of the first ellipse.

In the case where a second square is moved along the periphery of the first square while overlapping each other, the length of the side of the second square is calculated based on the number of flaws existing within the first square and the length of the side of the first square.

In the case where a second hexagon is moved along the periphery of the first hexagon while overlapping each other, the length of the side of the second hexagon is calculated based on the number of flaws existing within the first hexagon and the length of the side of the first hexagon.

That is, in the case where a second equilateral polygon is moved along the periphery of the first equilateral polygon while overlapping each other, the length of the side of the second equilateral polygon is calculated based on the number of flaws existing within the first equilateral polygon and the length of the side of the first equilateral polygon.

Moreover, when using an ellipse, instead of storing the coordinate data of the center of a circle, the coordinate data of the two focal points of the ellipse may be stored; and, instead of storing the length of the radius of the circle, the lengths of the major axis and the minor axis of the ellipse may be stored in the memory section 20.

Furthermore, when using a closed curve other than a circle or an ellipse, instead of storing the coordinate data of the center of the circle (or the two focal points of the ellipse) and the radius of the circle (or the major axis and the minor axis of the ellipse), the coordinate data of points forming the closed curve may be stored in the memory section 20.

When using a polygon, instead of storing the coordinate data of the center of the circle (or the two focal points of the ellipse) and the radius of the circle (or the major axis and the minor axis of the ellipse), the coordinate data of the corners of the polygon may be stored in the memory section 20.

EXAMPLE 4

According to Example 4 of the present invention, the size of a second circle, ellipse, or polygon is not fixed, but varies according to the direction along which flaws are distributed within a first circle, ellipse, or polygon.

In accordance with Example 4, even when clustered flaws from a scratch are formed in a skipped pattern like a dashed line, flaws extending in a direction, along which flaws from a scratch are clustered, can be included within the second circle by enlarging the second circle which is located in the direction along which the flaws from a scratch are clustered.

Hereinafter, a method for assessing the number and type of flaws according to Example 4 of the present invention will be described with reference to FIG. 31.

Figure 31:
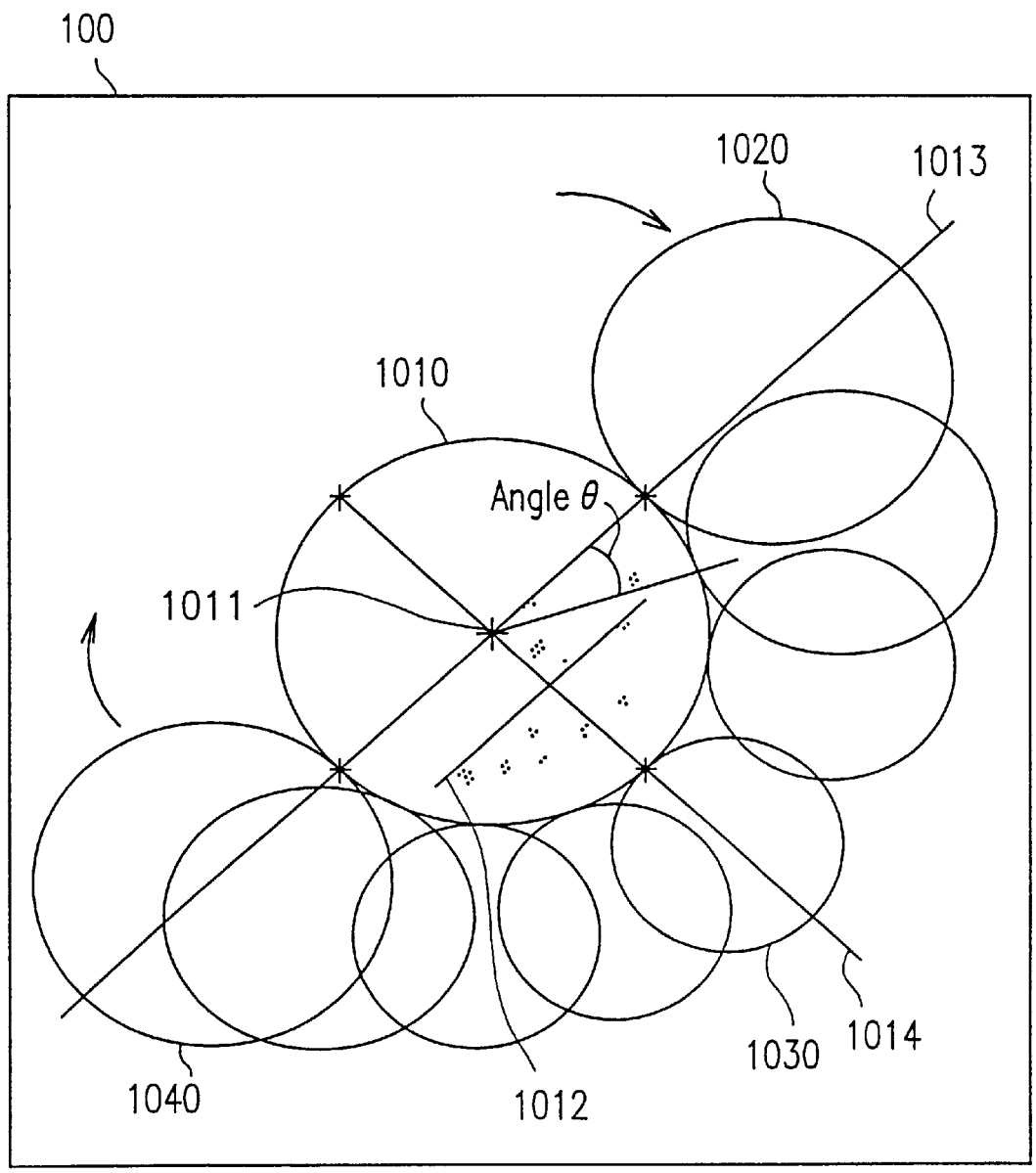
FIG. 31 is a diagram showing a plurality of flaws, a first circle, and a second circle moved tangentially along the periphery of the first circle while varying the radius thereof.

In FIG. 31, a plurality of flaws, a first circle 1010 (having a radius a with the center thereof being an arbitrary point 1011), and second circles 1020, 1030, 1040, . . . (which are set to be tangential to the first circle) are shown within the region 100.

The second circle is moved tangentially along the periphery of the first circle while varying the size thereof. As in Example 1, the number of flaws existing within the second circle which have not yet been counted is counted.

Hereinafter, the relationship between the position and the size of a second circle will be described.

The length of the radius of the second circle takes the maximum value b1 when the center of the second circle is on a straight line 1013. The straight line 1013 passes over the center 1011 of the first circle 1010, and is parallel to a regression straight line 1012. The regression straight line 1012 is calculated based on the coordinate data of all flaws existing within the first circle 1010. The regression straight line 1012 may also be calculated based on the least square method. The regression straight line 1012 represents the direction along which flaws are distributed.

The length of the radius of the second circle becomes monotonously shorter after the second circle is moved from the position 1020. The radius of the second circle takes the minimum value b2 when the center of the second circle is on a straight line 1014. The straight line 1014 is orthogonal to the straight line 1013, and passes over the center 1011 of the first circle 1010.

The length of the radius of the second circle becomes monotonously longer after the second circle is moved from the position 1030. As described above, the radius of the second circle takes the maximum value when the center of the second circle is on the straight line 1013.

Figure 32:
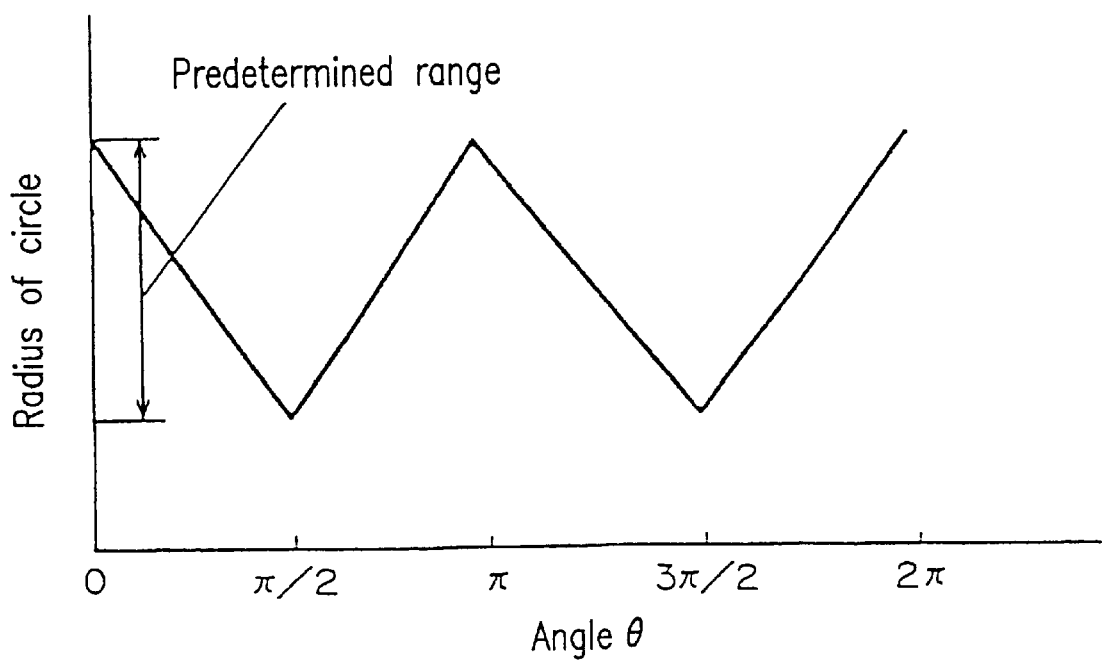
FIG. 32 is a graph illustrating a relationship between the radius of the second circle shown in FIG. 31 and an angle θ.

FIG. 32 shows the relationship between the radius of the second circle and an angle $\theta$.

The angle $\theta$ is an angle formed by the straight line 1013 and a straight line defined by the center of the first circle and the center of the second circle. In the present example, the radius of the second circle and the angle $\theta$ are in a certain proportion in each of ranges 0 to $\pi/2$, $\pi/2$ to $\pi$, $\pi$ to $3\pi/2$, or $3\pi/2$ to $2\pi$. The radius of the second circle varies within a predetermined range.

Figure 33:
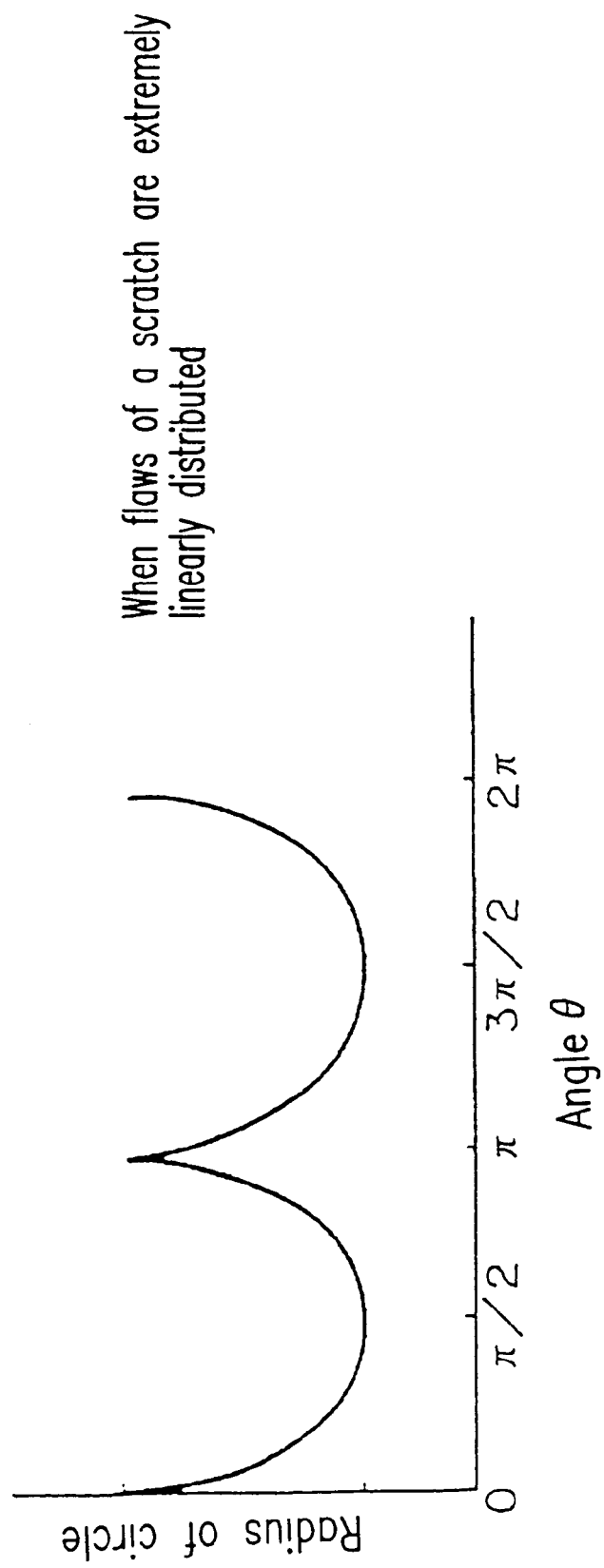
FIG. 33 is a graph illustrating a relationship between the radius of the second circle shown in FIG. 31 and an angle θ.
Figure 34:
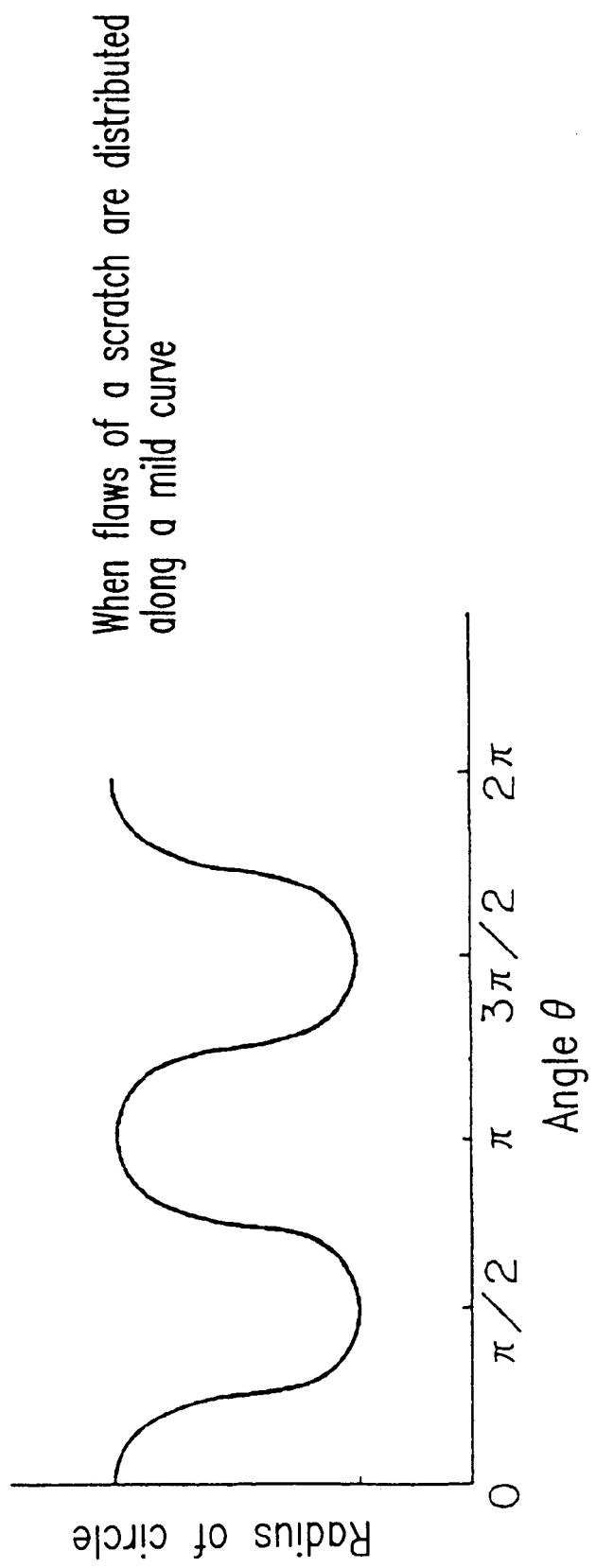
FIG. 34 is a graph illustrating a relationship between the radius of the second circle shown in FIG. 31 and an angle θ.

According to the present example, the radius of the second circle and the angle $\theta$ are in a certain proportion in each of the above ranges. However, the radius of the second circle may have an exponential relationship with respect to the angle $\theta$ in a certain range, as shown in FIGS. 33 and 34.

An exemplary device for assessing the number and type of flaws according to Example 4 is the same as the device shown in FIG. 2 and, therefore, will not be further described.

Hereinafter, the method for assessing the number and type of flaws according to Example 4 of the present invention will be described.

The method for assessing the number and type of flaws of Example 4 is different from those illustrated in the flow chart of FIG. 5 in that there are provided: additional steps for obtaining a direction along which flaws are distributed based on flaws existing within the first circle; and (in place of the steps for setting and moving second circles) steps for setting and moving a second circle whose radius is varied according to the direction along which flaws are distributed.

Hereinafter, the steps for obtaining a direction along which flaws are distributed based on flaws existing within the first circle will be described with reference to FIG. 35.

Figure 35:
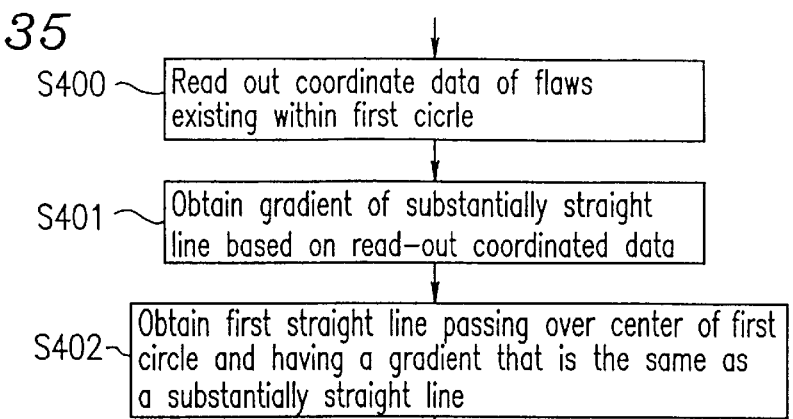
FIG. 35 shows steps for obtaining a direction along which flaws are distributed based on flaws existing within a first circle.

The steps for obtaining a direction along which flaws are distributed based on flaws existing within the first circle include steps S400 to S402 as shown in FIG. 35.

At step S400, the CPU 10 reads sets of coordinate data of flaws existing within the first circle from the fields 21 and 22.

At step S401, the CPU 10 calculates the gradient of a regression straight line based on the read coordinate data.

At step S402, the CPU 10 calculates a first straight line which passes over the center of the first circle and whose gradient is that of the regression straight line.

The procedures of steps S400 to S402 are executed between steps S103 and S104 or between steps S104 and S105 of the flow chart shown in FIG. 5.

Hereinafter, the steps for setting a second circle whose radius is varied according to the direction along which flaws are distributed will be described with reference to FIG. 36.

Figure 36:
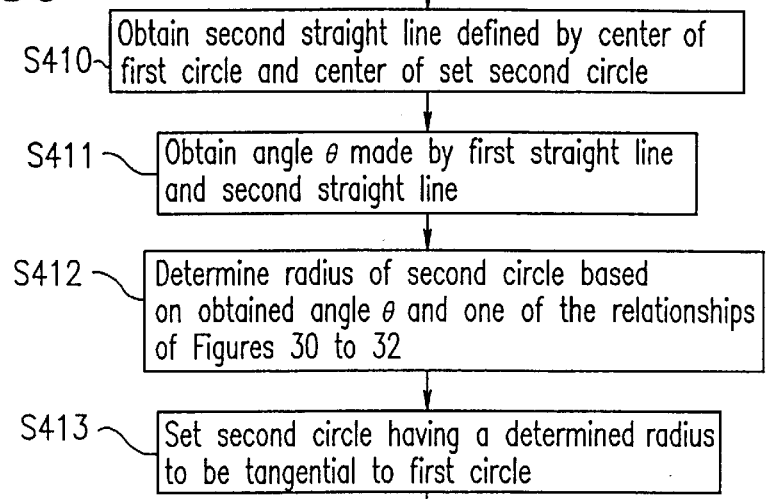
FIG. 36 shows steps for setting a second circle whose radius is varied according to a direction along which flaws are distributed.

The steps for setting a second circle whose radius is varied according to the direction along which flaws are distributed include steps S410 to S413 as shown in FIG. 36.

At step S410, the CPU 10 calculates a second straight line which is defined by the center of the first circle and the center of the second circle.

At step S411, the CPU 10 calculates an angle θ formed by the first straight line and the second straight line.

At step S412, the CPU 10 calculates the radius of a second circle based on the angle θ calculated at step S411 and one of the relationships shown in FIGS. 32 to 34.

At step S413, the CPU 10 sets a second circle which has the radius calculated at step S412 and is tangential to the first circle.

Steps S410 to S413 correspond to step S106 of the flow chart shown in FIG. 5.

Next, the steps for moving the second circle whose radius is varied according to the direction along which flaws are distributed will be described with reference to FIG. 37.

At step S420, the CPU 10 calculates a straight line defined by the center of the first circle and the center of the second circle to be moved.

At step S421, the CPU 10 calculates an angle θ formed by the first straight line and the second straight line.

At step S422, the CPU 10 calculates the radius of the next second circle to be set based on the angle θ calculated at step S421 and one of the relationships shown in FIGS. 32 to 34.

At step S423, the CPU 10 sets the second circle having the radius calculated at step S422 at the next position.

Steps S420 to S423 correspond to step S197 of the flow chart shown in FIG. 5.

In accordance with the present example, it is possible to set a relatively large region to be searched for flaws, i.e., a second circle, in the direction along which flaws in the first circle are clustered.

According to the present example, the number of flaws from a scratch is counted by using a first circle and second circles. As in Example 1, the present example may be modified so as to use a first ellipse or polygon and second ellipses or polygons, where each of the second ellipse or polygon is moved tangentially along the periphery of the first ellipse or polygon.

Hereinafter, a method for assessing the number and type of flaws according to Example 4, where second ellipses are incorporated in place of the second circles, will be described with reference to FIG. 38.

Figure 38:
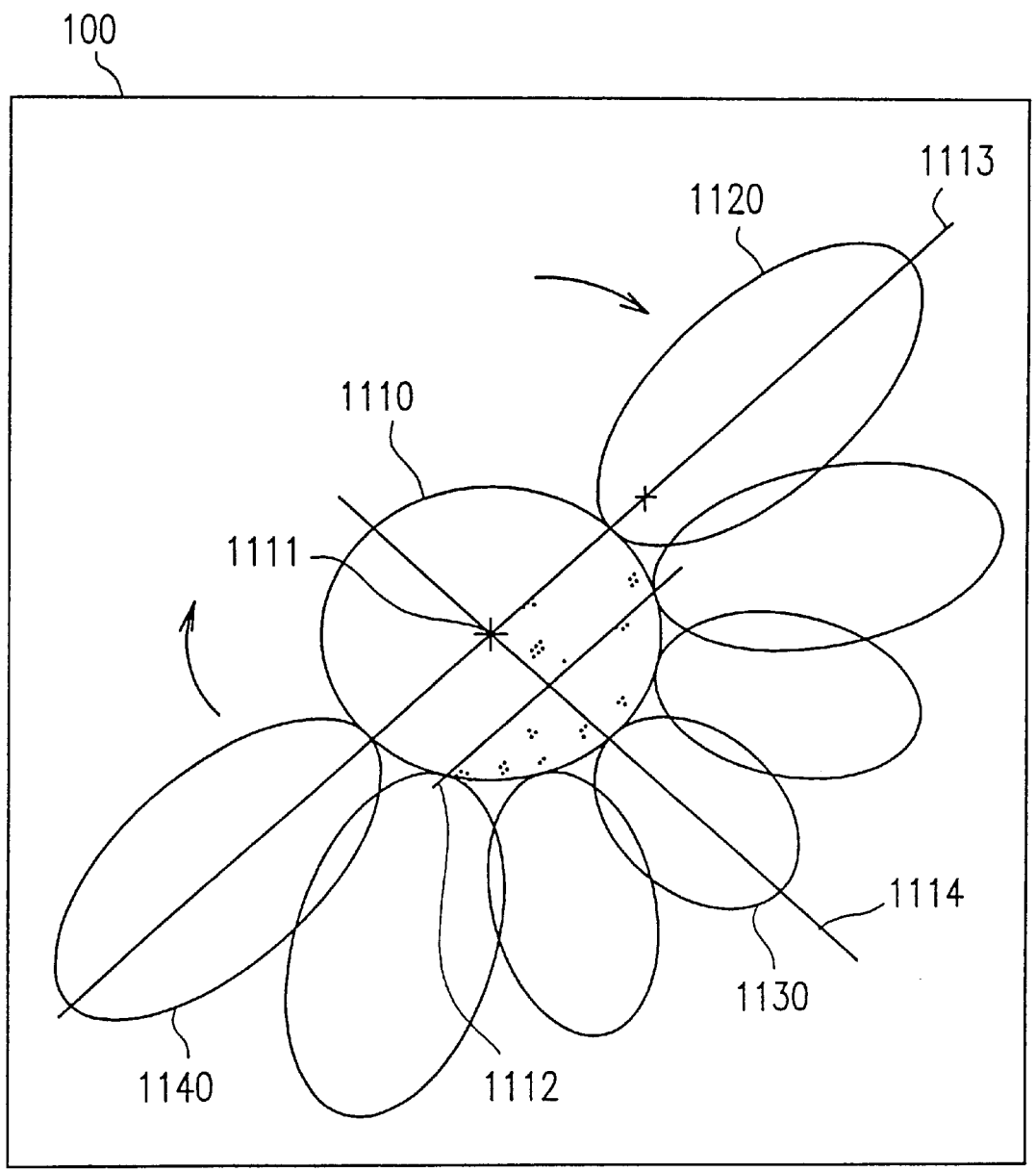
FIG. 38 is a diagram for illustrating a method for assessing the number and type of flaws according to Example 4 of the present invention, where second ellipses are used in place of the second circles.

In FIG. 38, a plurality of flaws, a first circle 1110 (having a radius a with the center thereof being an arbitrary point 1111), and second ellipses 1120, 1130, 1140, . . . , are shown in the region 100.

The second ellipse is moved tangentially along the periphery of the first circle while varying the size thereof. As in Example 1, the number of flaws existing within the second circle which have not yet been counted is counted.

Hereinafter, the relationship between the position of the second ellipse and the size of the second ellipse will be described.

The major axis of the second ellipse takes the maximum value b1 when the center of the second ellipse is on a straight line 1113. The straight line 1113 passes over the center 1111 of the first circle 1110, and is parallel to a regression straight line 1112. The regression straight line 1112 is calculated based on the coordinate data of all flaws existing within the first circle 1110. The regression straight line 1112 may also be calculated based on the least square method. The regression straight line 1112 represents the direction along which flaws are distributed.

The length of the major axis of the second ellipse becomes monotonously shorter after the second ellipse is moved from the position 1120. The radius of the second ellipse takes the minimum value when the center of the second ellipse is on a straight line 1114. The straight line 1114 is orthogonal to the straight line 1113, and passes over the center 1111 of the first circle 1110.

The length of the major axis of the second ellipse becomes monotonously longer after the second ellipse is moved from the position 1130. As described above, the length of the major axis of the second ellipse takes the maximum value when the center of the second ellipse is on the straight line 1113. Herein, as the second ellipse is moved, the length of the minor axis of the second ellipse is kept constant. The number of flaws from a scratch is counted by moving the second ellipse while varying the length of the major axis thereof.

The present example may also be modified so as to use a first ellipse and second ellipses in place of the first and second circles.

Hereinafter, the method for assessing the number and type of flaws according to Example 4, where the first and second squares are incorporated in place of the first and second circles, will be described with reference to FIGS. 39A and 39B.

Figure 39A:
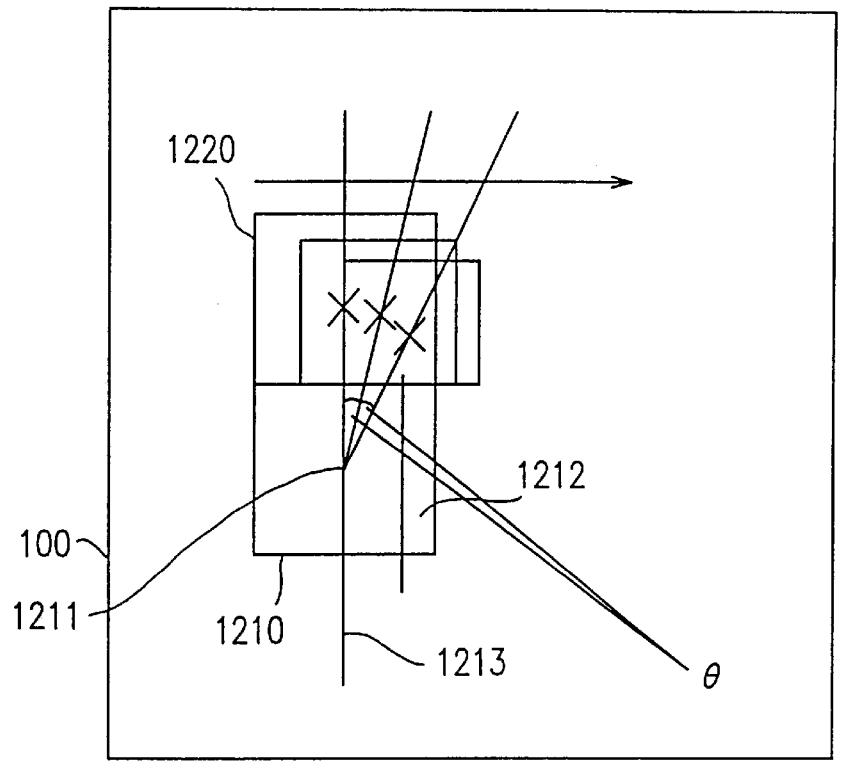
FIGS. 39A and 39B are diagrams for illustrating a method for assessing the number and type of flaws according to Example 4 of the present invention, where first and second squares are used in place of the first and second circles.
Figure 39B:
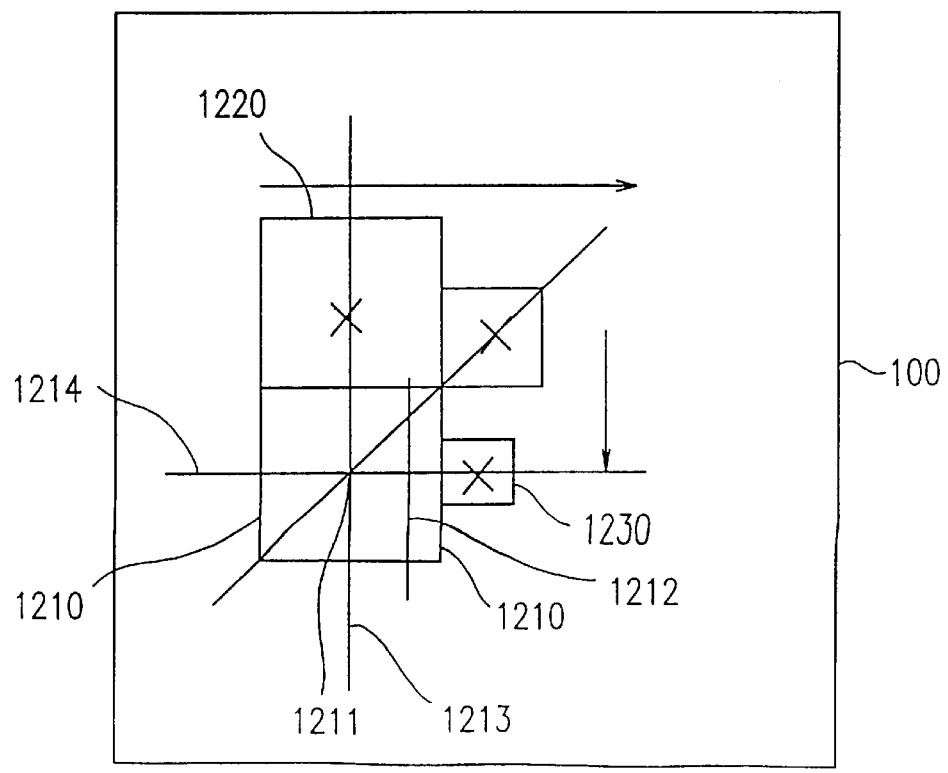

In FIGS. 39A and 39B, a plurality of flaws, a first square 1210, and second squares 1220, . . . , which are tangential to the first square 1210 are shown in the region 100.

The second square is moved by an angle θ tangentially along the periphery of the first square 1210 while varying the size thereof. As in Example 1, the number of flaws existing within the second square which have not yet been counted is counted. Herein, as the second square is moved, the length of the side of the second square varies.

Hereinafter, the relationship between the position of the second square and the size of the second square will be described.

The length of the side of the second square is on a straight line 1213. The straight line 1213 passes over the center 1211 of the first square 1210, and is parallel to a regression straight line 1212. The regression straight line 1212 is calculated based on the coordinate data of all flaws existing within the first square 1210. The regression straight line 1212 may also be calculated based on the least square method. The regression straight line 1212 represents the direction along which flaws are distributed.

The length of the side of the second square becomes monotonously shorter after the second square is moved from the position 1220. For example, as the second square is moved by an angle θ, the side of the second square becomes shorter by $2\theta(b1-b2)/\pi$. Herein, b2 is the minimum value of the length of the side of the second square whose size varies.

The length of the side of the second square takes the minimum value b2 when the center of the second square is on a straight line 1214. The straight line 1214 is orthogonal to the straight line 1213, and passes over the center 1211 of the first circle 1210.

The length of the side of the second square becomes monotonously longer after the second square is moved from the position 1230. For example, as the second square is moved by an angle θ, the side of the second square becomes longer by $2\theta(b1-b2)/\pi$. As described above, the length of the side of the second square takes the maximum value when the center of the second square is on the straight line 1213. The number of flaws from a scratch is counted by moving the second square while varying the length of the side thereof.

Hereinafter, the method for assessing the number and type of flaws according to Example 4, where the first and second hexagons are incorporated in place of the first and second circles, will be described with reference to FIG. 40.

Figure 40:
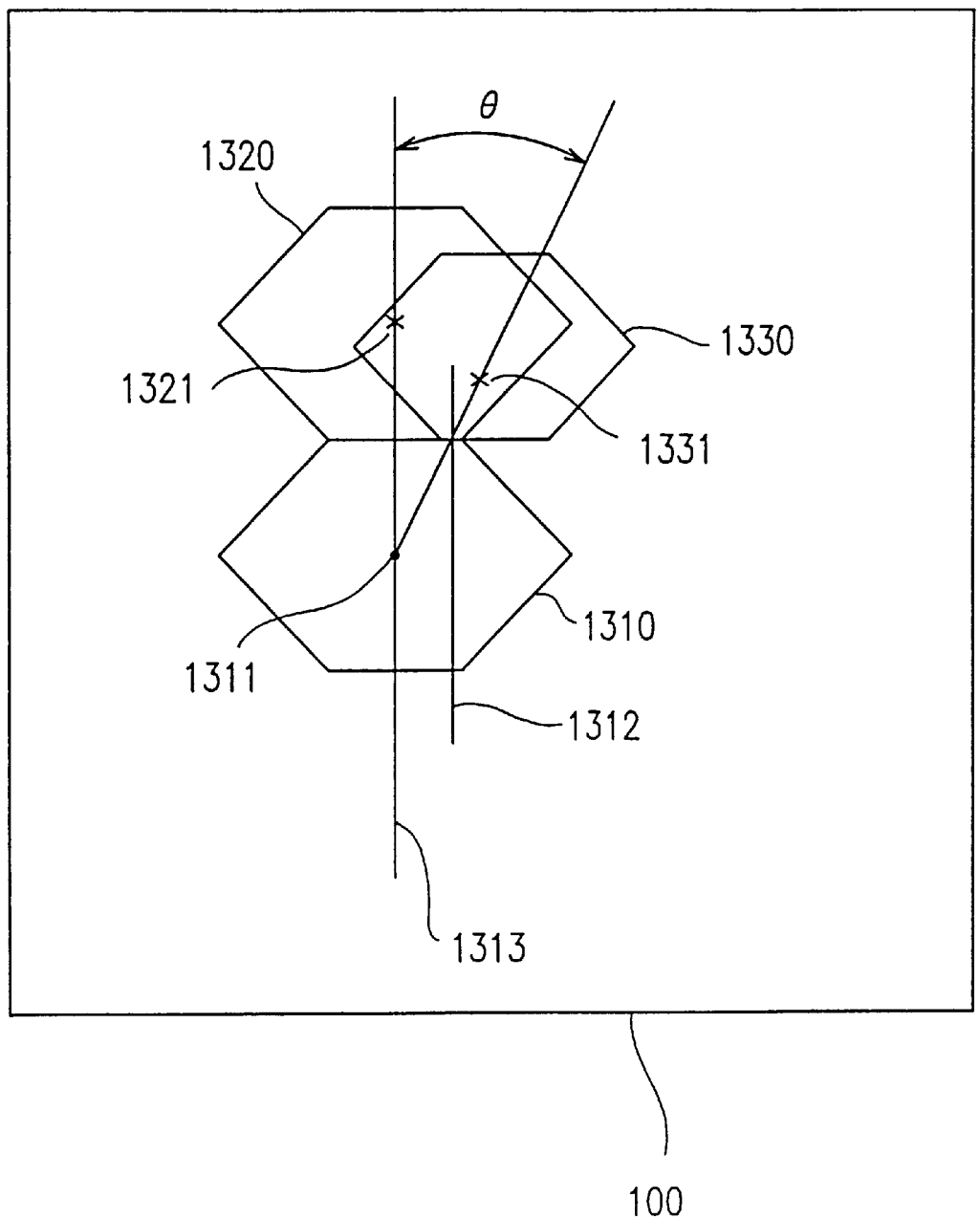
FIG. 40 is a diagram for illustrating a method for assessing the number and type of flaws according to Example 4 of the present invention, where first and second hexagons are used in place of the first and second circles.

In FIG. 40, a plurality of flaws, a first hexagon 1310, second hexagons 1320 and 1330 which are tangential to the first hexagon 1310 are shown in the region 100.

The second hexagon is moved by an angle θ tangentially along the periphery of the first hexagon 1310. As in Example 1, the number of all flaws existing within the second hexagon which have not yet been counted is counted. Herein, as the second hexagon is moved, the length of the side of the second hexagon varies. For example, as the second hexagon is moved by an angle θ, the side of the second hexagon becomes shorter by $2\theta(b1-b2\theta/\pi$. Herein, b1 is the maximum value of the length of the side of the second hexagon whose size varies; and b2 is the minimum value of the length of the side of the second hexagon. The number of flaws from a scratch is counted by moving the second hexagon while varying the length of the side thereof.

In the present example, the number of flaws is counted by using a second circle, ellipse, or polygon and moving it tangentially along the periphery of a first circle, ellipse, or polygon. However, the present example may be modified so that the second circle, ellipse, or polygon is moved along the periphery of the first circle, ellipse, or polygon while partially overlapping each other as in Example 2.

Figure 41:
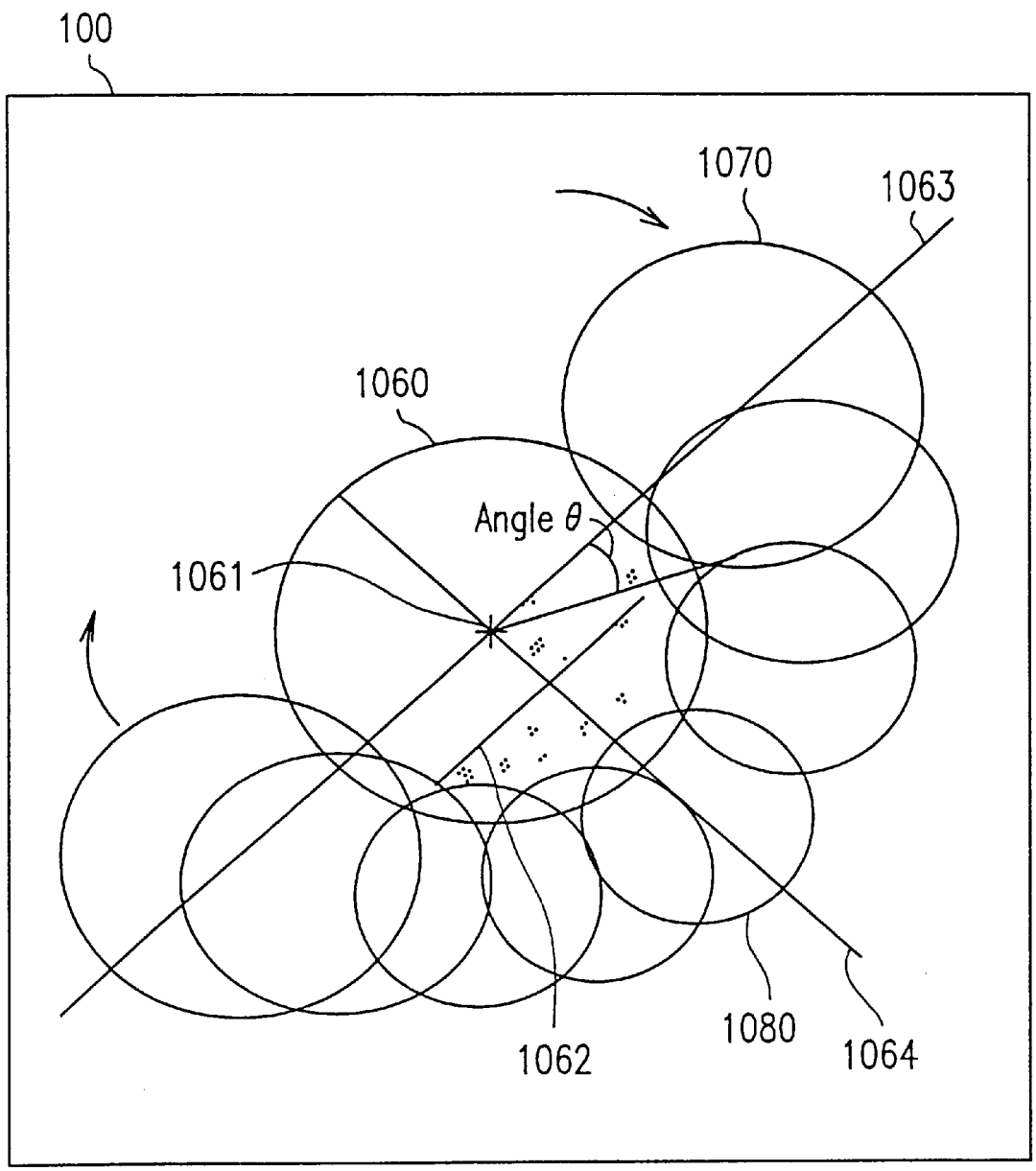
FIG. 41 is a diagram for illustrating a method for assessing the number and type of flaws according to Example 4 of the present invention, where a second circle is moved along the periphery of a first circle while partially overlapping each other.

FIG. 41 is a diagram for illustrating a method for assessing the number and type of flaws according to Example 4, where the second circle is moved along the periphery of the first circle while overlapping each other. The second circle is moved along the periphery of the first circle so as to overlap each other while varying the size thereof. As in Example 2, the number of flaws existing within the second circle which have not yet been counted is counted.

Hereinafter, the relationship between the position of the second circle and the size of the second circle will be described.

The length of the radius of the second circle takes the maximum value b1 when the center of the second circle is on a straight line 1063. The straight line 1063 passes over the center 1061 of the first circle 1060, and is parallel to a regression straight line 1062. The regression straight line 1062 is calculated based on the coordinate data of all flaws existing within the first circle 1060. The regression straight line 1062 may also be calculated based on the least square method. The regression straight line 1062 represents the direction along which flaws are distributed.

The length of the radius of the second circle becomes monotonously shorter after the second circle is moved from the position 1070. The radius of the second circle takes the minimum value b2 when the center of the second circle is on a straight line 1064. The straight line 1064 is orthogonal to the straight line 1063, and passes over the center 1061 of the first circle 1060.

The length of the radius of the second circle becomes monotonously longer after the second circle is moved from the position 1080. As described above, the radius of the second circle takes the maximum value when the center of the second circle is on the straight line 1063. The number of flaws from a scratch is counted by moving the second circle along the periphery of the first circle so as to overlap each other while varying the length of the radius thereof.

Figure 42:
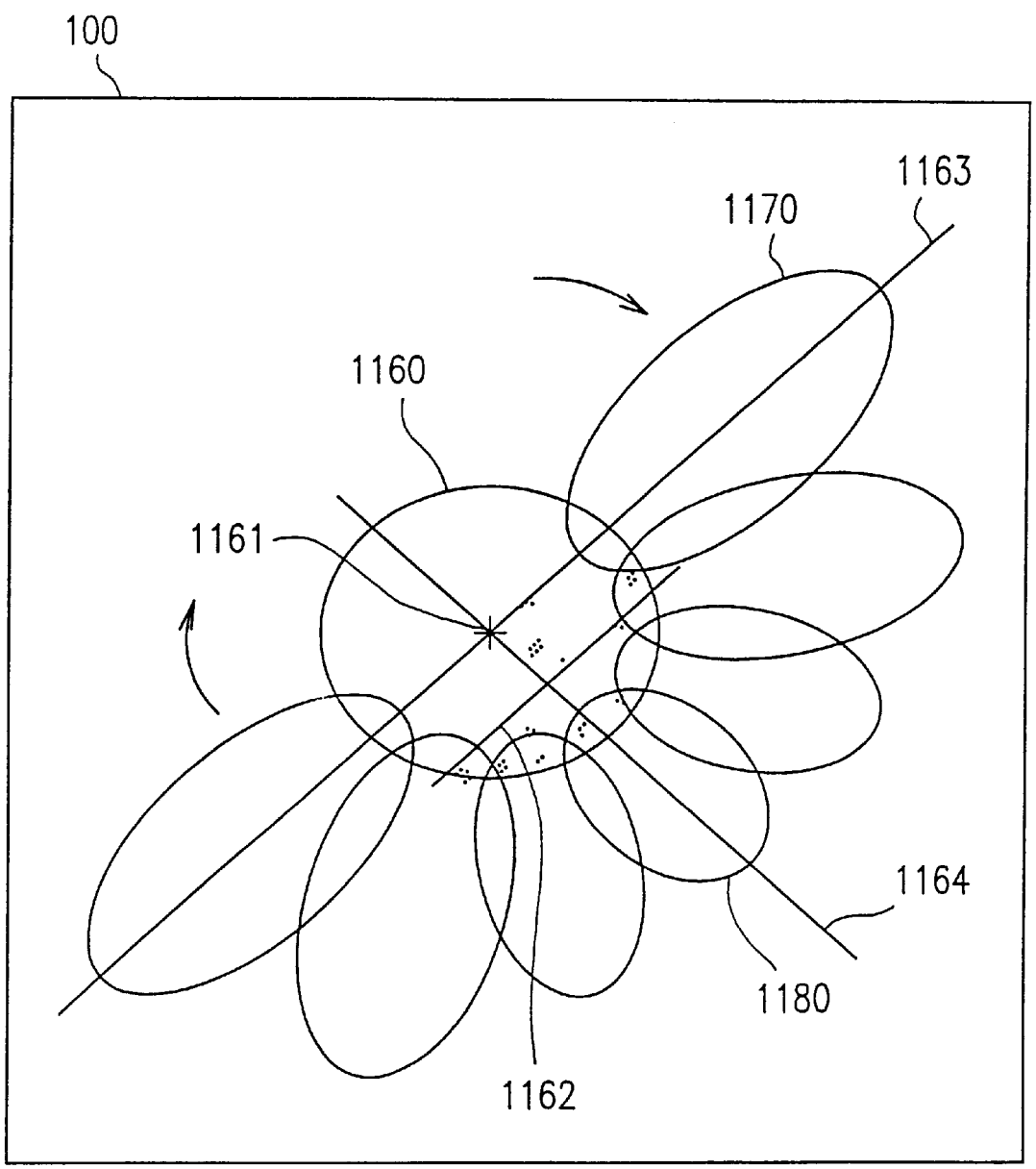
FIG. 42 is a diagram for illustrating a method for assessing the number and type of flaws according to Example 4 of the present invention, where a second ellipse is moved along the periphery of a first circle while partially overlapping each other.

FIG. 42 is a diagram for illustrating a method for assessing the number and type of flaws according to Example 4, where the second ellipse is moved along the periphery of the first circle while overlapping each other. The second ellipse is moved along the periphery of the first circle so as to overlap each other while varying the size thereof. As in Example 2, the number of flaws existing within the second circle which have not yet been counted is counted.

Hereinafter, the relationship between the position of the second ellipse and the size of the second ellipse will be described.

The major axis of the second ellipse takes the maximum value b1 when the center of the second ellipse is on a straight line 1163. The straight line 1163 passes over the center 1161 of the first circle 1160, and is parallel to a regression straight line 1162. The regression straight line 1162 is calculated based on the coordinate data of all flaws existing within the first circle 1160. The regression straight line 1162 may also be calculated based on the least square method. The regression straight line 1162 represents the direction along which flaws are distributed.

The length of the major axis of the second ellipse becomes monotonously shorter after the second ellipse is moved from the position 1170. The radius of the second ellipse takes the minimum value b2 when the center of the second ellipse is on a straight line 1164. The straight line 1164 is orthogonal to the straight line 1163, and passes over the center 1161 of the first circle 1160.

The length of the major axis of the second ellipse becomes monotonously longer after the second ellipse is moved from the position 1180. As described above, the length of the major axis of the second ellipse takes the maximum value when the center of the second ellipse is on the straight line 1163. Herein, as the second ellipse is moved, the length of the minor axis of the second ellipse is kept constant. The number of flaws from a scratch is counted by moving the second ellipse along the periphery of the first circle so as to overlap each other while varying the length of the major axis thereof.

The method for assessing the number and type of flaws of Example 4 may be modified so as to use a first ellipse and second ellipses in place of the first and second circles.

Figure 43:
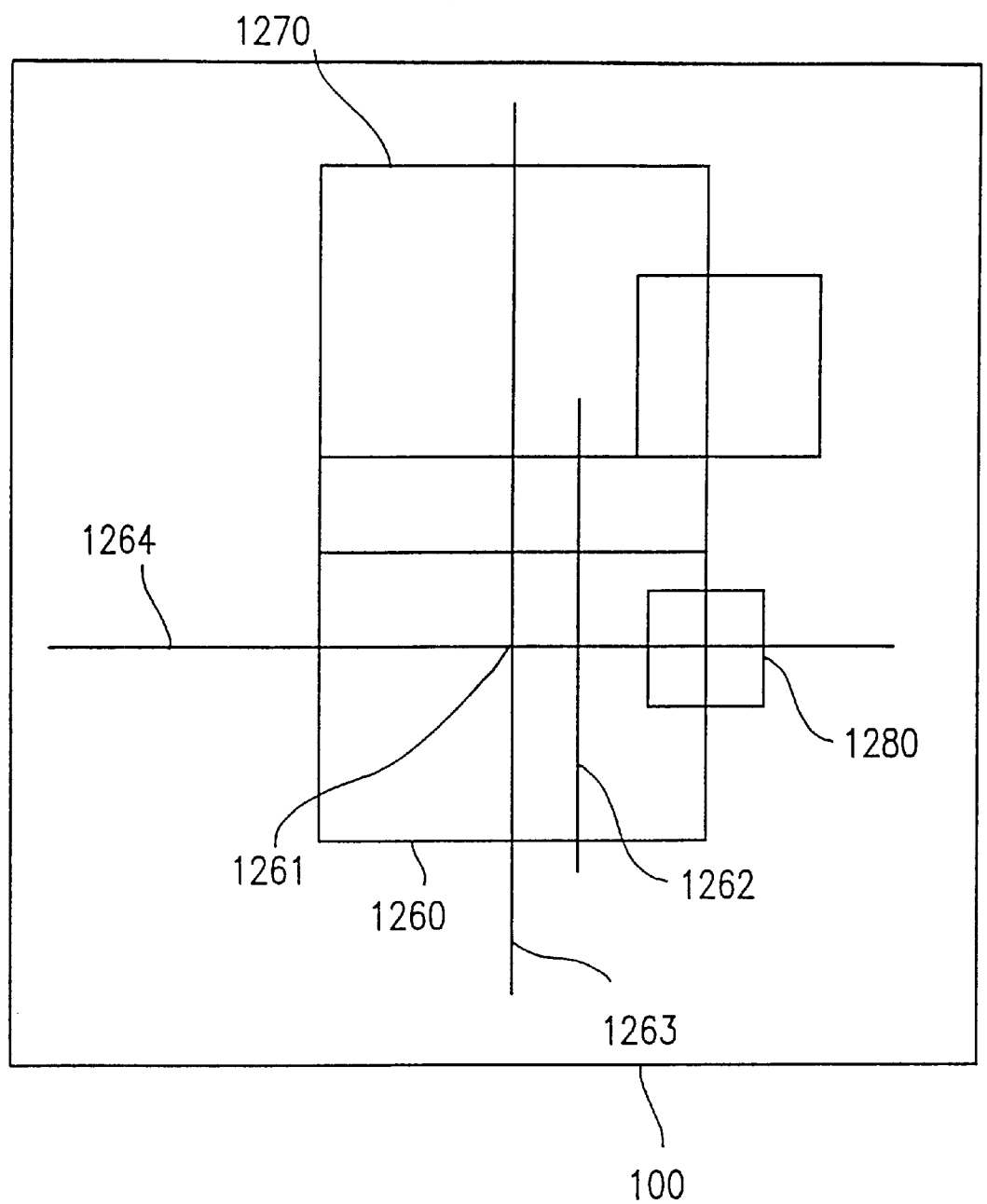
FIG. 43 is a diagram for illustrating a method for assessing the number and type of flaws according to Example 4 of the present invention, where a second square is moved along the periphery of a first square while partially overlapping each other.

FIG. 43 is a diagram for illustrating the method for assessing the number and type of flaws according to Example 4, where a second square is moved along the periphery of the first square while overlapping each other. The second square is moved along the periphery of the first square so as to overlap each other while varying the size thereof. As in Example 2, the number of flaws existing within the second square which have not yet been counted is counted.

Hereinafter, the relationship between the position of the second square and the size of the second square will be described.

The length of the side of the second square takes the maximum value b1 when the center of the second square is on a straight line 1263. The straight line 1263 passes over the center 1261 of the first square 1260, and is parallel to a regression straight line 1262. The regression straight line 1262 is calculated based on the coordinate data of all flaws existing within the first square 1260. The regression straight line 1262 may also be calculated based on the least square method. The regression straight line 1262 represents the direction along which flaws are distributed.

The length of the side of the second square becomes monotonously shorter after the second square is moved from the position 1270. For example, as the second square is moved by an angle θ, the side of the second square becomes shorter by $2\theta(b1-b2)/\pi$. Herein, b2 is the minimum value of the length of the side of the second square whose size varies.

The length of the side of the second square takes the minimum value b2 when the center of the second square is on a straight line 1264. The straight line 1264 is orthogonal to the straight line 1263, and passes over the center 1261 of the first circle 1260.

The length of the side of the second square becomes monotonously longer after the second square is moved from the position 1280. For example, as the second square is moved by an angle θ, the side of the second square becomes longer by 2θ(b1−b2)/π. As described above, the length of the side of the second square takes the maximum value when the center of the second square is on the straight line 1263. The number of flaws from a scratch is counted by moving the second square while varying the length of the side thereof.

Figure 44:
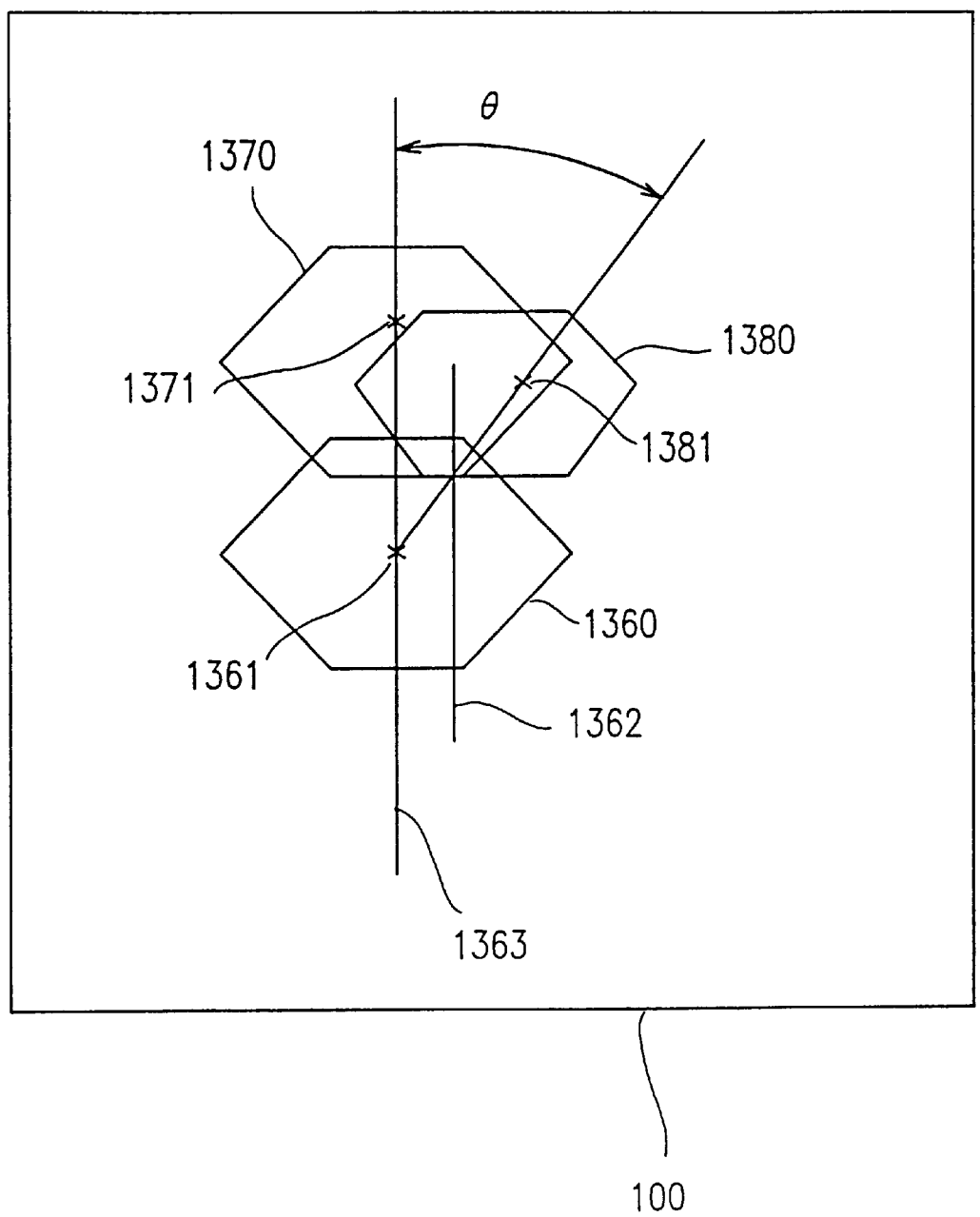
FIG. 44 is a diagram for illustrating a method for assessing the number and type of flaws according to Example 4 of the present invention, where a second hexagon is moved along the periphery of a first hexagon while partially overlapping each other.

FIG. 44 is a diagram for illustrating a method for assessing the number and type of flaws according to Example 4, where the second hexagon is moved along the periphery of the first hexagon while overlapping each other. The second hexagon is moved along the periphery of the first hexagon so as to overlap each other while varying the size thereof. As in Example 2, the number of flaws existing within the second hexagon which have not yet been counted is counted.

The second hexagon is moved by an angle θ along the periphery of the first hexagon 1360 while overlapping each other. As in Example 2, the number of all flaws existing within the second hexagon which have not yet been counted is counted. Herein, as the second hexagon is moved, the length of the side of the second hexagon varies. For example, as the second hexagon is moved by an angle θ, the side of the second hexagon becomes shorter by 2θ(b1−b2)/π. Herein, b1 is the maximum value of the length of the side of the second hexagon whose size varies; and b2 is the minimum value of the length of the side of the second hexagon. The number of flaws from a scratch is counted by moving the second hexagon while varying the length of the side thereof.

EXAMPLE 5

According to Example 5 of the present invention, the size of a second circle, ellipse, or polygon is not fixed, but varies according to the direction along which flaws are distributed within a first circle, ellipse, or polygon.

In accordance with Example 5, even when the clustered flaws from a scratch are formed in a skipped pattern like a dashed line, flaws extending in a direction, along which flaws from a scratch are clustered, can be included within the second circle by enlarging the second circle which is located in the direction along which the flaws of a scratch are clustered.

Hereinafter, a method for assessing the number and type of flaws according to Example 5 of the present invention will be described.

The method for assessing the number and type of flaws of Example 5 is different from those illustrated in the flow chart of FIG. 28 in that there are provided: additional steps for obtaining a direction along which flaws are distributed based on flaws existing within the first circle; and (in place of the steps for setting and moving second circles) steps for setting and moving a second circle whose radius is varied according to the direction along which flaws are distributed.

The steps for obtaining a direction in which flaws are distributed based on flaws existing within the firs circle are same as steps S400 to S402 shown in FIG. 35. Steps S400 to S402 are executed between steps S303 and S304, steps S304 and S305, steps S305 and S306, or between steps S306 and S307 of the flow chart shown in FIG. 28.

The steps for setting a second circle whose radius is varied are the same as steps S410 to S413 shown in FIG. 36. Steps S410 to S413 correspond to step S307 in FIG. 28.

Figure 37:
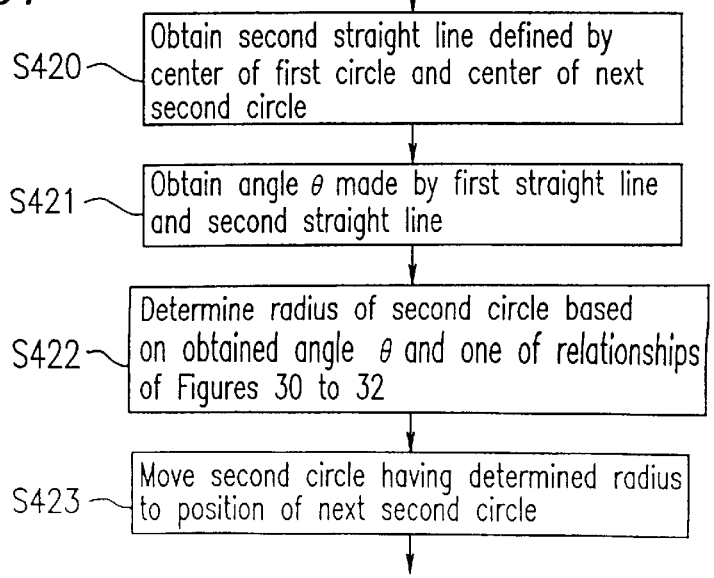
FIG. 37 shows steps for moving a second circle whose radius is varied according to a direction along which flaws are distributed.

The steps for moving the second circle whose radius is varied according to the direction in which flaws are distributed are the same as steps S420 to S423 shown in FIG. 37. Steps S420 to S423 correspond to step S308 in FIG. 28.

In accordance with the present example, it is possible to set a relatively large region to be searched for flaws, i.e., a second circle, in the direction along which flaws are clustered in the first circle.

According to the present example, the number of flaws from a scratch is counted by using a first circle and second circles. As in Examples 1,3 and 4, the present example may be modified so as to use a first ellipse or polygon and second ellipses or polygons, where the second ellipse or polygon is moved tangentially along the periphery of the first ellipse or polygon.

According to the present example, the number of flaws from a scratch is counted by using a first circle and second circles. As in Examples 2, 3 and 4, the present example may be modified so as to use a first ellipse or polygon and second ellipses or polygons, where the second ellipse or polygon is moved along the periphery of the first ellipse or polygon while overlapping each other.

According to one of the above-described methods for assessing the number and type of flaws of the present invention, a second polygon (e.g., a square or a hexagon) is moved along the periphery of a first polygon (e.g., a square or a hexagon) at regular intervals. The distance between two adjacent second polygons may be, for example, about 1/10 of the length of a side of the first polygon. In the case where the first and second polygons have sides of the same length, the second polygon may be moved by the length of a side of the polygon. In such a case, the period of time for assessing the number and type of flaws can be shortened.

Herein, in accordance with Examples 1 to 5 of the present invention, the number and type of flaws which have been detected on a semiconductor wafer are determined. However, similar effects can be obtained when determining the number and type of flaws which have been detected on other types of substrates such as a glass substrate for a liquid crystal display, or a reticle (a mask substrate).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A computer implemented method for assessing a number and type of flaws, comprising the steps of:

determining a first region and a second region;

counting the number of flaws existing within the first region;

counting the number of flaws existing within the second region which is moved along a periphery of the first region; and assessing at least one of a number and type of flaws based on the number of flaws counted as existing within the first region and the second region, wherein a size of the first region is selected based on a number of flaws previously found to exist within a unit area.

2. A method for assessing a number and type of flaws according to claim 1, further comprising the step of moving a circle along the periphery of the first region so as to be tangential to the first region and setting a trace of the circle to be the second region.

3. A method for assessing a number and type of flaws according to claim 1, wherein the first region is a first circle having a radius a, the method further comprising the step of moving a second circle having a radius b along the periphery of the first circle so as to partially overlap the first circle, thus determining the second region.

4. A method for assessing a number and type of flaws according to claim 3, wherein, in the step of determining the second region, a distance between a center of the first circle and a center of the second circle is set about equal to or more than |a−b| and about less than a+b, while moving the second circle.

5. A method for assessing a number and type of flaws according to claim 1, further comprising the step of moving an ellipse along the periphery of the first region so as to be tangential to the first region and setting a trace of the ellipse to be the second region.

6. A method for assessing a number and type of flaws according to claim 1, wherein the first region is a first ellipse, the method further comprising the step of moving a second ellipse along the periphery of the first ellipse so as to partially overlap the first ellipse, thus determining the second region.

7. A method for assessing a number and type of flaws according to claim 1, further comprising the step of moving a polygon along the periphery of the first region so as to be tangential to the first region and setting a trace of the polygon to be the second region.

8. A method for assessing a number and type of flaws according to claim 1, wherein the first region is a first polygon, the method further comprising the step of moving the second polygon so that one side of the second polygon is tangential to a side of the first polygon and assuming a trace of the second polygon being moved along the periphery of the first polygon to be the second region, thus determining the second region.

9. A method for assessing a number and type of flaws according to claim 1, wherein the first region is a first polygon, the method further comprising the step of moving a second polygon along the periphery of the first polygon so as to partially overlap the first polygon, thus determining the second region.

10. A method for assessing a number and type of flaws according to claim 1, further comprising the step of:

determining a third region;

counting the number of flaws existing within the third region that moving along a periphery of the second; and assessing at least one of a number and type of flaws based on the number of flaws counted as existing within the first region and the second region.

11. A computer implemented method for assessing a number and type of flaws, comprising the steps of:

counting the number of flaws existing within a first region surrounded by a first circle;

determining a size of a second circle according to the number of flaws existing within the first region;

setting the second circle so as to be tangential to the first circle;

counting the number of flaws existing within a second region surrounded by the second circle;

moving the second circle along a periphery of the first circle so as to be tangential to the first circle while counting the number of flaws which have not yet been counted and which exist within the second region surrounded by the second circle being moved; and assessing at least one of a number and type of flaws based on the number of flaws counted as existing within the first region and the second region.

* * * * *